US011858407B2

(12) United States Patent
Point et al.

(10) Patent No.: US 11,858,407 B2
(45) Date of Patent: Jan. 2, 2024

(54) TINY HOME TRAILER SYSTEM

(71) Applicant: Dillon Point, Akwesasne (CA)

(72) Inventors: Dillon Point, Akwesasne (CA); Jeremiah Point, Akwesasne (CA)

(73) Assignee: Dillon Point, Akwesasne (CA)

( * ) Notice: Subject to any disclaimer, the term of this patent is extended or adjusted under 35 U.S.C. 154(b) by 0 days.

(21) Appl. No.: 17/696,066

(22) Filed: Mar. 16, 2022

(65) Prior Publication Data

US 2022/0297588 A1 Sep. 22, 2022

Related U.S. Application Data

(60) Provisional application No. 63/161,888, filed on Mar. 16, 2021.

(51) Int. Cl.

| | |
|---|---|
| ***B60P 3/34*** | (2006.01) |
| ***B60P 3/32*** | (2006.01) |
| ***B62D 65/02*** | (2006.01) |
| ***B60S 9/12*** | (2006.01) |
| ***B60D 1/01*** | (2006.01) |

(52) U.S. Cl.

CPC .................. *B60P 3/34* (2013.01); *B60D 1/01* (2013.01); *B60P 3/32* (2013.01); *B60S 9/12* (2013.01); *B62D 65/024* (2013.01)

(58) Field of Classification Search

CPC ...... B60P 3/14; B60P 3/32; B60P 3/34; B60P 3/40; B62D 21/20; B62D 33/02; B62D 53/064; B62D 53/065

USPC .......................................................... 296/168

See application file for complete search history.

(56) References Cited

U.S. PATENT DOCUMENTS

| | | | | |
|---|---|---|---|---|
| 2,663,573 A | 12/1953 | Shinn | | |
| 3,806,147 A * | 4/1974 | Hanson | E04H 6/04 | 280/30 |
| 3,944,242 A * | 3/1976 | Eubank | B28B 1/14 | 280/495 |
| 6,681,535 B1 * | 1/2004 | Batchelor | B62D 33/08 | 52/143 |
| 7,112,029 B1 * | 9/2006 | Neatherlin | B62D 53/065 | 280/43.23 |
| 8,186,704 B2 | 5/2012 | Cesternino | | |
| 9,422,013 B2 | 8/2016 | Graham | | |
| 10,011,980 B1 | 7/2018 | Shipps | | |
| 10,477,773 B1 * | 11/2019 | Hellbusch | A01D 75/002 | |
| 11,313,125 B2 * | 4/2022 | Neatherlin | E04C 2/526 | |

(Continued)

*Primary Examiner* — Jason S Daniels

(74) *Attorney, Agent, or Firm* — John H. Choi & Associates

(57) ABSTRACT

A trailer system with a modular design is provided for the transport of tiny homes. The system comprises a front hitch assembly to connect to a suitable towing or transport vehicle, and a rear axle assembly designed to carry the weight of a tiny home. The trailer bed portion of the trailer system is the tiny house foundation adapted to connect with the front hitch and rear axle assemblies in a lowboy configuration. Each of the front hitch and rear axle assemblies have pegs that can be secured into channels formed into the end walls (e.g. slots/cavities) or alongside walls (e.g. grooves) of the foundation. Once inserted into the channels, the pegs can be secured to the foundation using a securing means (e.g. locking pins). After transport of the tiny home, the front hitch and rear axle assemblies can be connected to each for transport to another location.

18 Claims, 60 Drawing Sheets

(56) References Cited

U.S. PATENT DOCUMENTS

| | | | | |
|---|---|---|---|---|
| 2015/0307143 | A1* | 10/2015 | Marcantonio .......... | B60D 1/143 280/476.1 |
| 2018/0162463 | A1* | 6/2018 | Lutz ..................... | B62D 13/025 |
| 2021/0371024 | A1* | 12/2021 | Lutz ....................... | B62D 53/04 |

* cited by examiner

TINY HOME TRAILER SYSTEM

FIELD OF THE INVENTION

The present invention relates to the field of lowboy transport systems coupled to vehicles and more particularly lowboy transport systems for tiny homes.

BACKGROUND OF THE INVENTION

The background to the invention provides information about the state of the art relating to transport systems for coupling to vehicles. Otherwise known as trailer systems that can be hitched to a vehicle, the prior art is primarily characterized by high and low bed trailers suitable for different applications. Lowboy trailer systems are a type of low bed trailer preferred for transporting heavy cargo where the height of the cargo is a factor and could otherwise exceed vehicle height restrictions during transportation. Other reasons for using lowboy trailer systems relate to mitigating the risks, costs and challenges associated with loading, transporting and unloading certain cargo to and from a trailer.

Lowboy trailer system designs are shown in the convertible trailer systems of U.S. Pat. Nos. 2,663,573 and 8,186,704. Certain simpler lowboy trailer systems are also known, comprising a goose-neck member for hitching the trailer system to a vehicle, a trailer bed and a rear dolly member with wheels. When the goose-neck hitching member and/or rear dolly member are removable from the trailer bed, cargo can be loaded from the ground instead of lifted onto the trailer bed.

U.S. Pat. No. 9,422,013 discloses a modular lowboy trailer system comprising a gooseneck, deck and dolly. The system is configured so that either end of the deck can be connected to the gooseneck or dolly at the user's election. Deck connectors are configured using a cross tube and one or more protruding tabs that mate to gooseneck and dolly connectors, configured with tabs and sockets. When the deck is delivered to a location the gooseneck and dolly can be connected and transported to another location or mated with a new deck.

U.S. patent Ser. No. 10/011,980 discloses a floor system and associated transport apparatus for use with a vehicle. The frame of the flooring system and transport apparatus are configured to accommodate mobile home structures intended to be secured to an on-site foundation. The frame is made with opposing I-beams that each have an upper flange. There are a plurality of bar joists running perpendicular between the opposing I-beams and parallel to one another. There are two tube beams each located interiorly adjacent to an I-beam beneath the upper flange. Each of the tube beams can receive fork members from the front and rear portions of the transport apparatus so that the frame can be transported to an on-site foundation and connected to the foundation. A saddle device is provided for connecting the frame to the on-site foundation.

Tiny homes have been built on and transported using tandem axle trailers. To get the maximum width typical for a tiny home (96 inches), a deck-over style trailer has been used. The trailer bed is elevated higher off the ground than the bed of a lowboy trailer system and as a result creates more limitations for the height of the tiny home.

Low deck trailer options currently available for tiny homes tend to sacrifice on the width of the tiny home (83 inches) that can be transported. This is because the floor of the tiny home must fit between the wheel fenders flanking the trailer deck.

Accordingly, a need remains to improve the transport of tiny homes in a manner that maximizes the available design options for tiny homes, the off-site construction and the on-site delivery process.

SUMMARY OF THE INVENTION

The present invention relates generally to a trailer system with a modular design for the transport of tiny homes. A front hitch assembly connects to suitable vehicles such as a tractor-trailer or properly equipped pick-up truck. A rear axle assembly is designed to carry the weight of a tiny home. The trailer bed portion of the trailer system is the tiny house foundation adapted to connect with the front hitch and rear axle assemblies in a lowboy configuration. The tiny house foundation is secured to the front (hitch) and rear (axle) assemblies using peg and channel pairings, wherein each peg is mated to a channel, formed by holes (slots) in the side walls of the foundation defining the width of the tiny home, or by an open-sided channel (groove) provided for in the side walls of the foundation defining the length of the tiny home. The pegs can be secured to the foundation using locking pins (securing pins). After transport of the tiny home to a desired location, the front hitch and rear axle assemblies can be connected to each other for transport to another location by mating the one or more pegs of each assembly with each other or with a connecting member comprising channels that pair with each of the peg, similar to those provided in the foundation.

In one aspect there is provided a trailer system for transporting a foundation of a tiny home, comprising:

a) a foundation of a tiny home having a first side and a second side, the sides defining the length of the tiny home, and a first end and a second end, the ends defining the width of the tiny home;

b) a hitching member for attaching the trailer system to a towing vehicle, the hitching member comprising one or more pegs for connecting into one or more channels formed at the first and second sides, or formed into the first and second ends of the foundation; and c) a dolly member comprising one or more pegs for connecting into one or more channels formed at the first and second sides, or formed into the first and second ends of the foundation;

wherein by aligning the hitching member, foundation and dolly member in an end-to-end configuration, each of the one or more pegs is inserted into a corresponding channel of the one or more channels, to form a peg and channel pairing and thereby provide an assembled trailer system.

In another aspect there is provided a method for transporting a tiny home comprising the step of assembling a trailer system comprising:

a) a foundation of a tiny home comprising a top, a bottom, a first side and a second side, the sides defining the length of the tiny home, and a first end and a second end, the ends defining the width of the tiny home;

b) a hitching member for attaching the trailer system to a towing vehicle, the hitching member comprising one or more pegs for connecting into one or more channels formed at the first and second sides, or formed into the first and second ends of the foundation; and c) a dolly member comprising one or more pegs for connecting into one or more channels formed at the first and second sides, or formed into the first and second ends of the foundation;

wherein by aligning the hitching member, foundation and dolly member in an end-to-end configuration, each of the one or more pegs is inserted into a corresponding channel of the one or more channels, to form a peg and channel pairing and thereby provide an assembled trailer system.

In embodiments of the trailer system and method, the hitching member comprises a goose-neck.

In other embodiments of the trailer system and method, the dolly member is a single axle, dual-wheeled member.

In still other embodiments of the trailer system and method, the dolly member comprises an air suspension means for lowering and elevating the trailer system.

In further embodiments of the trailer system and method, each of the hitching and dolly members has two pegs that are each inserted into a groove channel formed by a wall configuration of each of the first or second sides of the foundation.

In other embodiments of the trailer system and methods, a peg and channel pairing is provided with aligning pin holes through the peg and at least one side wall of the channel for receiving a securing pin to lock the peg to the foundation during transport of the assembled trailer system.

In still other embodiments of the trailer system and methods, a slot or groove is formed by a wall configuration of the first and second ends of the foundation.

In other embodiments of the trailer system and method, the hitching and dolly members each have a base, the base having a structure that inserts into the slot or groove formed by the wall configuration of the first and second ends of the foundation.

In yet other embodiments of the trailer system and method, the assembled trailer system can transport the foundation of the tiny home, a partially built tiny home on the foundation or a fully built tiny home on the foundation.

In other embodiments of the trailer system and method, when the assembled trailer system is disassembled, a connecting member comprising one or more channels positioned and sized to each receive one of the one or more pegs of the hitching member, or one of the one or more pegs of the dolly member, is used to connect the hitching member and dolly member by aligning the hitching member, connecting member and dolly member in an end-to-end configuration.

BRIEF DESCRIPTION OF THE DRAWINGS

These and other features of the invention will become more apparent in the following detailed description in which reference is made to the appended drawings. For figures that have dimensions generally denoted by letters, such as 'x' and 'y', said use of letters is specific to each figure. For example, an 'x' value in one figure does not necessarily correspond to the same dimension in another figure also labelled using 'x'.

FIG. 47: shows an isometric side view of an embodiment of a front hitch assembly with pegs partially coupled/mated with the channels formed by grooved side walls of a tiny home foundation.

FIG. 49: shows an isometric side view of an embodiment of a front hitch assembly with pegs fully coupled/mated with the channels formed by grooved side walls of a tiny home foundation, wherein the peg and channel coupling is secured by a pin.

DETAILED DESCRIPTION OF THE INVENTION

Figure 1:
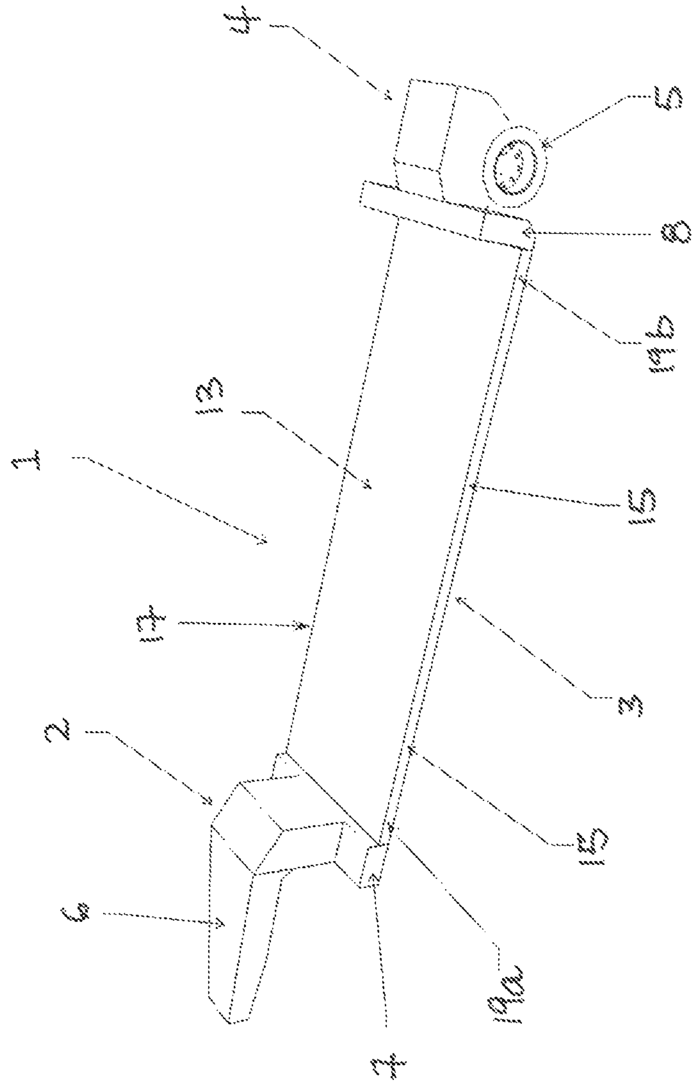
FIG. 1: shows an embodiment of an assembled trailer system according to the present disclosure.

The present invention relates to the field of lowboy trailer systems and the transport of tiny homes. As disclosed herein, the trailer system comprises three main members that assemble and dissemble from each other, or that otherwise can be coupled and decoupled from one another. These include a front hitch assembly (hitching member), a rear axle assembly (dolly member) and a tiny home foundation that doubles as a trailer bed.

Various features of the invention will become apparent from the following detailed description taken together with the illustrations in the Figures. The design factors, construction and use of the devices, structures, members, apparatuses, assemblies, systems, methods, processes and uses disclosed herein are described with reference to various examples representing embodiments and variations thereof, which are not intended to limit the scope of the invention as described and claimed herein. The skilled technician in the field to which the invention pertains will appreciate that there may be other variations, examples and embodiments of the invention not disclosed herein that may be practiced according to the teachings of the present disclosure without departing from the scope and spirit of the invention.

Definitions

Unless defined otherwise, all technical and scientific terms used herein have the same meaning as commonly understood by one of ordinary skill in the art to which this invention pertains.

The use of the word "a" or "an" when used herein in conjunction with the term "comprising" may mean "one," but it is also consistent with the meaning of "one or more," "at least one" and "one or more than one."

As used herein, the terms "comprising," "having," "including" and "containing," and grammatical variations thereof, are inclusive or open-ended and do not exclude additional, un-recited elements and/or method steps. The term "consisting essentially of" when used herein in connection with a composition, device, article, system, use or method, denotes that additional elements and/or method steps may be present, but that these additions do not materially affect the manner in which the recited device, article, system, method or use functions. The term "consisting of" when used herein in connection with a device, article, system, use or method, excludes the presence of additional elements and/or method steps. A device, article, system, use or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to.

The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect", "connecting" and "connected" refer to any direct or indirect physical association between elements or features of the trailer system of the present disclosure. Accordingly, these terms may be understood to denote elements or features that are partly or completely contained within one another, engaged, attached, coupled, mated, inserted, disposed on, secured or joined together, etc., even if there are other elements or features intervening between the elements or features described as being connected.

As used herein, the term "channel" refers to a space into which a peg-like structure or pin according to the present disclosure can be inserted. The space is defined, at least in part by channel walls in order to provide a path for the guided insertion of the peg-like structure or pin, but need not be fully enclosed by one or more channel walls. The end of a given channel opposite from the end into which a peg-like structure or pin is inserted or initially received, may or may not be open. For example, a channel can be a slot, groove, tube, peg hole, pin hole, and the like. Channels can also be aligned or merged with one another to form larger or longer channels in order to facilitate the connection of components of the trailer system. In this regard it is understood that a channel provides a path defined by structures such as those noted and may include spaces in between channel defining/forming structures which provide continuity of the path for the insertion or threading of a peg or pin through channel forming structures.

As used herein, the term "peg' and variations thereof (e.g. prismatic peg, and peg arm) refer to any peg-like structure that projects from the front hitch and rear axle assemblies for insertion into a channel of the foundation of the trailer system of the present disclosure. Each peg-like structure need only be long enough to be able to be inserted (connected) into a channel of a foundation and secured therein using a suitable securing means. Once inserted into a channel, the peg-like structure provides sufficient support at one end of the tiny home foundation alone, or in conjunction with other similarly connected peg-like structures for transporting the foundation of a tiny home, transporting the tiny home foundation with the shell of a tiny home built on top of it, or a fully constructed tiny home built on the foundation.

It is contemplated that any embodiment of the devices, structures, members, apparatuses, assemblies, systems, methods, processes, and uses disclosed herein can be implemented by one skilled in the art, as is, or by making such variations or equivalents without departing from the scope and spirit of the invention.

Tiny Home Trailer System

In one embodiment, the trailer system is a modular or sectional system, comprising at least three members, a trailer hitching member (front hitch assembly), a trailer dolly member (rear axle assembly), and a tiny home foundation configured to function as the trailer bed and connect to both of the front hitch assembly, and rear axle assembly.

In one embodiment, the hitching member is a gooseneck hitching assembly. In another embodiment, the dolly member is a dual axle assembly and may optionally comprise a suspension elevating means (e.g. air suspension system). In other embodiments, a peg and channel system is used to connect a foundation of a tiny home with a hitching assembly at one end and a rear axle assembly at another end. The peg and channel system may comprise pairings of pegs and slots formed into the end walls of the foundation. Alternatively, the peg and channel system may comprise pairings of pegs and grooves formed into the opposing side walls of the foundation. The grooves may be formed into the outer face of the side walls, or into the inner face of the side walls of the foundation. In another embodiment, a groove channel is formed around the outer facing perimeter of the foundation including the side and end walls.

A securing means, such as a securing pin is used to secure the hitching and rear axle assemblies to the ends of a foundation. The securing means (pins) is threaded through aligned pin holes through the side wall of a foundation, channel and peg.

When the foundation is not integrated into a trailer system, the pin holes provided through the pegs and channels may be aligned for receiving the securing means (pins) and connecting the hitching assembly directly to the rear axle assembly. Alternatively, a connecting member may be used (e.g. a spreader bar) be used to indirectly connect the hitching and rear axle assemblies together into a format suitable for transport in the absence of a foundation integrated into the trailer system.

Figure 2:
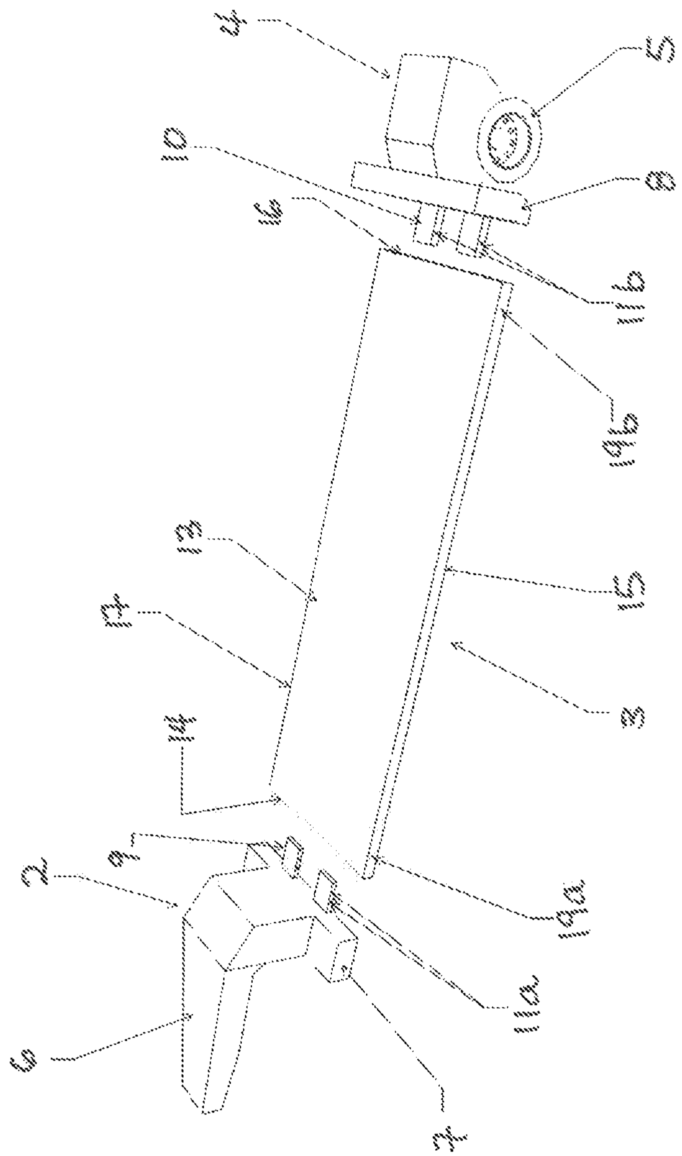
FIG. 2: shows an embodiment of a disassembled trailer system according to the present disclosure.
Figure 55:
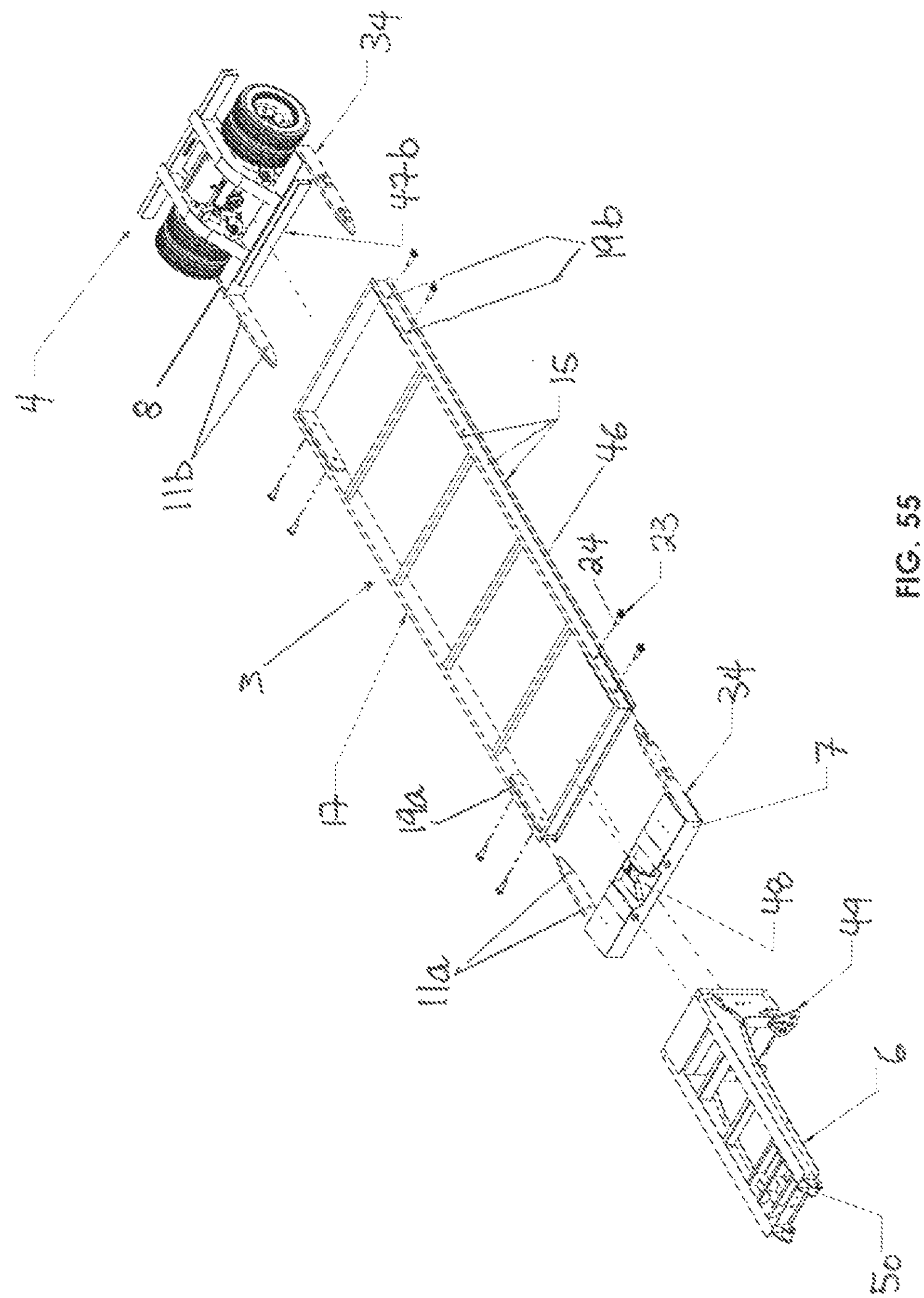
FIG. 55: shows an alternative embodiment of a trailer system according to the disclosure illustrating a peg and groove system for connecting the hitching assembly, foundation and rear axle assembly.

FIG. 1 shows an embodiment of a fully assembled trailer system according to the present disclosure. FIGS. 2 and 55 show the three member parts disassembled, but aligned in an end-to-end configuration to illustrate how the member parts and their features cooperate for the purposes of assembling the trailer system according to present disclosure.

Hitching Member—Front Hitch Assembly

A trailer hitching member is referred to herein as a front hitch assembly (and also alternatively referred to as a "hitching assembly" herein). This is the part of the trailer system that on one end connects (e.g. is hitched) to the vehicle that will tow the trailer system (with or without) a tiny home, and on the other end connects to the tiny home foundation (trailer bed). On this other end of a front hitch assembly, there are one or more pegs that are configured to fit into a similarly dimensioned channel(s) at an end of a tiny home foundation (functioning as a trailer bed). Depending on the placement and dimensions of the one or more pegs and corresponding channel(s), the number of pegs and channels can be selected by one skilled in the art.

Figure 57B:
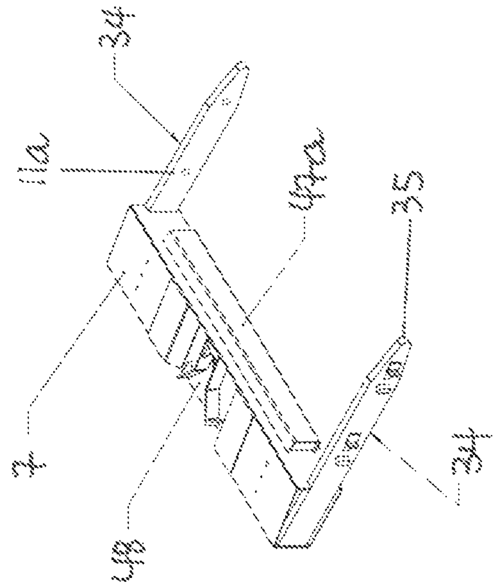
FIGS. 57A-57B: show two perspective views of an embodiment of a base of a hitching assembly adapted for receiving a gooseneck of a hitching assembly. In 'A' a Y channel is provided to guide a gooseneck to come into engagement with the base. In 'B' a weldment is provided for engaging with a groove formed into an end wall of a foundation.
Figure 57A:
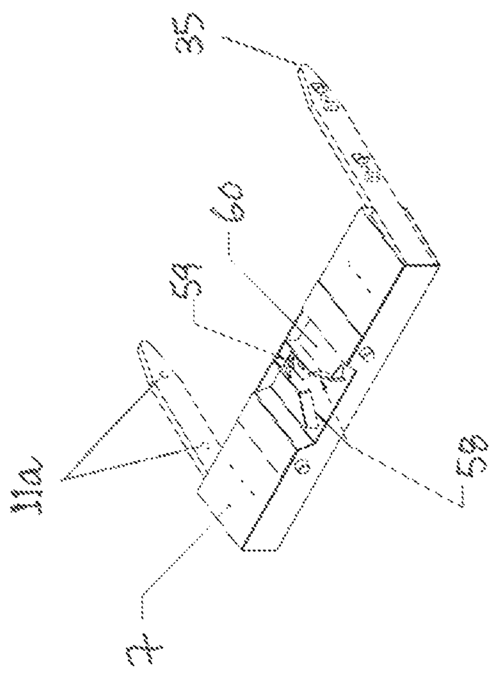
Figure 58C:
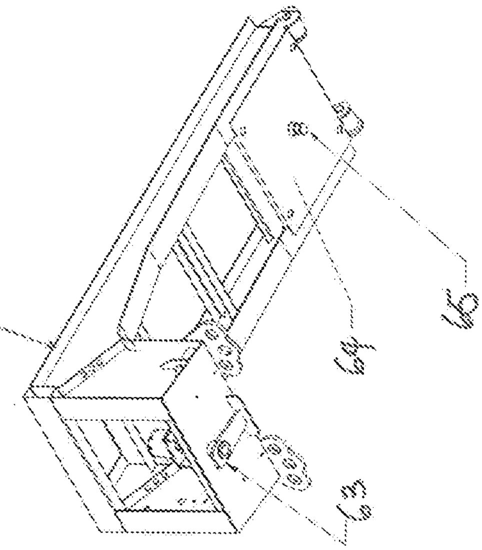
FIGS. 58A-58C: show three perspective views of a gooseneck of a hitching assembly. In 'A' rollers are shown as a means for guiding the front end of the gooseneck onto a transport vehicle, e.g. tow truck. Also shown in 'A' is an adjusting mechanism for raising or lowering the gooseneck to one of three preselected height settings. In 'B' the means for securing the adjusting mechanism to the gooseneck is shown as well as a braking means for engaging a deck lock member to a base of a hitching assembly. In 'C' the deck lock member mated to a hole in the base of hitching assembly is shown as well as the member for engaging the gooseneck to a transport vehicle (e.g. tow truck).
Figure 58B:
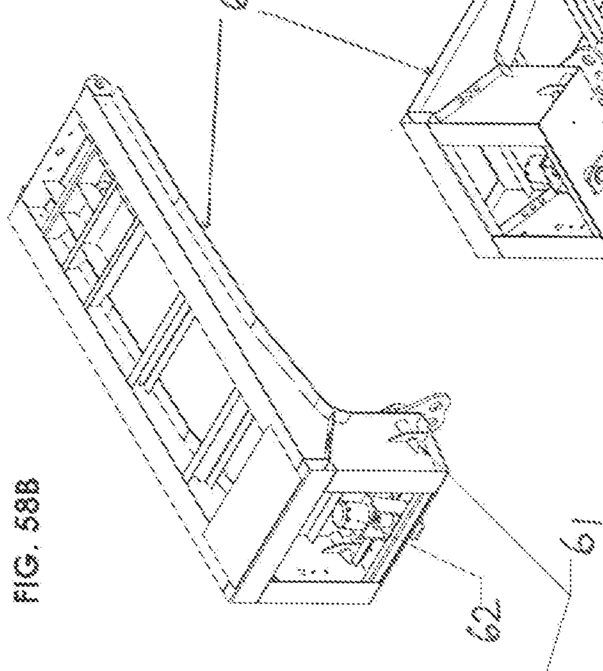
Figure 58A:
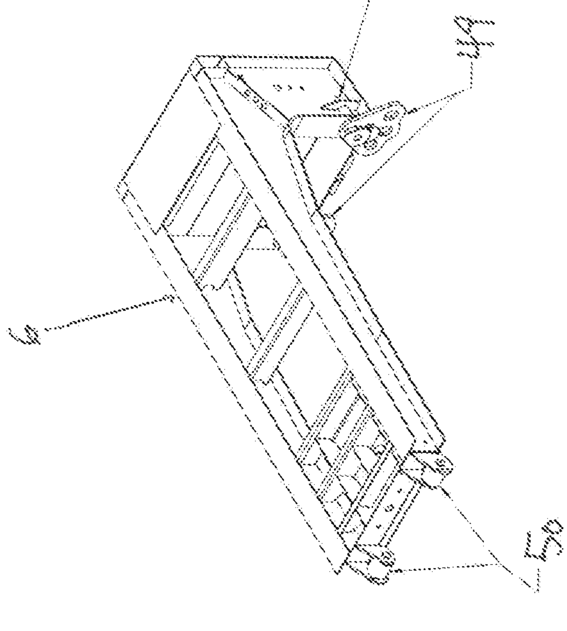
Figure 59:
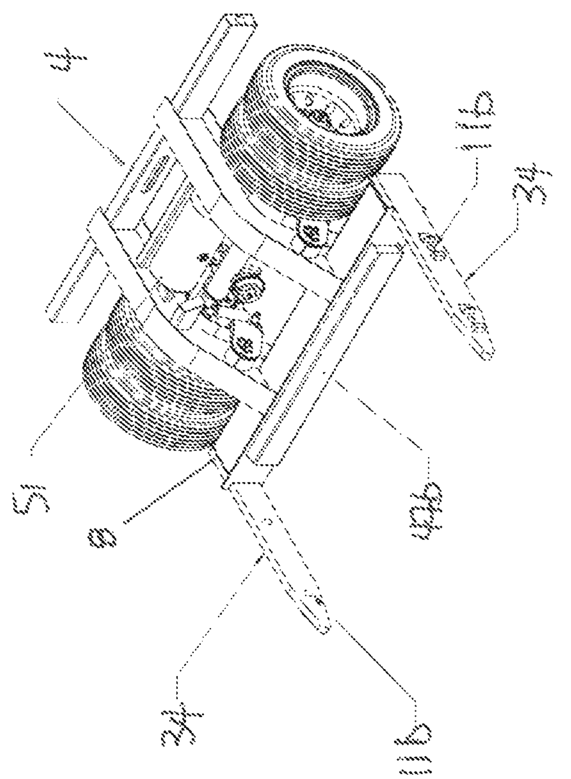
FIG. 59: shows an embodiment of a rear axle assembly according to the disclosure including pegs, a weldment and pneumatic suspension for raising or lowering the assembly to engage or disengage the pegs from a foundation.

In one embodiment the hitching assembly is a gooseneck assembly. The gooseneck assembly will comprise a gooseneck component and a base component. The gooseneck component is adapted to engage with the towing/transport vehicle and may be height adjustable. The base component is adapted to facilitate the engagement with a tiny home foundation and in addition to the one or more pegs needed for this purpose may include other structure features that ensure the stability of the trailer system, and/or provide additional support for the transport of the foundation. In one embodiment (e.g. see FIG. 57B), a weldment attached to the base of the hitching assembly is configured to engage directly into a groove channel of an end wall of a foundation. It can be understood that a weldment is essentially another form of a peg for engaging with a channel accessible from or at an end wall of the foundation. In another embodiment, a base portion is configured to mate directly into the groove channel of the end wall.

Trailer Bed—Tiny Home Foundation

A tiny home foundation is configured for use as a trailer bed in a trailer system as it is being transported and will include a top, bottom, first and second opposing ends defining the width of the foundation and first and second sides defining the length of the foundation.

In an embodiment, a foundation is about 7 to about 8.5 feet wide. In a further embodiment, the foundation is about 8 to about 8.5 feet wide. In a related embodiment, the foundation is 7, 7.25, 7.5, 7.75, 8, 8.25, or 8.5 feet wide. In a further embodiment, the foundation is about 8 to about 8.5 feet wide. In yet another embodiment, the foundation is about 12 to about 30 feet long. In a related embodiment, the foundation is about 12, 13, 14, 15, 16, 17, 18, 19, 20, 21, 22, 23, 24, 25, 26, 27, 28, 29, or 30 feet long. In yet another embodiment, the foundation is about 12 to about 30 feet long. In a yet a further embodiment, the foundation is about 12 to about 20 feet long. In another embodiment, the tiny home is about 12 to about 15 feet long.

Figure 3:
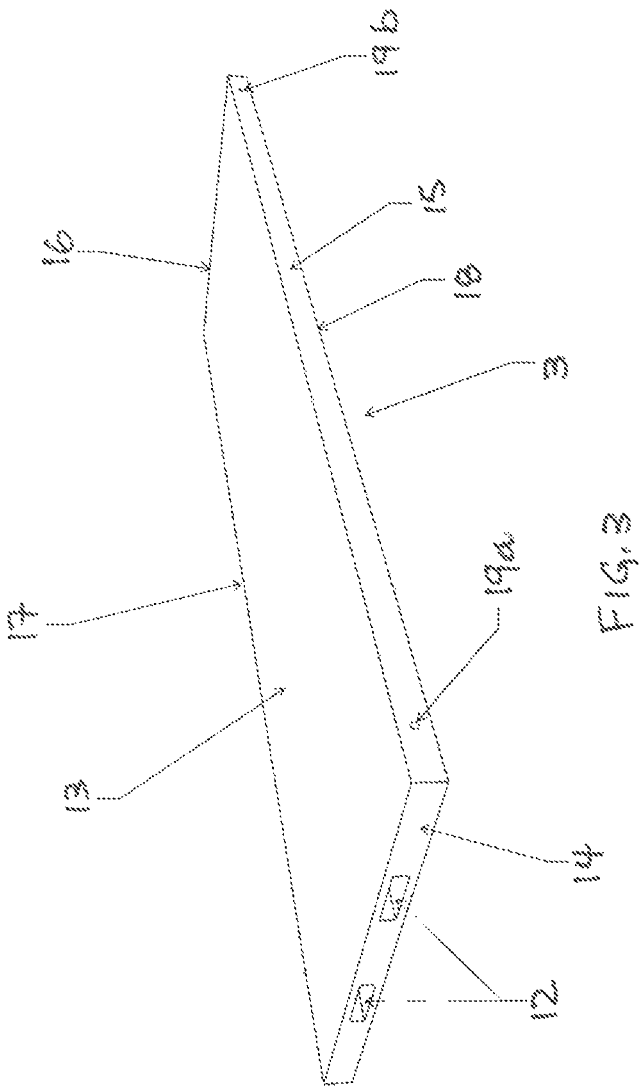
FIG. 3: shows an isometric, first end view of an embodiment of a tiny home foundation according to the present disclosure which foundation is also configured to function as a trailer bed for the tiny home.
Figure 4:
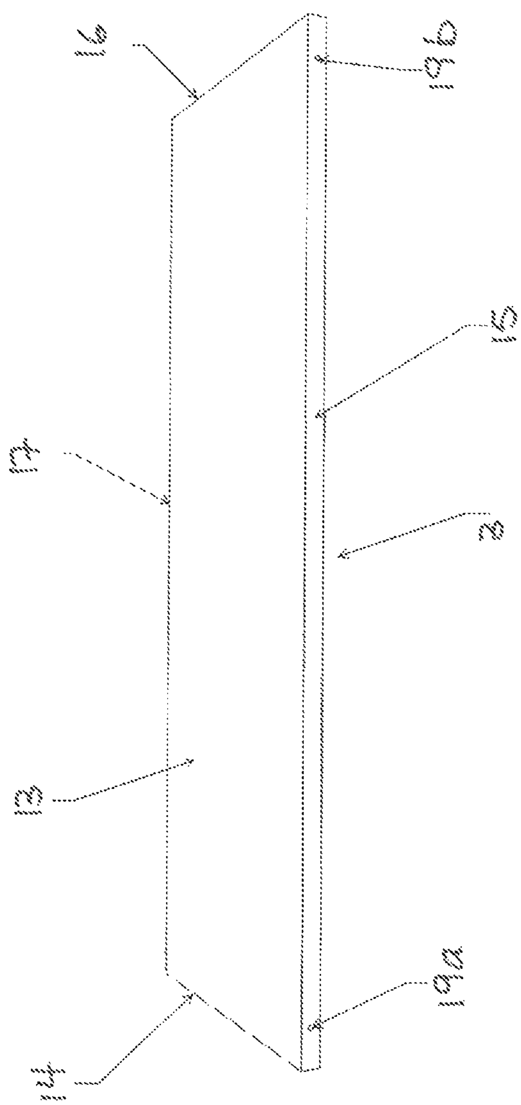
FIG. 4: shows a full length view of an embodiment of a tiny home foundation according to the present disclosure which foundation is also configured to function as a trailer bed for the tiny home.
Figure 5:
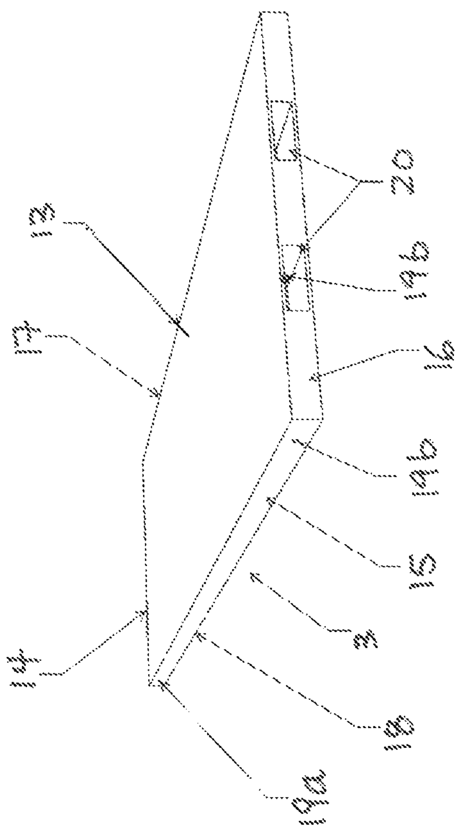
FIG. 5: shows an isometric, second end view of an embodiment of a tiny home foundation according to the present disclosure which foundation is also configured to function as a trailer bed for the tiny home.
Figure 26:
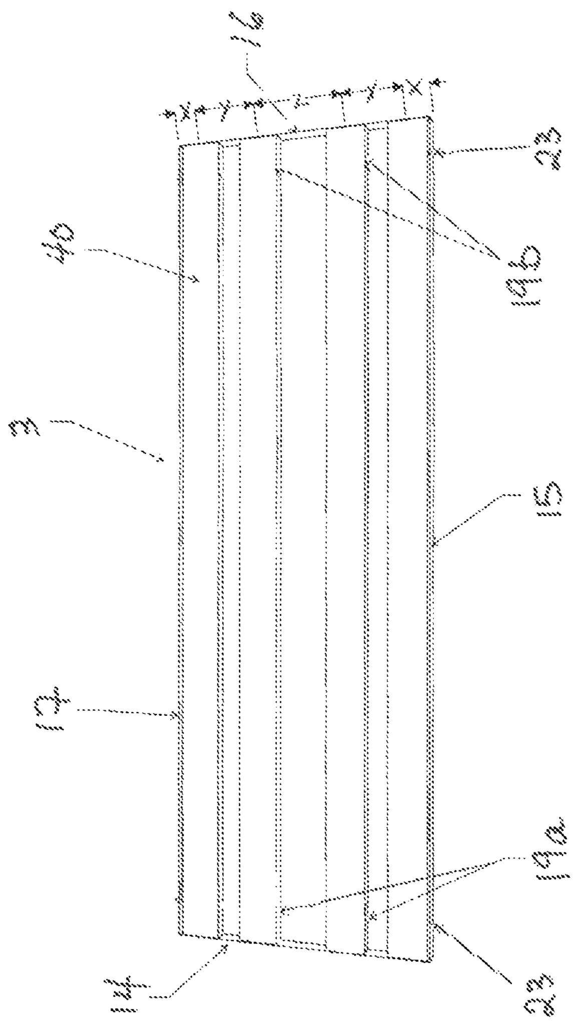
FIG. 26: shows an embodiment of a frame system for a tiny home foundation (uninsulated). The aligned pin holes running through the side walls and framing bars in between the side walls are shown and, therefore, the (channeled) path for receiving securing pins is also shown. Securing pins are shown that are shorter and do not thread through the full channeled path available. In such an embodiment, the width of the foundation may be 8 feet and the length of the foundation may be 25 feet. The 'x', 'y' and 'z' values denote the distance between the center points of framing bar which double as structures providing holes (slots) for pegs of the front hitch and rear axle assemblies. These values will vary depending on the number of framing bars used in a foundation and the positioning of pegs to be mated therewith.

Another embodiment of the tiny home foundation is illustrated in FIGS. 3-5. An embodiment of a framing system for the foundation is shown in FIG. 26. In this figure, the framing system is shown with securing pins running through each of the framing bars that span end to end along the length of the foundation between the end walls, which framing bars may or may not have at each end a slot channel for receiving peg-like structures of the front hitch and rear axle assemblies. In an alternative embodiment, the framing system may be constructed with a series of cross bars between the side walls (e.g. FIG. 55) and used to define the areas for insulated panels to be inserted there between.

A framing system may be made of steel or another suitably durable and strong material. In another embodiment, the foundation comprises an insulated steel platform upon which the tiny home is built (see FIGS. 51-54). The foundation insulation provides home energy efficiencies. The specifications of the foundation in terms of its structure and insulation can be varied in accordance with specification requirements for a given tiny home. In one embodiment the tiny home foundation is constructed to meet the specifications or standards for an energy efficient home (e.g. Energy Star™ NetZero™, R-2000™, EnerPHit™ and PHI Low Energy Building™ standards, etc.). In a related embodiment, the tiny home foundation is constructed to meet the specifications for energy efficiency required to achieve a Passive House™ (Passivehaus™) rating.

In a further embodiment, a tiny home foundation is configured to integrate into, or be a member part of a trailer system of the present disclosure. The two ends of the foundation defining the width of the tiny home provide access to one or more channels for receiving the pegs of a front hitch assembly and a rear axle assembly, respectively. In one embodiment, the channel(s) are holes (e.g. slots or cavities) with similar dimensions to the pegs and are accessed from the end walls of the foundation defining the width of the tiny home (see FIGS. 6-9).

In another embodiment, the channels of a tiny home foundation are defined by groove(s) with dimensions suitable for receiving all or a portion of the pegs of a front hitch assembly and/or rear axle assembly. The channels of this embodiment are accessed from the ends of a foundation along the side walls of the foundation defining the length of the tiny home (see FIGS. 41-54). In a related embodiment, the groove(s) will run for at least a distance equivalent to the length of the peg beginning at the corners where the side walls and end walls of the foundation meet. In another related embodiment, the grooves will run for the full length of the side walls along the exterior face of the side walls. In still another related embodiment the end walls may also provide a groove or slot for receiving a projecting structure formed as part of, or attached to the bases (e.g. weldment) of the front hitch assembly and/or rear axle assembly when the assemblies are fully engaged with the foundation. In yet a further related embodiment the full length of the side walls and end walls will be grooved to provide a continuous channel around the exterior perimeter of the foundation.

The recessed walls of groove channels along the side walls of a foundation will each have two or more pin holes positioned along their length to align with pin holes of the pegs when said pegs are partially or fully inserted into their designated side wall channel. The foundation may have more total pin holes along its side walls than needed to align with the pin holes for a given front hitch assembly and rear axle assembly. This design option may be desirable to allow for the interchangeable use of different front hitch and rear axle assemblies with a given foundation.

In one embodiment, the top wall of a foundation may be a surface without flooring component(s) or other coverings for indoor home use. In another embodiment (see FIG. 54) the top wall of the foundation may be provided by a flooring component(s) finishing the foundation surface for the interior of a tiny home.

Dolly Member—Rear Axle Assembly

A dolly member of the trailer system according to the present disclosure is referred to herein as a rear axle assembly. This member connects to an end wall of a tiny home foundation opposite an end wall where a front hitch assembly connects to the tiny home foundation, when each of said components is aligned in an end to end configuration. Similar to a front hitch assembly, a rear axle assembly also has pegs that fit into channels formed into, or as part of a wall configuration of the side and/or end walls of a tiny home foundation Depending on the placement and dimensions of the one or more pegs and corresponding channel(s), the number of pegs and channels can be selected by one skilled in the art.

In one embodiment, the axle of the rear axle assembly is a dually wheeled axle, meaning it has four tires for transporting large and heavy items. In a further embodiment the rear axle assembly is a dual axle assembly.

In another embodiment, a suspension of the rear axle assembly is an adjustable air (pneumatic) suspension system. In still another embodiment, a suspension of the rear axle assembly is an adjustable hydraulic suspension system This allows a tiny home to travel on public roads at the lowest possible height off the ground (i.e. with about six inches clearance) and be elevated as necessary upon arriving at a site for delivering the tiny home, in order to reduce the risk of bottoming-out on uneven terrain.

In one embodiment, a suspension of the dolly member can be elevated and lowered to two or more heights off the ground, ranging from about 6 to about 12 inches. The lowest level is to allow for paved road travel. The higher levels will be to facilitate travel over uneven terrains. Different levels (elevations) can also be used to facilitate coupling and decoupling of the hitching and dolly members to and from a trailer bed/tiny home foundation depending on the preference and circumstances of the user. In one embodiment, a lower elevation of a suspension is used to couple hitching and dolly members of a trailer system to a tiny home foundation.

Peg and Channel System

Peg and channel pairings of a trailer system according to the present disclosure provide a peg and channel system for supporting a tiny home foundation and any structure built on it. Each peg and channel may have a variety of shapes and sizes, so long as they are dimensioned to connect, or fit together with one another within side and/or end walls of a tiny home foundation. Each peg and channel pairing can be shorter or less deep than the less versatile fork and tube beams of the prior art that run along a substantial length in the interior of the structure being supported. In a peg and groove embodiment of the present disclosure, the peg and groove remain exterior to the interior region of the foundation found between the side and end walls. Again this increases the design options for both the pegs, channel length and for the framing and insulation of the foundation itself. One reason the present disclosure can provide for peg and channel design variation is because of the smaller dimensions of tiny homes compared to other mobile homes that require longer and wider trailer systems to transport them.

In one embodiment, the pegs of hitching and dolly members are between about 6 inches to about 6 feet long. In another embodiment, the pegs of hitching and dolly members are between about 6 inches to about 1.5 feet long. In still another embodiment, the pegs of hitching and dolly members are between about 4.5 feet to about 5.5 feet long. The corresponding channel for mating to each of the pegs will be of a similar depth to the length of the peg that is intended to be inserted into it, or deeper to accommodate a variety of peg lengths depending on the hitching and dolly members being used in a given situation.

In one embodiment, a hitching or dolly member of one trailer system may be used interchangeably with a dolly and hitching member, respectively of another trailer system because of the numerous options for configuring channels in the foundations of tiny homes such that hitching and rear axle assemblies with different numbers of pegs and/or lengths of pegs can be accommodated by a single foundation design without necessarily always having to engage with all of the channel spaces accessible from around the perimeter of a foundation.

In one embodiment, the pegs have a prismatic configuration and are paired with channels of a similarly prismatic (closed slot or open groove) configuration. In another embodiment, the pegs have a rectangular (prismatic) configuration and are paired with channels of a similarly rectangular configuration. In another embodiment a slot or groove type channel may have annular configurations and be paired with pegs having corresponding annular configurations.

Figure 6:
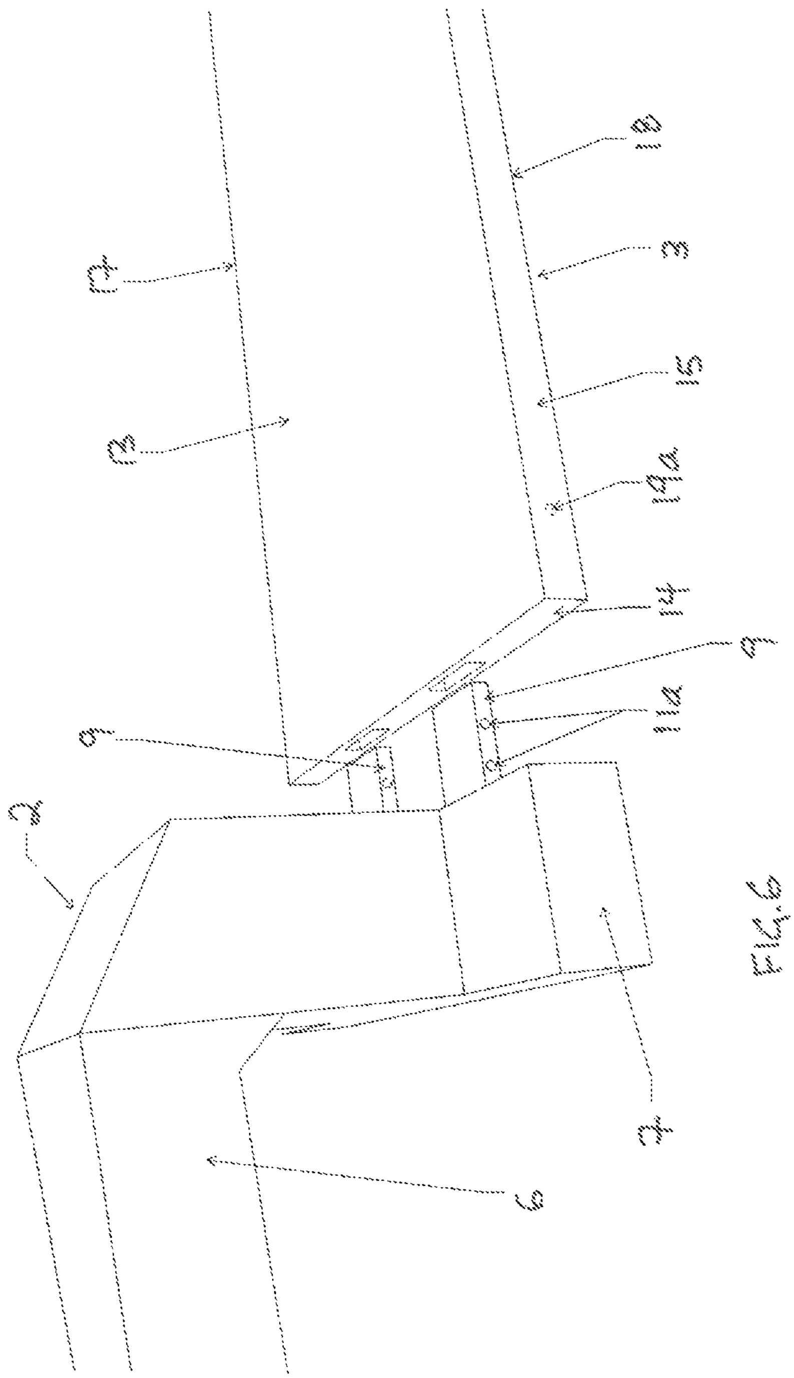
FIG. 6: shows an embodiment of a front (hitch) assembly's pegs aligned with the slots of first end of the tiny home foundation according to present disclosure.
Figure 8:
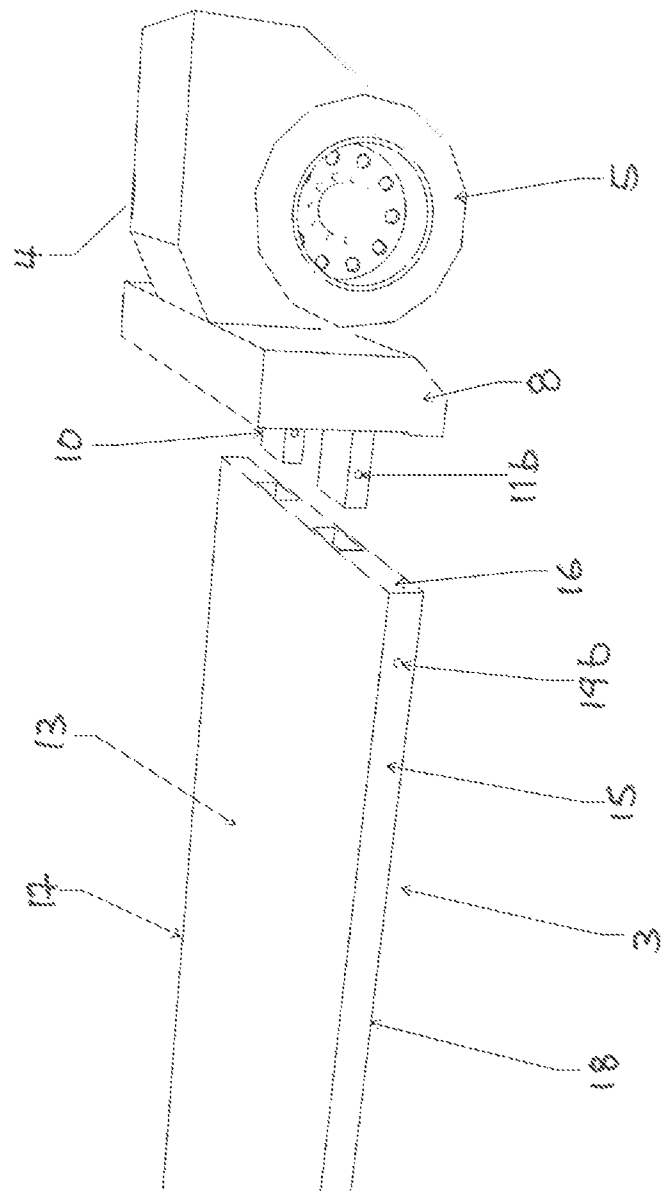
FIG. 8: shows an embodiment of a rear (axle) assembly's pegs aligned with the slots of first end of the tiny home foundation according to the present disclosure.
Figure 9:
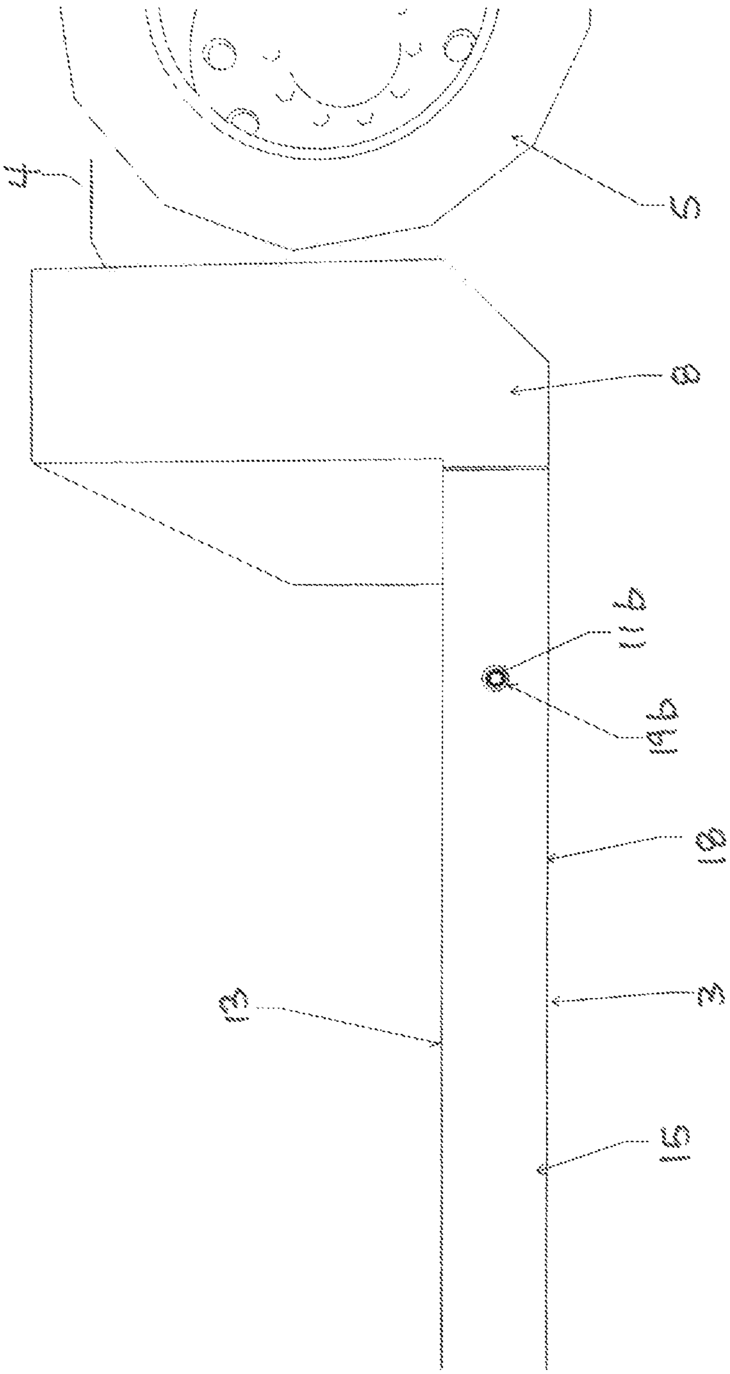
FIG. 9: shows an embodiment of a rear (axle) assembly connected with a first end of the tiny home foundation according to the present disclosure.
Figure 13:
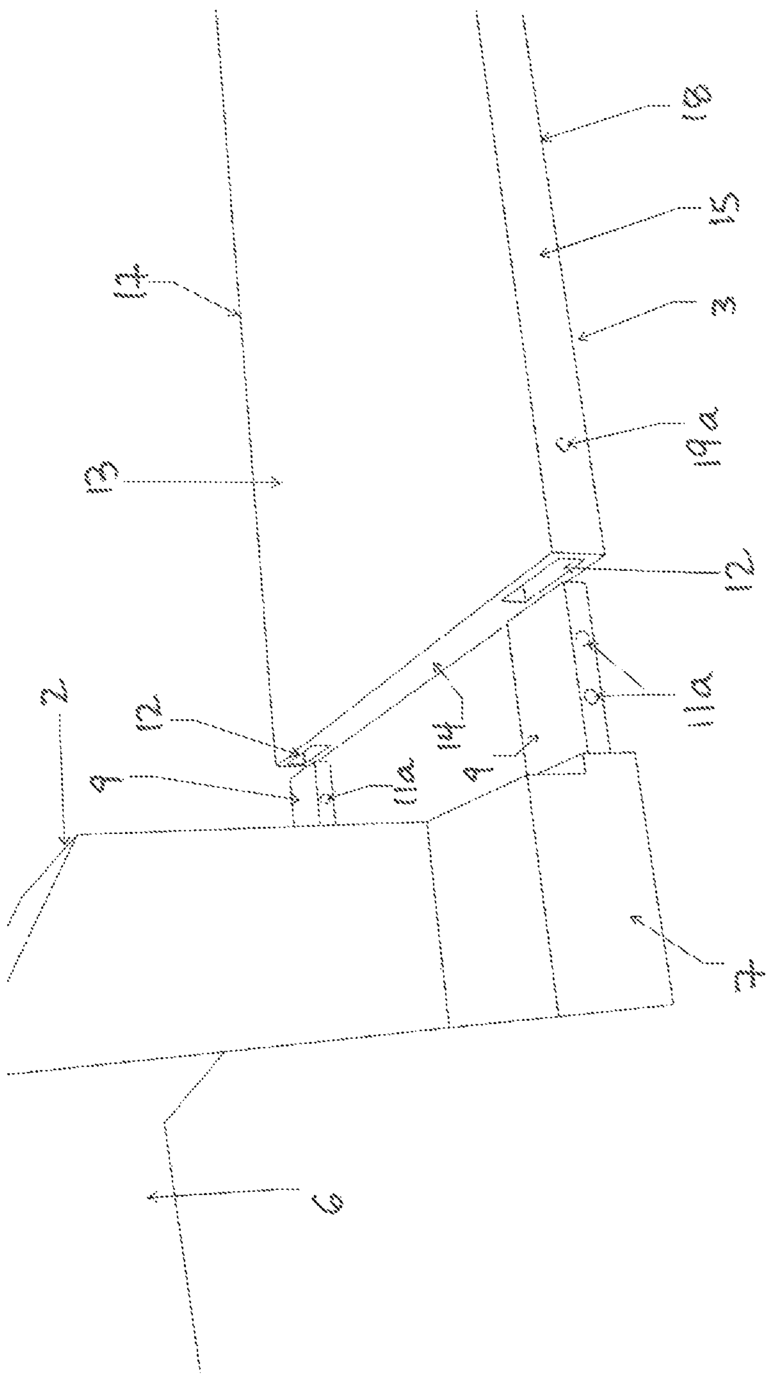
FIG. 13: shows an embodiment of a front hitch assembly with pegs aligned with the slots of a tiny home foundation.
Figure 14:
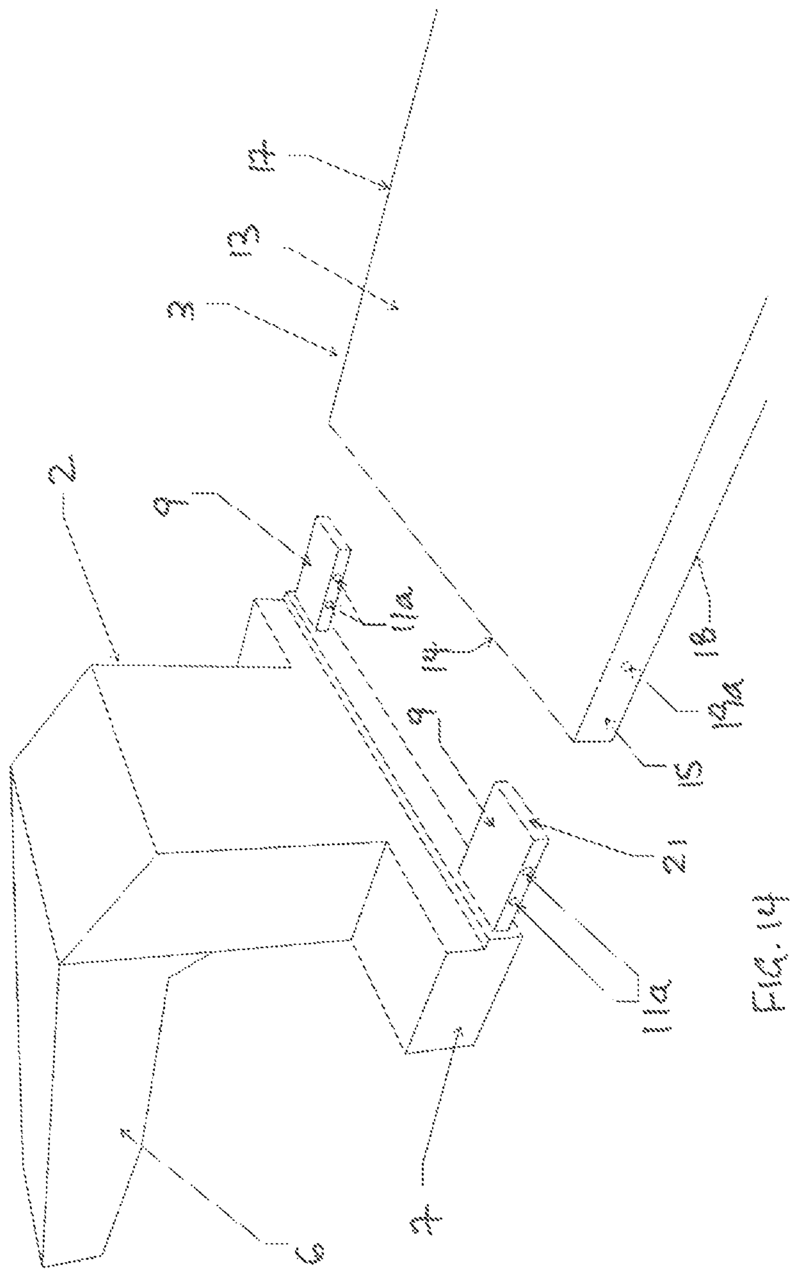
FIG. 14: shows another view of the front hitch assembly of FIG. 13.
Figure 15:
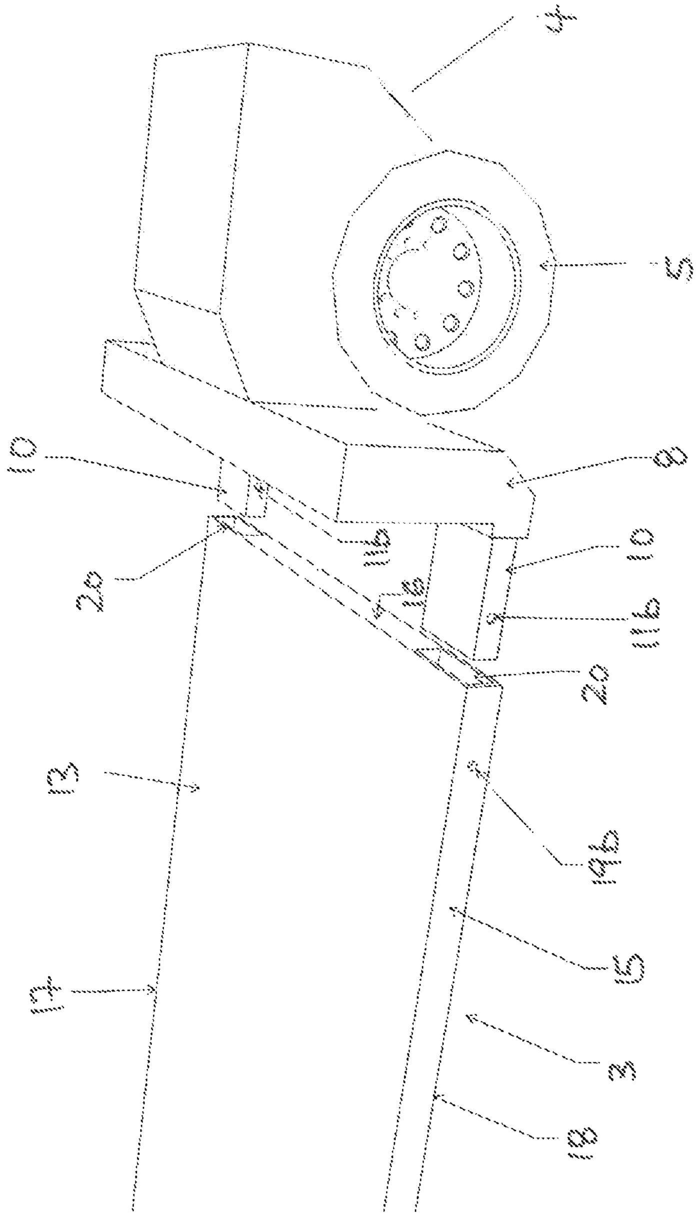
FIG. 15: shows an embodiment of a rear axle assembly with pegs aligned with the slots of a tiny home foundation.
Figure 16:
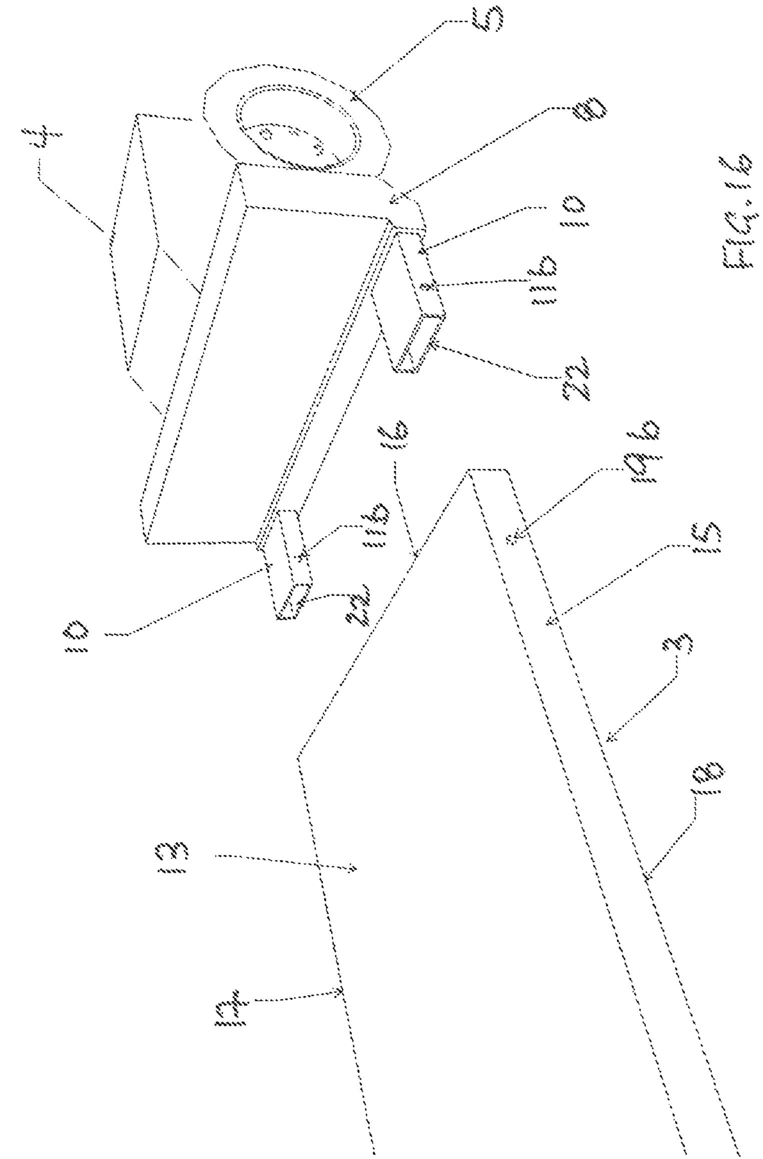
FIG. 16: shows another view of the rear axle assembly of FIG. 15.
Figure 17:
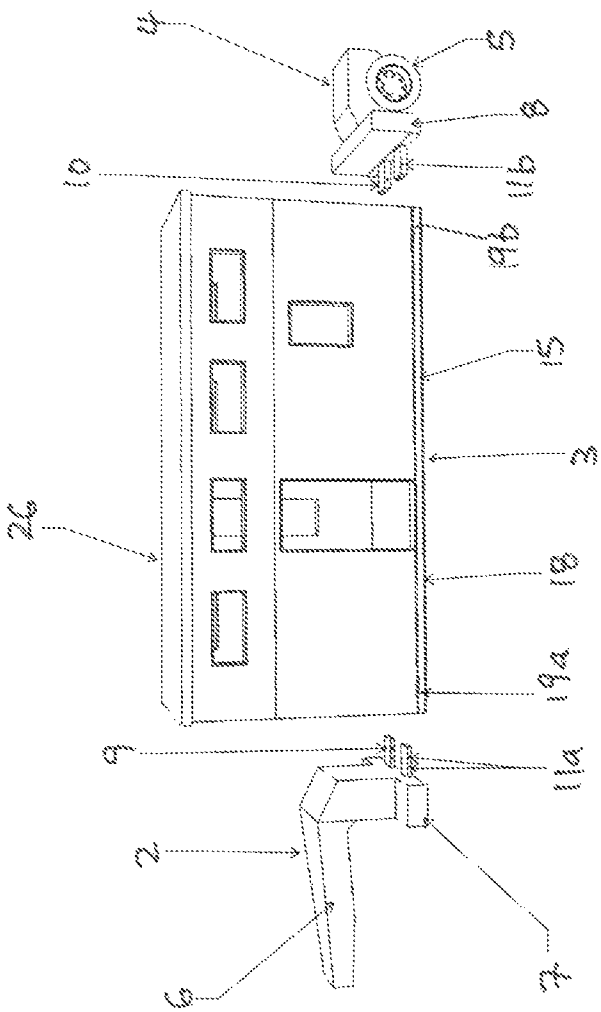
FIG. 17: shows an embodiment of a tiny home built onto a tiny home foundation that doubles as a trailer bed and depicts how the front hitch and rear axle assemblies would align with the foundation/home to be connected, secured, and otherwise made ready for transport.
Figure 18:
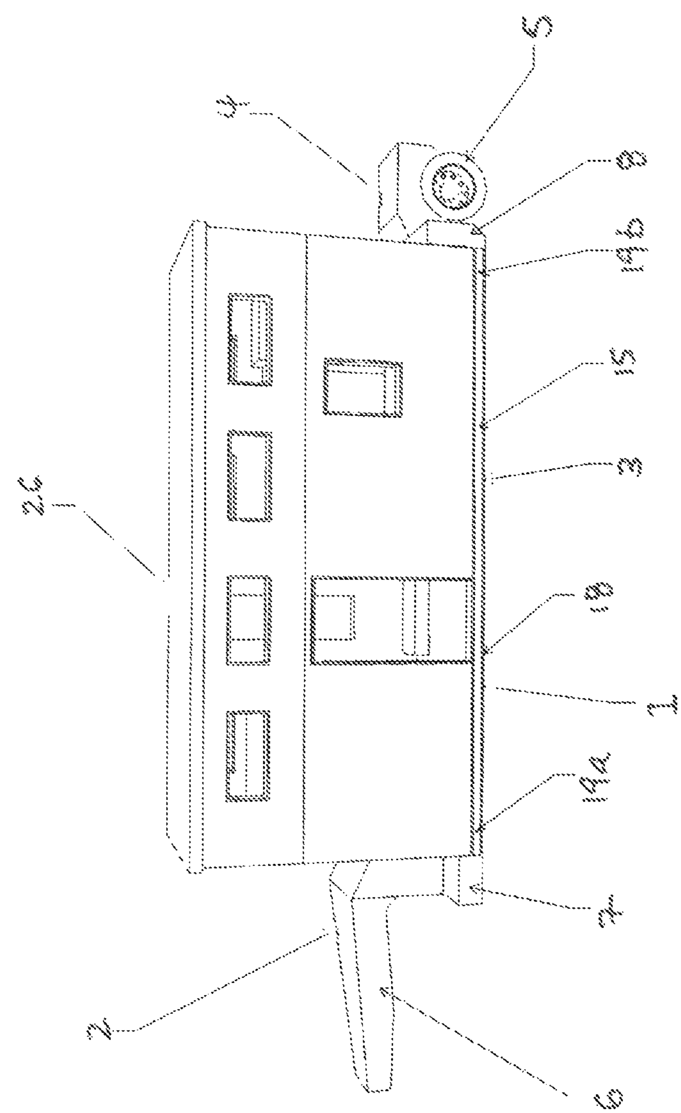
FIG. 18: shows an embodiment of a tiny home built onto a tiny home foundation assembled with the front hitch and rear axle assemblies of the trailer system according to the present disclosure, ready for transport.
Figure 19:
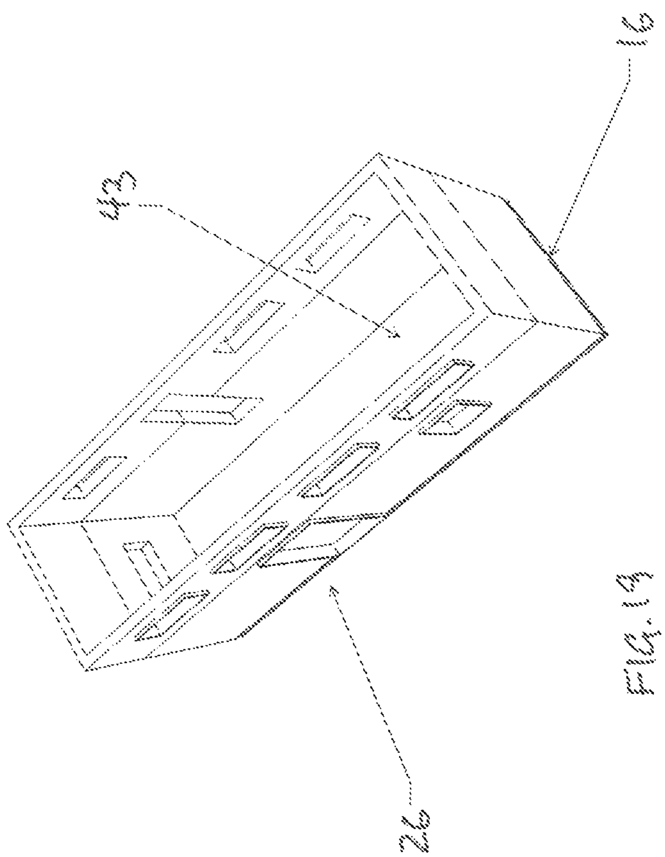
FIG. 19: shows a top view of a tiny home embodiment including the second level loft.

In one embodiment, there are one or more peg and channel pairings for connecting the various members of a trailer system according to the present disclosure. Each peg and channel pairing has dimensions suitable for supporting the weight of the tiny home depending on the number of peg and channel pairings selected by one skilled in the art. Similarly, the placement of peg and channel pairings may be varied. For example, FIGS. 6 and 8 depict a two peg/channel pairing configuration where the placement of the pegs/channels is closer to the center point of the foundation end walls compared to their placement in FIGS. 13 and 15, where they are placed along the end walls closer to the side walls of the foundation.

Figure 27:
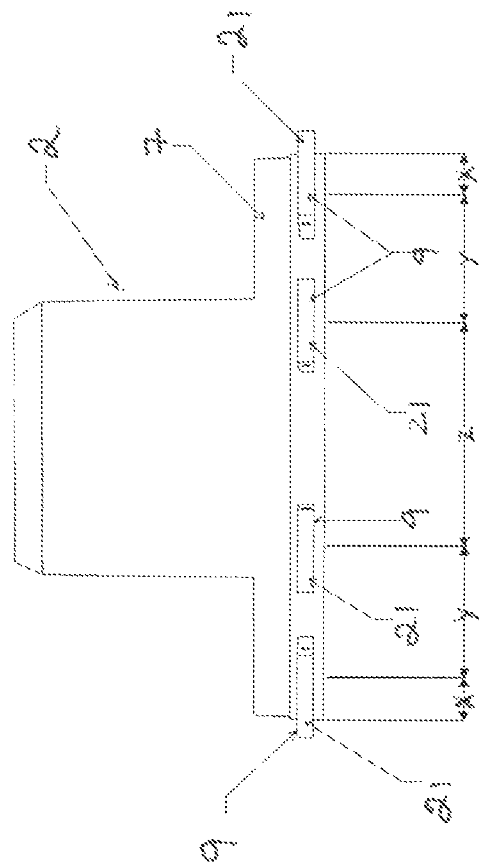
FIG. 27: shows an embodiment of a front hitch assembly with four pegs that could be mated with the framing bars with slots in a foundation shown in FIG. 26. The 'x', 'y' and 'z' values denote the distance between the center points of pegs which if mated with the slots in the framing bars of the foundation of FIG. 26 or FIG. 28 would give rise to the same 'x', 'y' and 'z' values in that figure. These values will vary depending on the number of pegs used in the front hitch assembly. In such an embodiment, the width of the front hitch assembly may be about 8 feet.

In one embodiment there is one peg and channel pairing between the front hitch assembly and tiny home foundation, and/or between the rear axle assembly and tiny home foundation. In another embodiment, there are two peg and channel pairings between the front hitch assembly and tiny home foundation, and/or between the rear axle assembly and tiny home foundation (see FIGS. 6 and 8). In a further embodiment, there are three peg and channel pairings between the front hitch assembly and tiny home foundation, and/or between the rear axle assembly and tiny home foundation. In still another embodiment, there are four peg and channel pairings between the front hitch assembly and tiny home foundation, and/or between the rear axle assembly and tiny home foundation (see FIGS. 25, 27 and 28).

In a further embodiment, the number of peg and channel pairings between the front hitch assembly and tiny home foundation, and between the rear axle assembly and tiny home foundation are the same. In still a further embodiment, the number of peg and channel pairings between the front hitch assembly and tiny home foundation, and between the rear axle assembly and tiny home foundation are different. It is also to be understood that the form or configuration of a given peg and channel pairing need not be replicated in an identical manner for other peg and channel pairings used in the trailer system.

For example, in the case of single peg and channel pairing at each of the front hitch assembly/foundation interface and/or rear axle assembly/foundation interface, a peg and hole (e.g. slot) configuration may be provided where the width of the peg and hole run along a more substantial portion of the width (end wall) of the tiny home foundation. By way of another example, when there are two peg and channel pairings at a given hitching or rear axle assembly to foundation interface, a peg and hole configuration (see FIGS. 6 and 8), or a peg and groove configuration (e.g. FIGS. 46-48, and 55) may be selected. In another embodiment, the peg and channel pairings configured for connecting a front hitch assembly to a tiny home foundation can be different than the configuration of peg and channel pairings used to connect the same foundation to a rear axle assembly.

In a further embodiment, the tiny home foundation has one or more holes in the end walls defining the width of a tiny home foundation, with dimensions suitable for securely receiving the pegs of a front hitch assembly and/or a rear axle assembly, respectively. In this embodiment the peg surfaces adjacent the channel wall(s) of the hole(s) will be close enough to said channel wall(s), to minimize movement of the peg within the channel once secured, and may or may not contact (abut) one or more surfaces of the channel wall(s).

In still another embodiment, a tiny home foundation has two or four grooves along the side walls defining the length of the tiny home foundation, with dimensions suitable for securely receiving the pegs of the front hitch assembly and rear axle assembly, respectively. In this embodiment the peg surfaces adjacent the channel wall(s) of the grooves will be close enough to said channel wall(s), to reduce destabilizing movement of the peg within the channel once secured, and may or may not contact (abut) one or more surfaces of the channel wall(s). The fit between the peg and groove is such so as to ensure the trailer system can transport a foundation (and tiny home) over various terrains without damaging the foundation or home. This requires being able to maintain the plane of the foundation defined by axes running in between the side and end walls of the foundation in a substantially parallel orientation relative to the ground plane of the terrain when the trailer system is stationary and during transport using the trailer system.

In yet another embodiment, the pegs of a front hitch assembly and a rear axle assembly can be secured in the channels of a tiny home foundation using pins that pass through holes in the peg and channel walls. Each pin is locked into place using one or more structures at an end of the pin cooperating with one more structures of the side wall(s) of the foundation including, at or otherwise adjacent to the pin holes used to receive the pins. For example, see FIGS. 22-26, 32-40, 49-50 and 56C. This allows for transport of the tiny home foundation (or home), as well as the two assemblies (hitching and dolly members) independent of the foundation.

In one embodiment, there are holes passing through each of the pegs and channel side walls to allow for pins or other securing means (e.g. nut and bolt systems) to secure different component parts of a trailer system. Such sets of holes passing through peg and channel pairings (via channel walls) are in a linear alignment configuration designed to allow the holes of pegs to be aligned with the holes of channel side walls and thereby create a guided passage (channel) for a securing means to be threaded there through and secure the structures of a peg and foundation together.

In a related embodiment, there is one hole through the peg and one hole through a first side wall of a channel (slot or groove) that can be aligned to receive a securing pin or bolt there through. In another related embodiment, there are two holes through first and second opposing channel (slot) side walls that can align with the hole through a peg to receive a securing pin or bolt there through. In a further related embodiment, there are two or more sets of holes in a linear alignment through the walls of a corresponding channel for aligning with the holes of pegs of variable lengths. Longer pegs may have one or more sets of holes along their length in order to provide for multiple points that can be used to secure a trailer system when assembled, depending on the depth of the channels in a tiny home foundation.

In another embodiment, one assembly (of the front hitch or rear axle assemblies) has hollow pegs that are larger than the pegs of the other assembly. In this embodiment, the smaller pegs are configured to fit securely into the channel formed in the larger, hollow pegs.

Connecting Member

Figure 10:
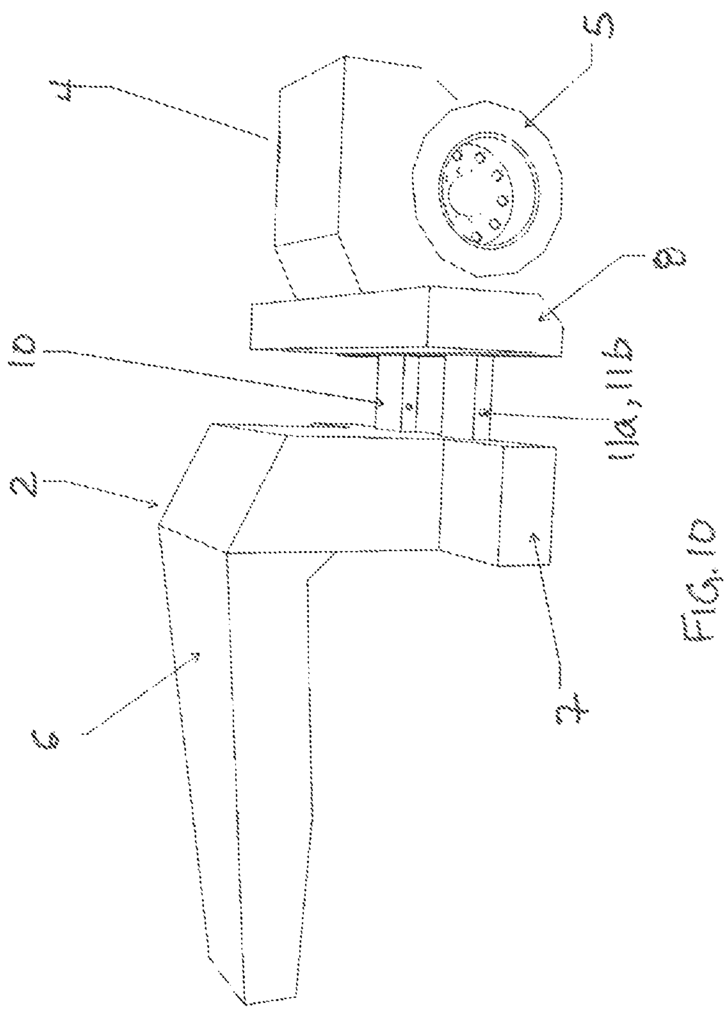
FIG. 10: shows an embodiment of front hitch and rear axle assemblies connected for transport. In this embodiment, the pegs of one assembly are inserted into the hollow pegs of the other assembly.

In one embodiment, when a tiny home foundation is not integrated as part of the trailer system, the front hitch and rear axle assemblies of the trailer system can be connected directly to each other for transport (e.g. see FIG. 10).

In another embodiment, the front hitch and rear axle assemblies can be secured for transport or storage in the absence of a foundation (e.g. before or after delivery of the foundation using a connecting member, such as tubing, a (spreader) bar, sleeve, or other structure configured to receive the pegs of the hitching and rear axle assemblies, a connecting member for connecting the hitching and dolly members to each other for transport in the absence of the foundation In still a further embodiment, the front hitch and rear axle assemblies of a trailer system can be connected to each other using a connecting member configured with channels laid out and dimensioned analogous to those of a tiny home foundation used with said assemblies.

Figure 29:
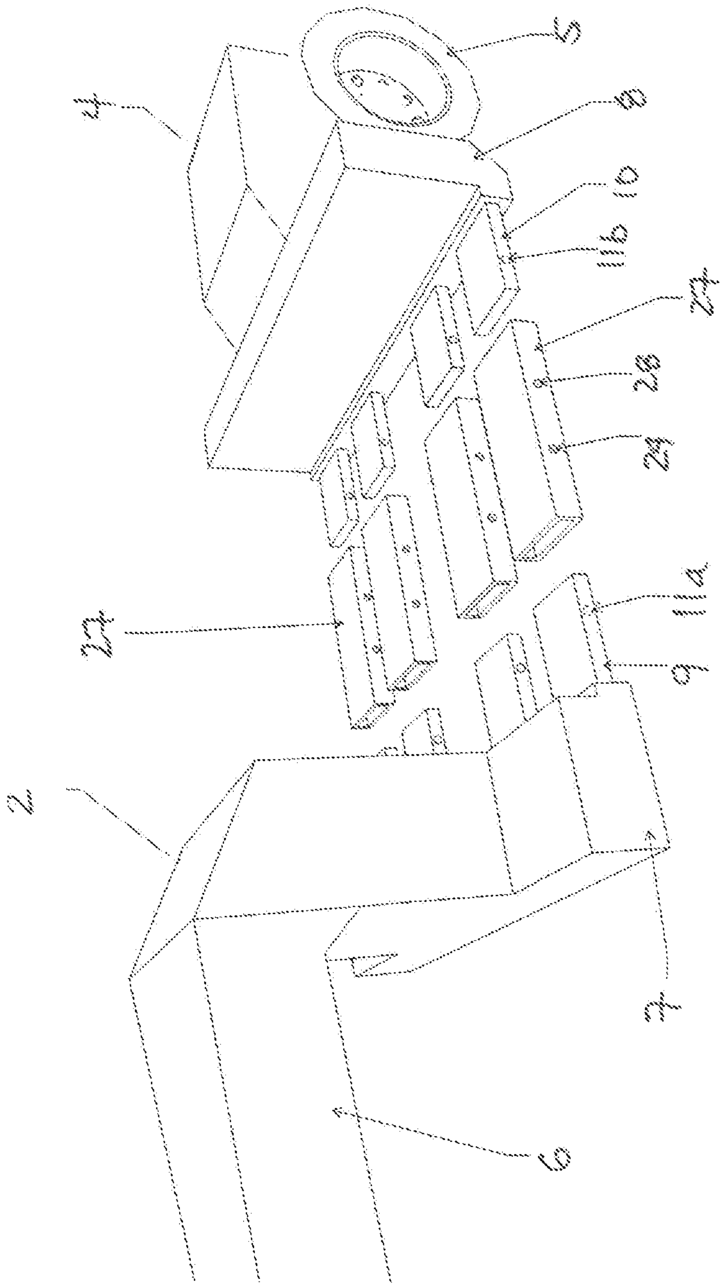
FIG. 29: shows embodiments of a front hitch assembly and a rear axle assembly aligned with an embodiment of connecting members according to the present disclosure. The connecting members of the illustrated embodiment are essentially prismatic tubing or slots into which the pegs of the two assemblies can be inserted to secure the two assemblies for transport without the tiny home foundation.

In the embodiment of FIG. 29, the pegs of the two assemblies have the same dimensions and, therefore, either end of a foundation or connecting member may receive the pegs from either assembly. In another embodiment, when the pegs of the front hitch and/or rear axle assemblies have different dimensions, the channels of the foundation of a trailer system and connecting members will be configured with channels with similarly varied dimensions in order to receive said pegs. In a related embodiment when peg dimensions vary, it may be that said pegs can only be inserted into the channels of one of the two ends of the foundation of a trailer system, or connecting member.

Figure 30:
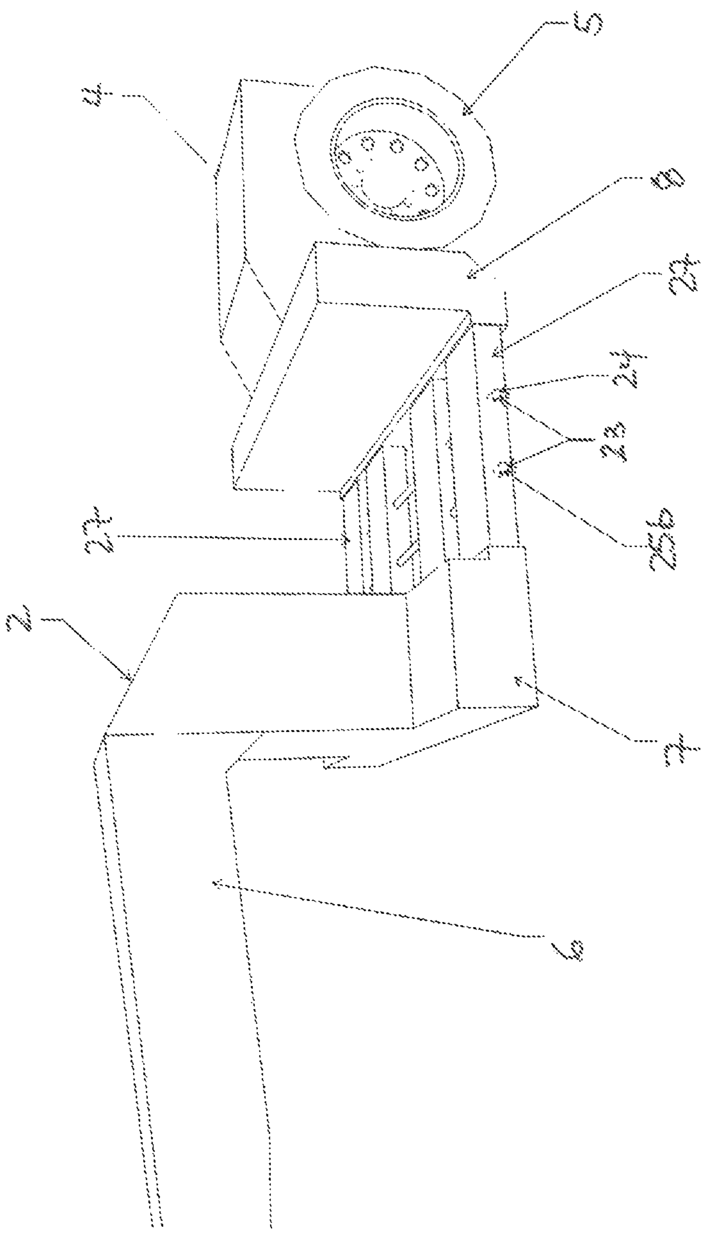
FIG. 30: shows an isometric view of the front hitch assembly and the rear axle assembly connected to the connecting members of FIG. 29 and secured with pins.
Figure 31:
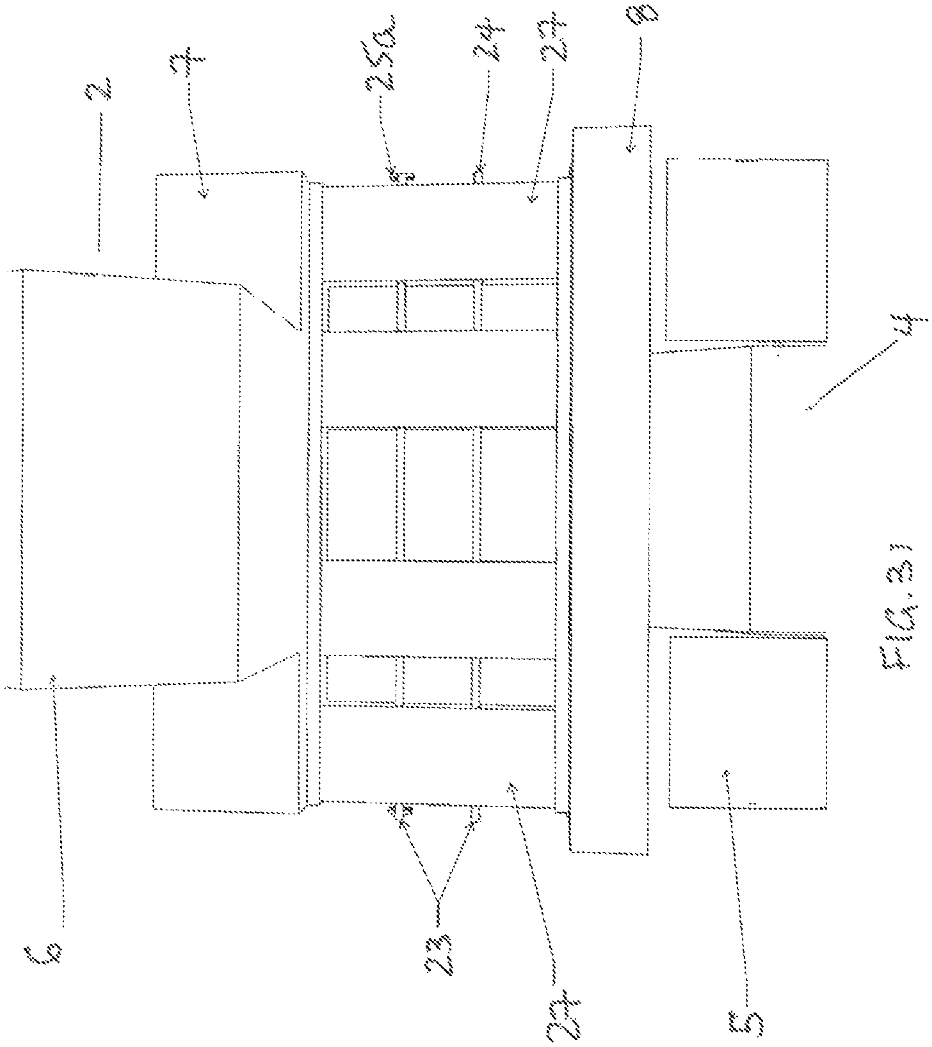
FIG. 31: shows a top view of the front hitch assembly and the rear axle assembly connected to the connecting members of FIG. 29 and secured with pins.
Figure 32:
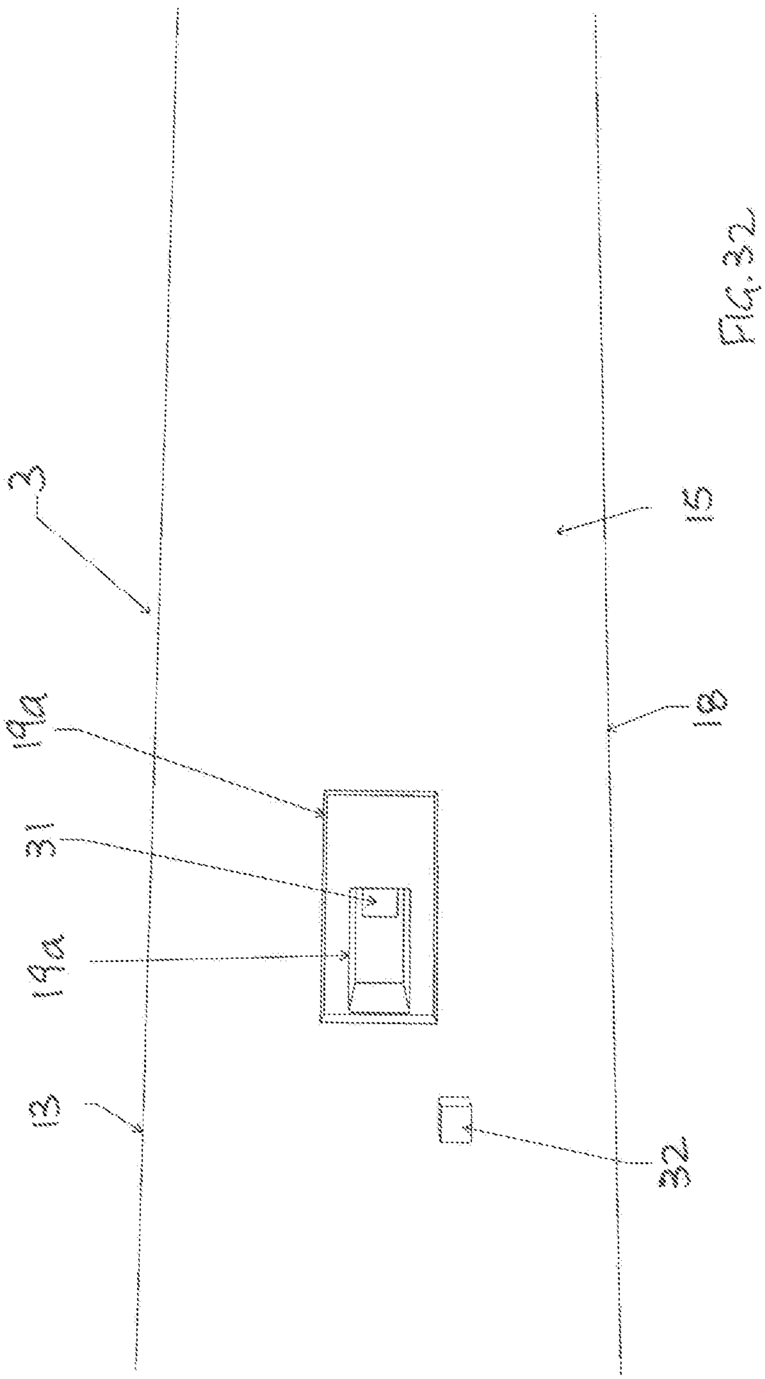
FIG. 32: shows an embodiment of pin holes through the slot walls of a tiny home foundation depicting the path (channel) for the insertion of a securing pin.
Figure 33:
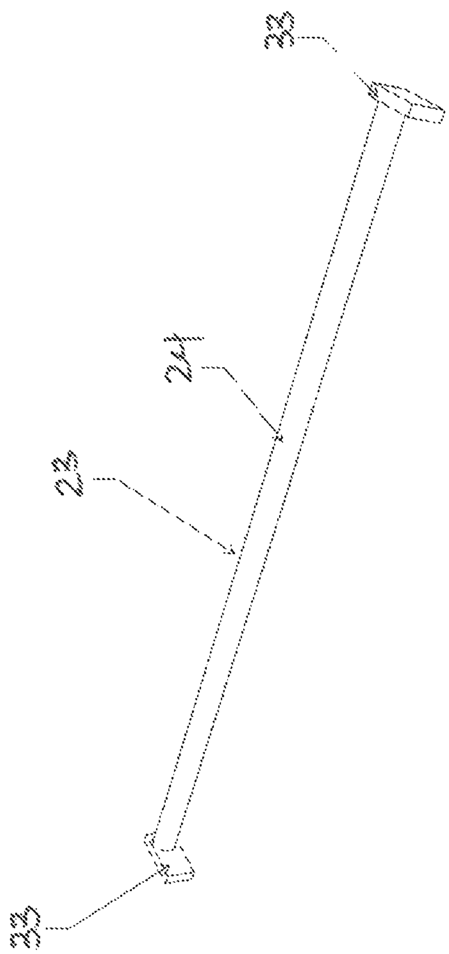
FIG. 33: shows an embodiment of a securing pin suitable for passing through the pin holes of FIG. 32.
Figure 34:
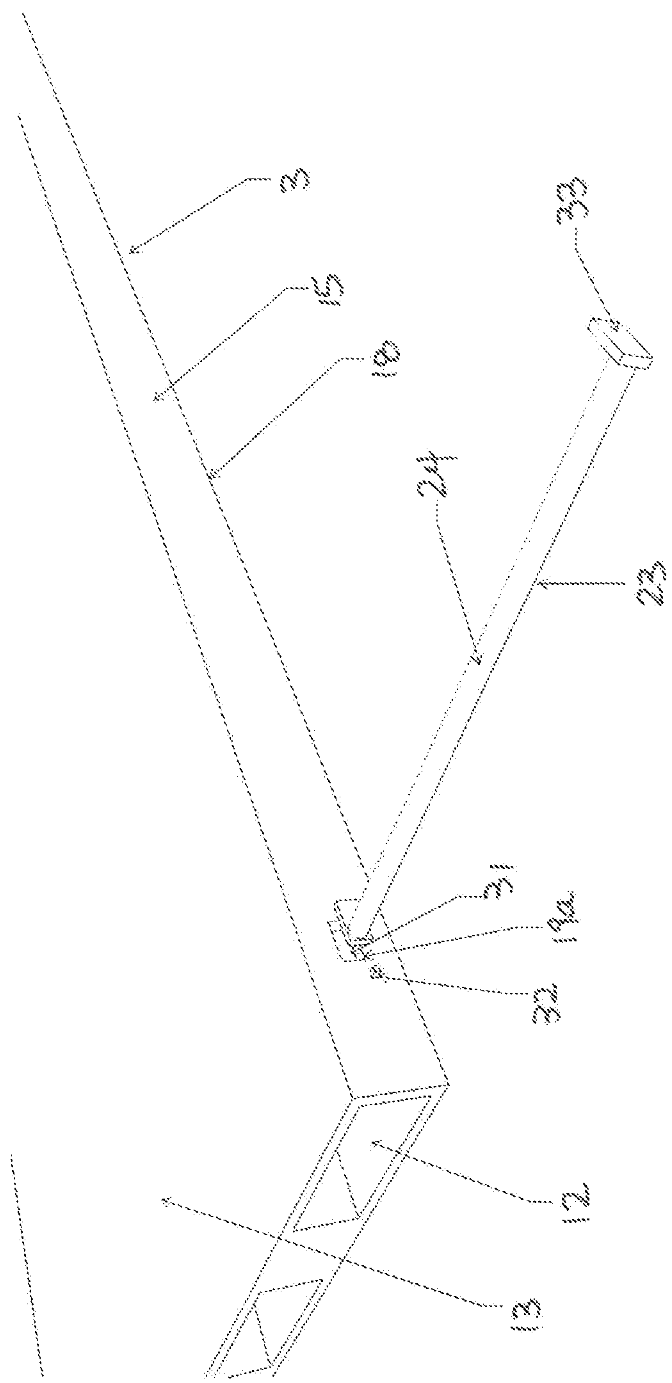
FIG. 34: shows the lining up of the pin of FIG. 33 with the pin holes of FIG. 32.
Figure 35:
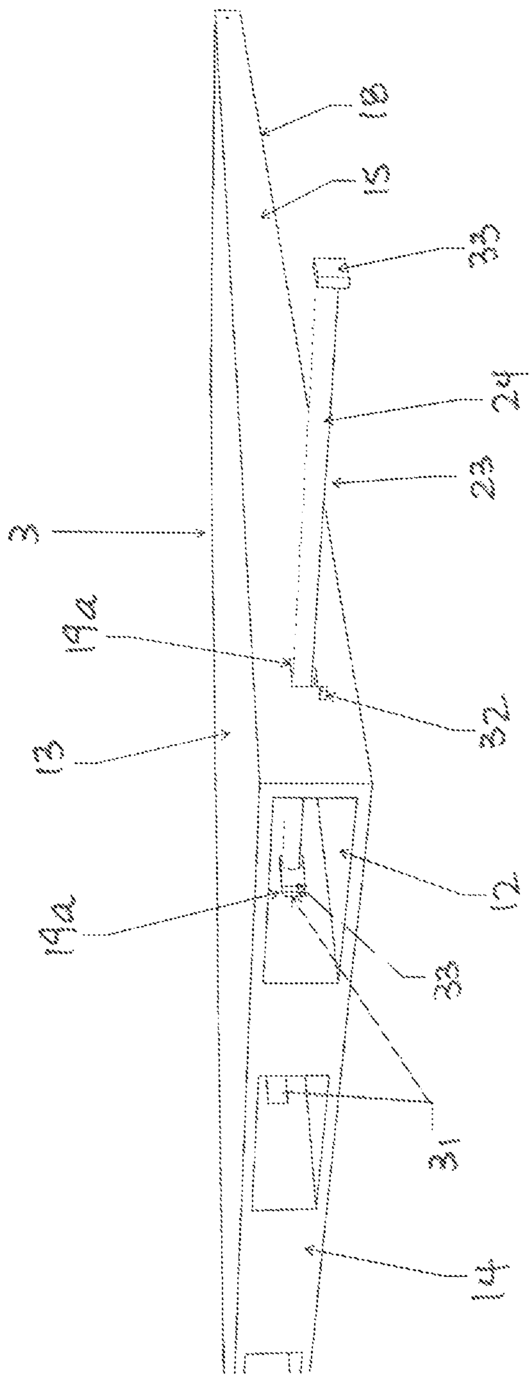
FIG. 35: shows the partial insertion of the pin of FIG. 33 into the pin holes of a first slot of the foundation.
Figure 36:
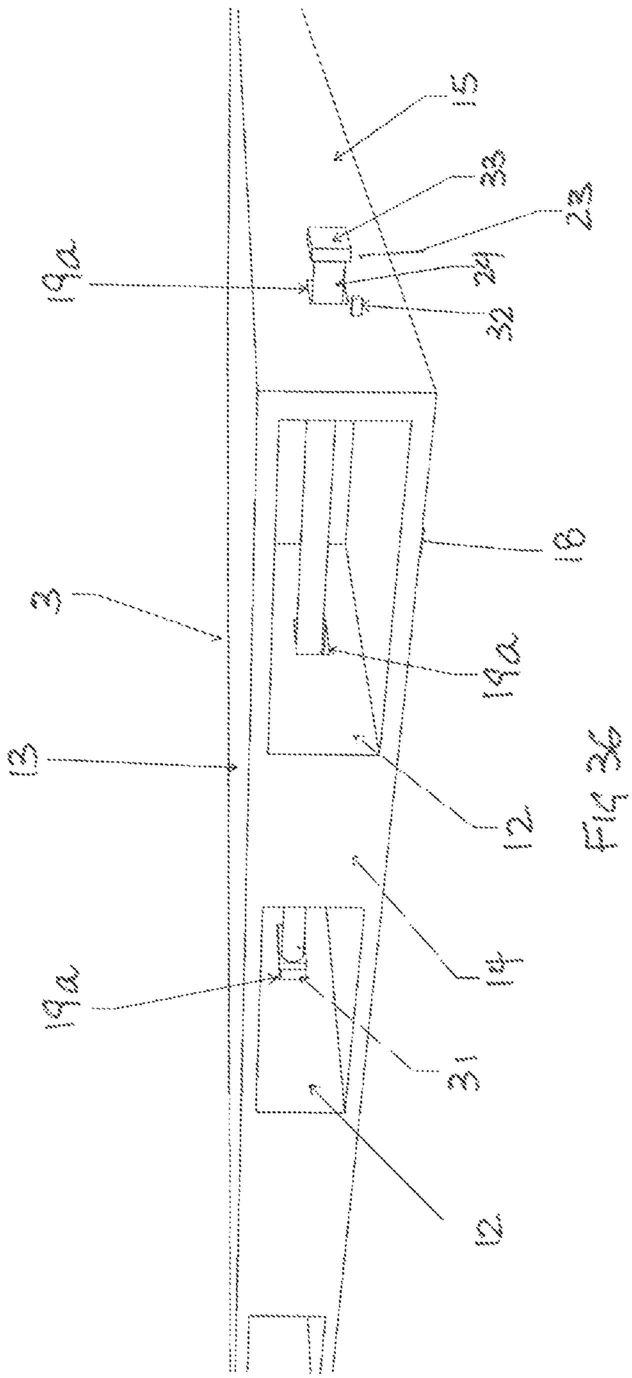
FIG. 36: shows the partial insertion of the pin of FIG. 33 into the pin holes of a second slot of the foundation.
Figure 37:
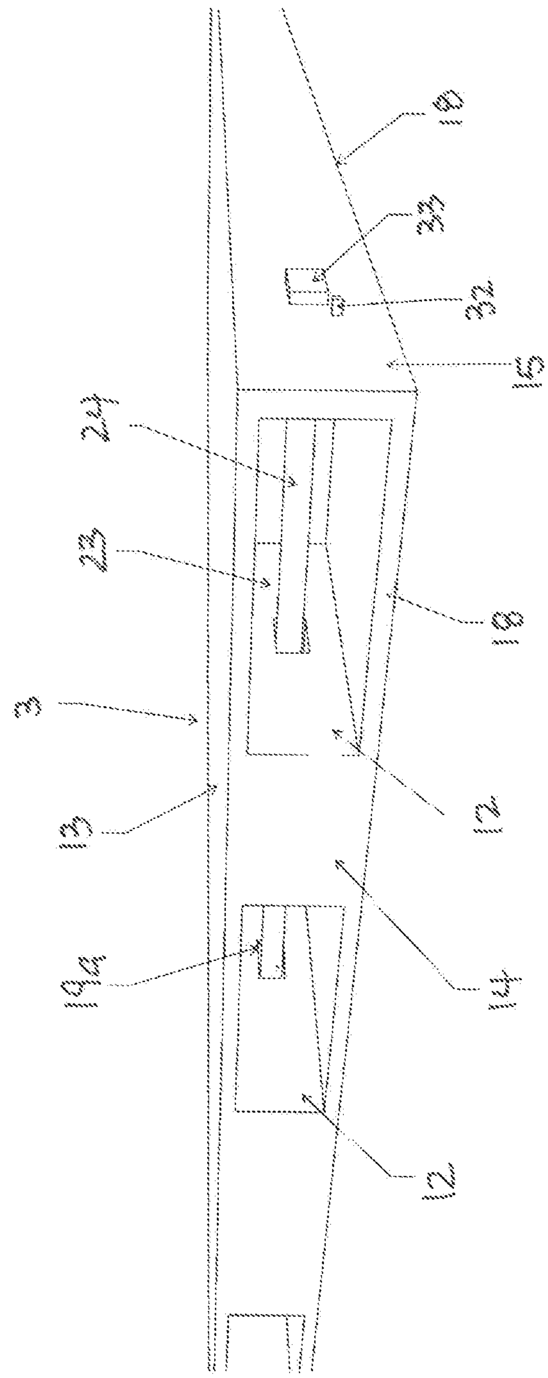
FIG. 37: shows the complete insertion of the pin of FIG. 33 through the pin holes of two slots of the foundation before being secured therein.
Figure 38:
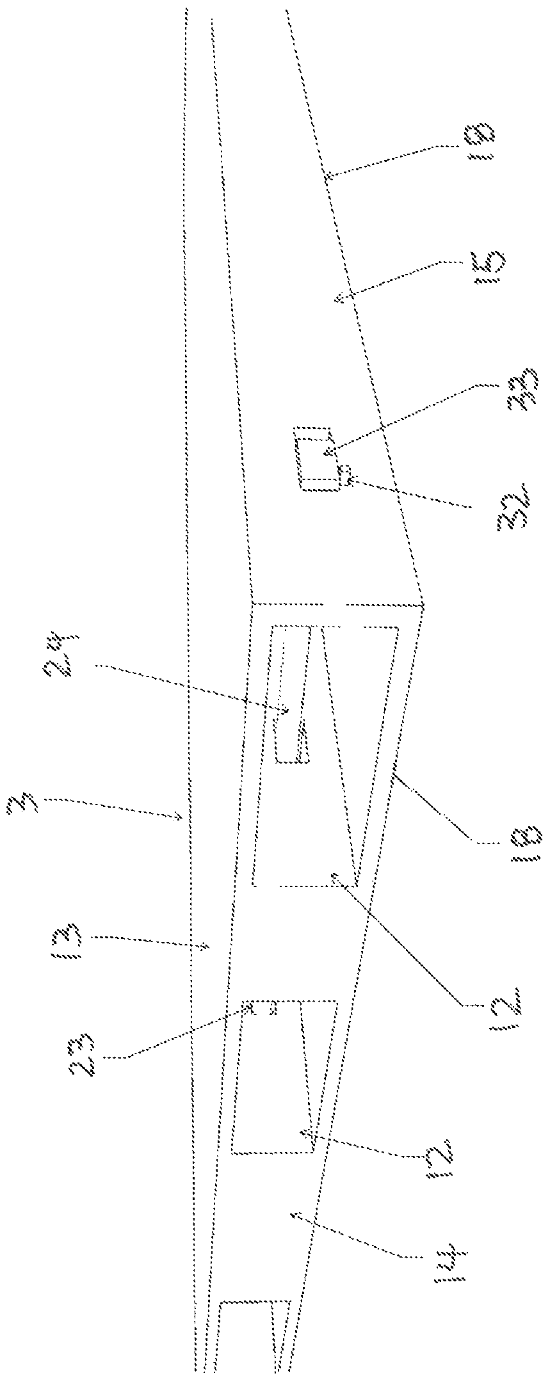
FIG. 38: shows a view of the complete insertion of the pin of FIG. 33 through the pin holes of two slots of the foundation after being secured therein.
Figure 39:
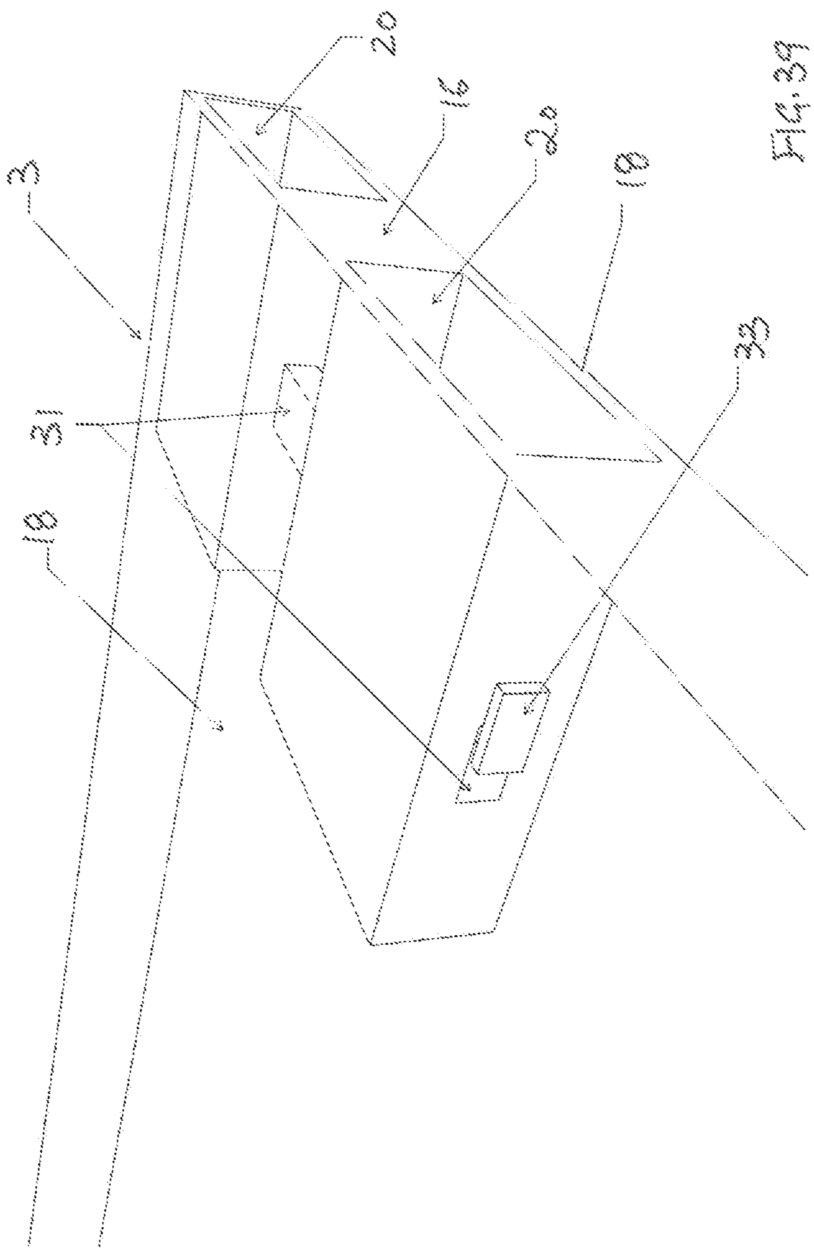
FIG. 39: shows a view of a portion of an embodiment of a foundation's interior configuration to accommodate the complete insertion and locking of the pin of FIG. 33 through the pin holes of two slots of the foundation.
Figure 40:
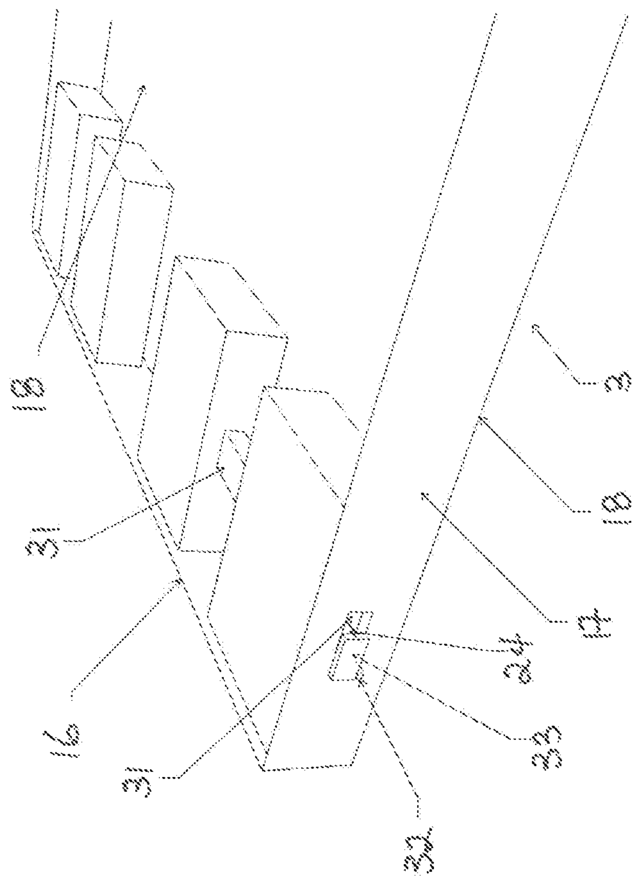
FIG. 40: shows another view of a portion of an embodiment of a foundation's interior configuration to accommodate the complete insertion and locking of the pin of FIG. 33 through the pin holes of two slots of the foundation.

In a related embodiment, a connecting member may be a single tube open at both ends into which a peg from both the front hitch and rear axle assemblies of a trailer system may be inserted. In this embodiment, the tube functions as a sort of sleeve for the pegs (see FIGS. 29-31). In a further embodiment, a connecting member may have different sized channels to accommodate different sized pegs. In still another embodiment, a connecting member may comprise an internal wall (not shown) to separate channels at opposing ends of the connecting member, each channel being configured to be mated to or otherwise receive pegs from the front hitch and rear axle assemblies of a trailer system. In another related embodiment, a connecting member may be a unitary structure comprising multiple opposing pairs of channels connected together along their length for receiving pegs from the front hitch and rear axle assemblies of a trailer system.

In yet a further embodiment, front hitch and rear axle assemblies can be secured to each other, or to a connecting member using the same locking (securing) means (e.g. securing pins, or bolts) used to secure said assemblies to a tiny home foundation.

In still a further embodiment, when a connecting (spreader bar) is used for securing pegs and attaching the front hitch and rear axle assemblies for transport in the absence of a foundation, the length of the connecting bar will be a length at least long enough to accommodate the full lengths of the pegs of the two assemblies.

In another embodiment the connecting member will be long enough to accommodate varying peg lengths of different front hitch and rear axle assemblies to accommodate the interchangeability of assemblies for use as part of a trailer system according to the present disclosure.

Uses

When a trailer system of the present disclosure is assembled, a tiny home foundation that doubles a trailer bed and home built (in whole or in part) on top of the foundation can be transported riding low to the ground. In one embodiment, a tiny home foundation integrated into a trailer system of the present disclosure rides about 6 inches off the ground. In another embodiment, a rear axle assembly has an adjustable (e.g. pneumatic, hydraulic) suspension in order to ensure the ride height of a tiny home foundation is maintained at a sufficient elevation to clear different road, and off-road ground topologies to minimize the risk of damaging a tiny home on different terrains.

These three member parts of the trailer system can be made using steel to support the tiny home. In one embodiment, the trailer system is used to transport a tiny home that can weigh from about 6000 to about 20000 lbs. In another embodiment, the tiny home weights from about 6000 to about 15000 lbs. In yet another embodiment, the tiny home weighs from about 8000 to about 15000 lbs. In still another embodiment, the tiny home weighs from about 8000 to about 12000 lbs.

In an embodiment, the trailer system is used to transport a tiny home that is about 7 to about 8.5 feet wide. In a further embodiment, the tiny home is about 8 to about 8.5 feet wide. In yet another embodiment, the tiny home is about 12 to about 30 feet long. In a yet a further embodiment, the tiny home is about 12 to about 20 feet long. In another embodiment, the tiny home is about 12 to about 15 feet long.

In another embodiment, the trailer system is used to transport a partially built tiny home, such as the shell or 'box" of the home without being configured on the inside for occupancy. This option is available for home owners who wish to undertake the interior design and building on site, once the shell of the tiny home has been delivered.

In yet another embodiment, the trailer system is used to transport a tiny home fully configured on the interior and ready for occupancy upon being delivered to a desired location. In a related embodiment, the tiny home once delivered can be further expanded to create a larger footprint for living by building additions on site.

Figure 20:
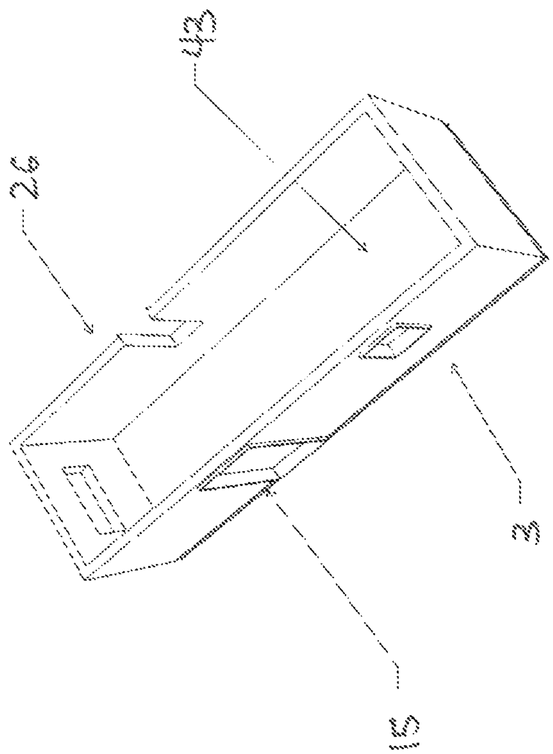
FIG. 20: shows a top view of a tiny home embodiment showing the main level layout. In such an exemplary embodiment, the home may be 25 feet long, 8 feet wide and the first level of the home, 7 feet, 4 inches high.
Figure 21:
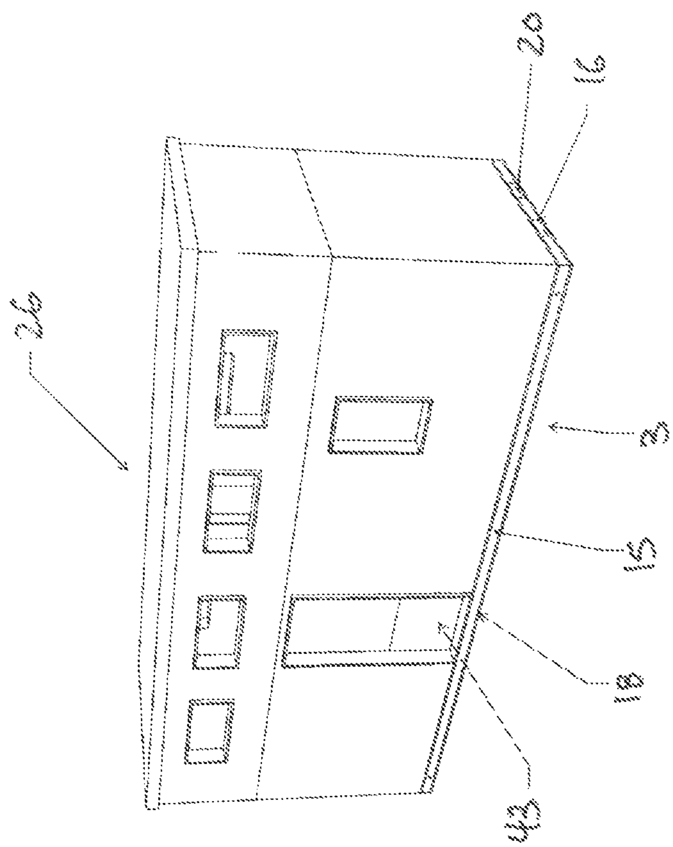
FIG. 21: shows an isometric view of an embodiment of a tiny home exterior (based on the home shown in FIG. 19). In such an exemplary embodiment, the home may be 25 feet long, 8 feet wide and 13 feet high (first and second levels, where the first level has 6 feet, 4 inches clearance the second level, 5 feet, 2 inches clearance and a dividing ceiling/floor accounting for the difference to make up the total height).
Figure 22:
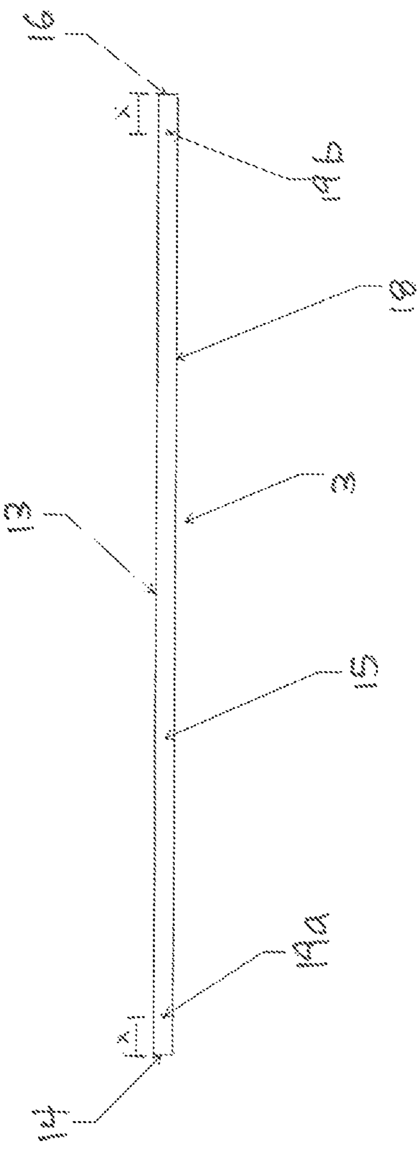
FIG. 22: shows a side view of an embodiment of a tiny home foundation and the distance from the end walls to the center of pin holes in the side walls as defined by the value 'x'. In such an exemplary embodiment the height (thickness) of the foundation may be 6 inches.
Figure 23:
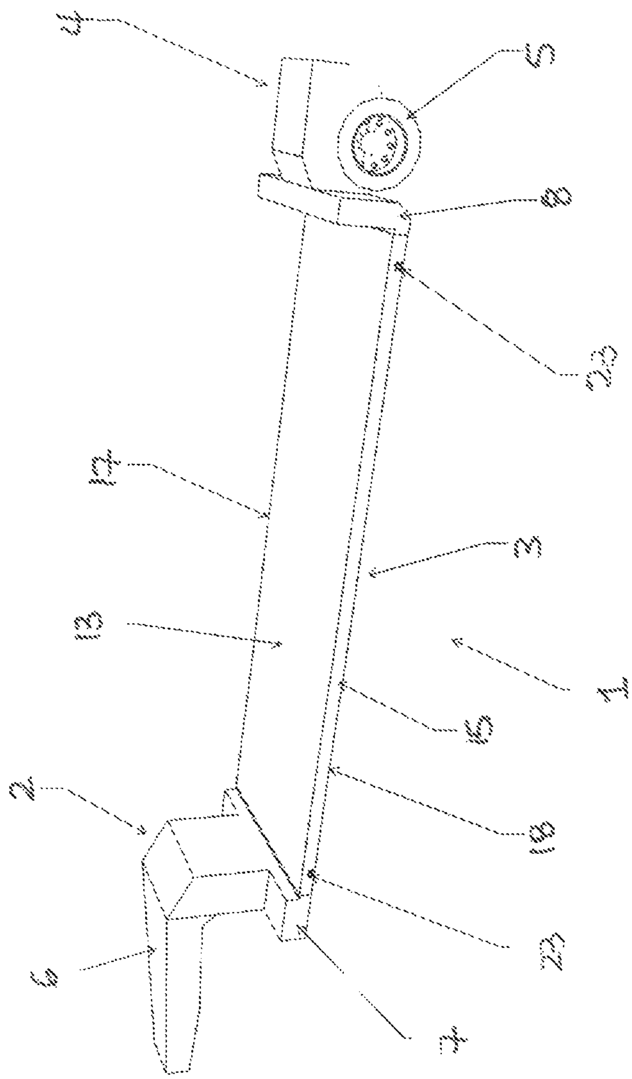
FIG. 23: shows an isometric view of an embodiment of an assembled trailer system according to the present disclosure including pins securing the front hitch and rear axle assemblies connected to the tiny home foundation.
Figure 24:
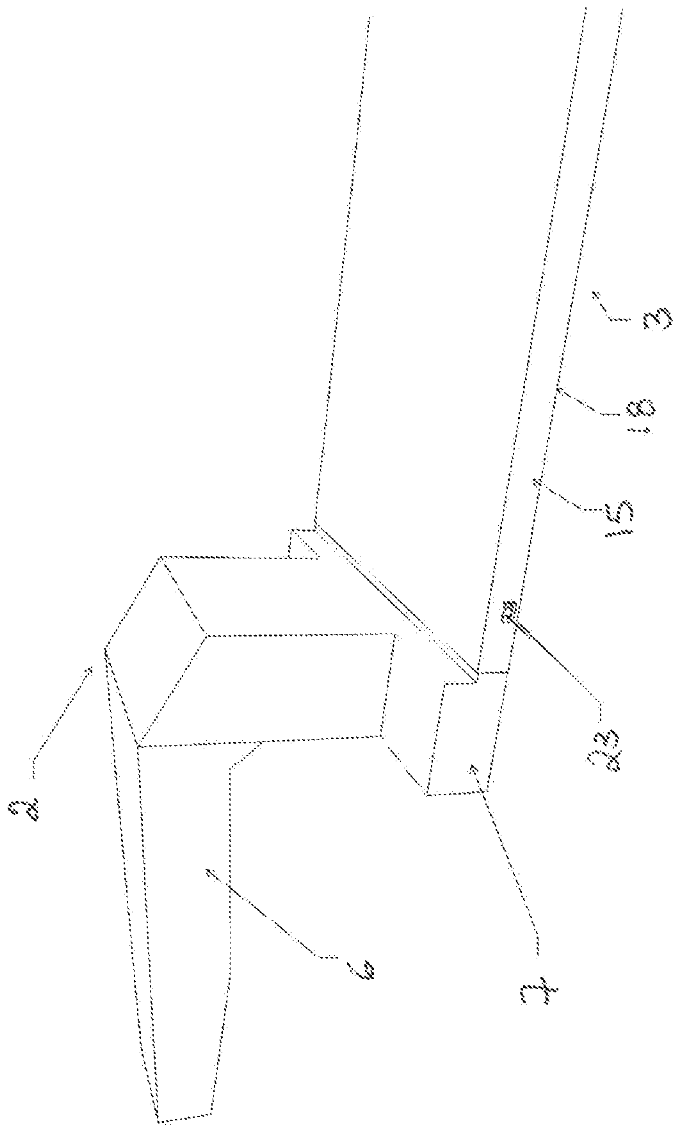
FIG. 24: shows a magnified view of the pin securing the front hitch and rear axle assemblies connected to the tiny home foundation in FIG. 23.

In still another embodiment, the trailer system is used to transport a tiny home that is about 7 to about 8.5 feet wide. In a related embodiment, the tiny home is 7, 7.25, 7.5, 7.75, 8, 8.25, or 8.5 feet wide. In a further embodiment, the tiny home is about 8 to about 8.5 feet wide. In yet another embodiment, the tiny home is about 12 to about 30 feet long. In a related embodiment, the tiny home is about 12, 13, 14, 15, 16, 17, 18, 19, 20, 21, 22, 23, 24, 25, 26, 27, 28, 29, or 30 feet long. In a yet a further embodiment, the tiny home is about 12 to about 20 feet long. In another embodiment, the tiny home is about 12 to about 15 feet long. A tiny home layout based on a width of about 8 feet and length of about 25 feet is shown in FIG. 20.

To gain a better understanding of the invention described herein, the following examples are set forth. It will be understood that these examples are intended to describe illustrative embodiments of the invention and are not intended to limit the scope of the invention in any way.

EXAMPLES

The following examples provide exemplary, non-limiting embodiments of the trailer system according to the present disclosure.

Example 1: Tiny Home Trailer System and with Peg and Slot Coupling System

When using the trailer system 1 of the present disclosure, the front hitch assembly 2 is connected to the vehicle (not shown) that will tow the tiny home. With reference to FIGS. 1-16, either of the front hitch or rear axle assemblies may be connected to the tiny home foundation first.

Figure 7:
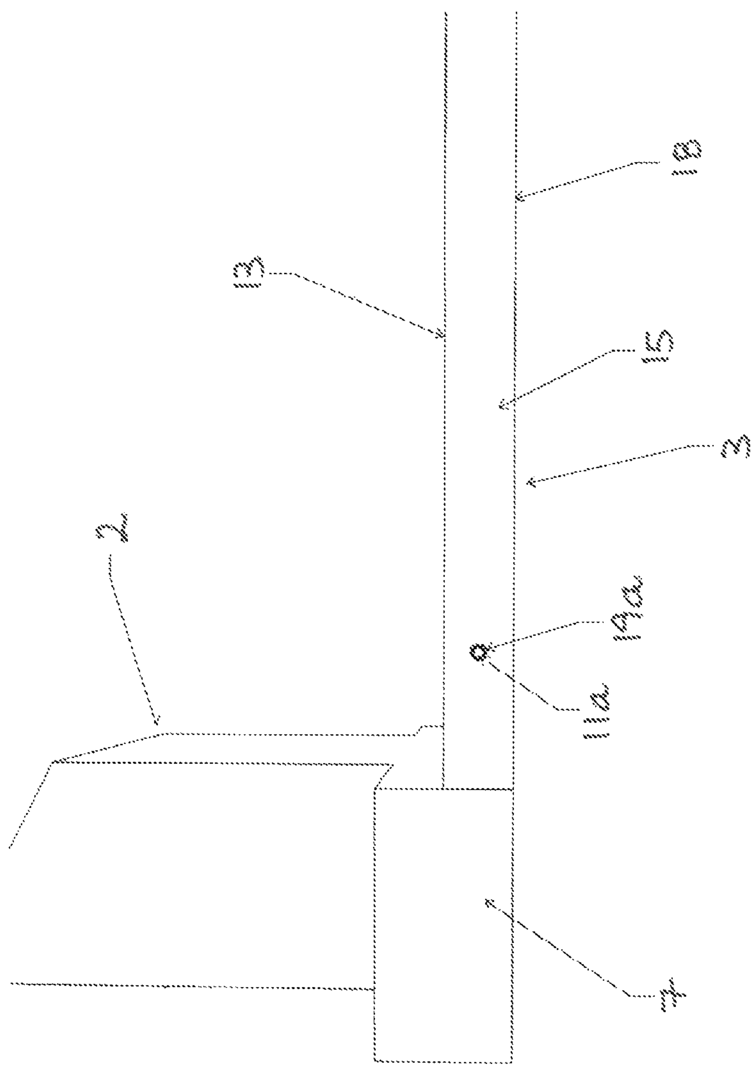
FIG. 7: shows an embodiment of a front (hitch) assembly connected with a first end of the tiny home foundation according to the present disclosure.

In one embodiment, the front hitch assembly 2 is connected to the tiny home foundation 3 first. It is moved close to one end 14 of the tiny house foundation 3 and the rectangular (prismatic) pegs 9 are fitted into the slots (cavities) 12 formed in the tiny home foundation (FIGS. 6 and 7). One skilled in the art will appreciate that the dimensions of the slots 12 need only be large enough to receive the pegs so that, once the pegs are secured, the tiny home can be safely transported with minimal lateral movement during transport.

Figure 25:
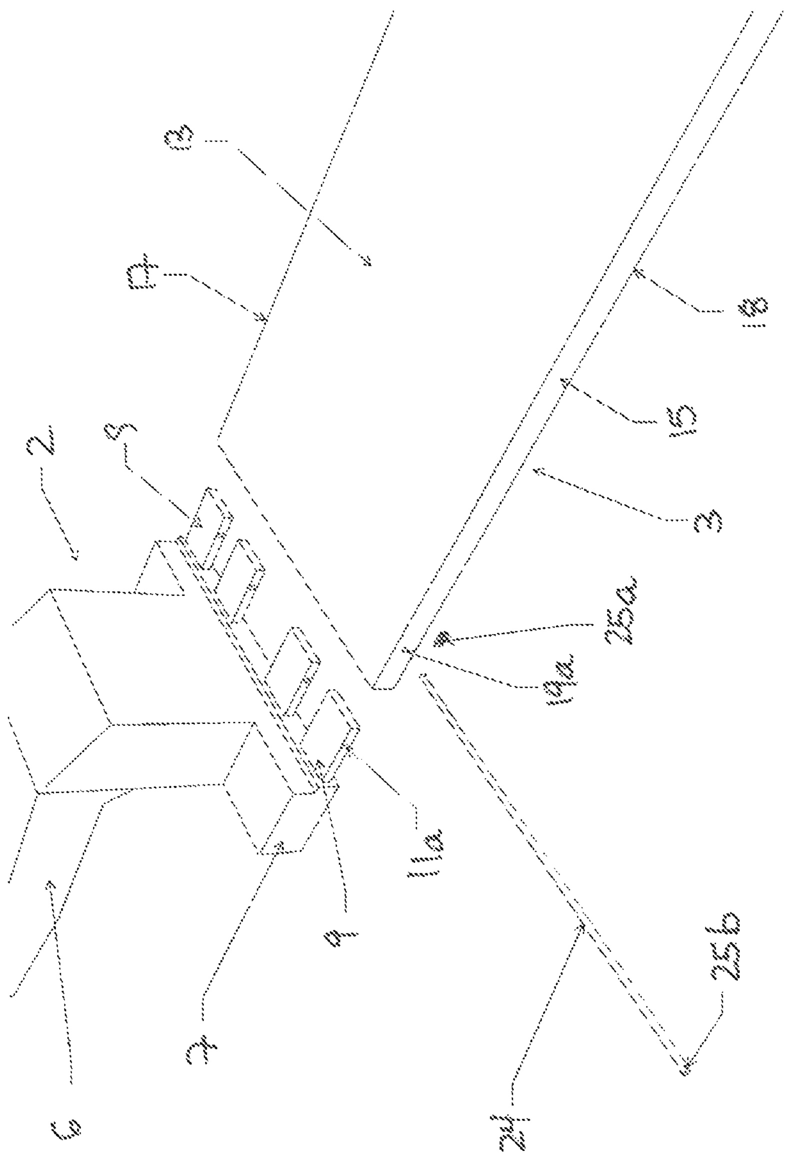
FIG. 25: shows how an embodiment of a front hitch assembly, tiny home foundation and securing pin line up prior to being secured by the pin. In this embodiment the pin is intended to go all the way through the width of the foundation to the other side. Also shown is the means for securing the pin into the trailer system at both ends.
Figure 28:
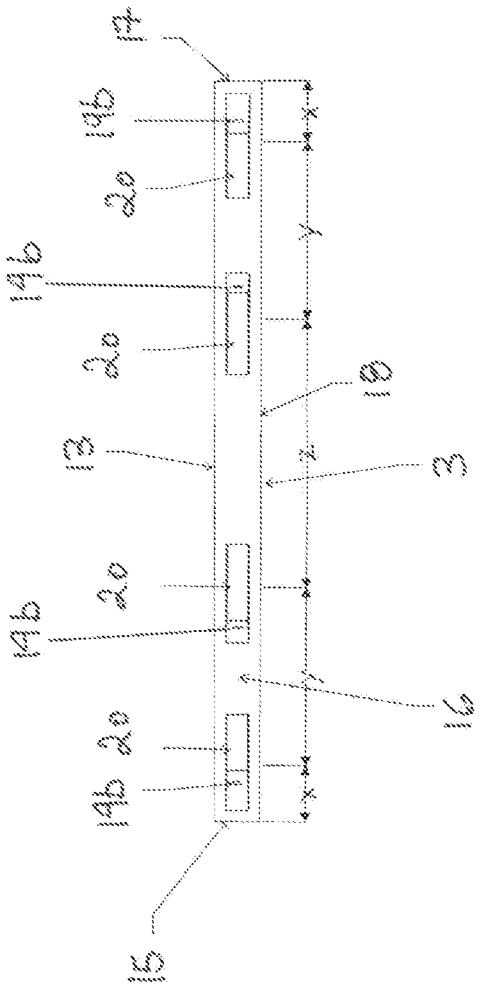
FIG. 28: shows an embodiment of a tiny home foundation end wall with four slots for mating (channel) with the four pegs of the front hitch assembly of FIG. 27. The 'x', 'y' and 'z' values denote the distance between the center points of the holes (slots) for receiving pegs of the rear axle assembly. These values will vary depending on the number of slots used in a foundation and the positioning of pegs to be mated therewith. In such an embodiment the total width of the foundation may be about 8 feet and the height (thickness) may be about 6 inches.

An advantage of having the peg and slot configuration of the present disclosure (compared to the fork and tube configuration of the prior art relating to larger mobile homes) is the versatility and ease of aligning the peg and slot pairings for mating to one another. Moreover, the depths of the slots 12 minimally affect the integrity of the foundation's insulation and framing system. This provides for more construction and functionally efficient design options. If the mating of the pegs 9 into the slots 12 is affected by the terrain and/or elevation of the tiny home at a given location, the suspension (not shown) of the towing vehicle can be lowered. In addition, or alternatively, suitable propping/lifting means can be applied by one skilled in the art to facilitate the necessary alignment between the pegs and slots. When the pegs 9 are fully inserted into the foundation slots 12, pins 23 (as shown in FIGS. 23-25 and 33-34) are inserted into the series (each a set) of pin holes 11*a* and 19*a*, provided in the sides of the pegs 9 and walls of the slots 12, respectively (as shown in FIGS. 25, 26 and 28). Each of the pins has a pin portion 24 and securing (ring) portion 25*a* to lock the securing pin 23 into place during transport. The securing portion 25*a* is fitted through a hole 25*b* at the end of the securing pin 23 (see FIG. 25).

With the front hitch assembly 2 attached to the tiny house 26 (see FIGS. 17-21), the rear axle assembly 4 can be attached to the tiny home in a similar manner as done for the front hitch assembly such that pegs 10 are mated with slots 20. To facilitate the alignment of the rectangular (prismatic) pegs 10 of the rear axle assembly 4 with the slots 20 in the opposite end 16 of the tiny home foundation 3, the rear axle assembly 4 may be provided with an adjustable suspension (not shown) to lower its pegs 10 as close as possible to the level of the foundation slots 20. In addition, or alternatively, suitable propping/lifting means can be applied by one skilled in the art to facilitate the necessary alignment between the pegs and slots. When the pegs 10 are fully inserted into the foundation slots 20, securing pins 23 are inserted into pin holes 11*b* and 19*b*, provided in the sides of the pegs 10 and walls of the slots 20, respectively.

Each of the securing pins 23 comprises a pin portion 24 and can be secured in the series of pin holes 11*a*, 11*b*, 19*a*, and 19*b* forming a channel 31 running through the peg and channel pairings (couplings) when mated. In this embodiment, the series of pin holes 11*a* line up with the series of pin holes 19*a* and the series of pin holes 11*b* line up with the series of pin holes 19*b*. Pin holes 19*a* and 19*b* are the first holes through which the pin portion 24 is inserted from the exterior side walls 15, 17 of the tiny home foundation 3. Pin portion 24 is then threaded through pin holes 11*a* and 11*b*, sitting to the interior of the side walls 15, 17 of the tiny home foundation 3, from where the pegs are first inserted.

The securing means may comprise a ring structure 25*a* threaded through the pin portion 24 through a hole 25*b* (FIGS. 22-26 and 49-50), to secure/lock the pin portion 24 into place during transport. Alternatively, the securing means may comprise a pin rest 32 connected and projecting outward from the foundation side wall 15, 17 near the series of pin holes 11*a*, 11*b*, 19*a*, and 19*b*. The pin flange portion 33 at each end of the pin portion 24 (FIGS. 32-40), is shifted to sit on, or hook onto the pin rest 32 and thereby secure/lock the pin portion 24 into place during transport.

Once the front hitch and rear axle assemblies 2, 4 have been fully connected and secured to the tiny home foundation 3, the suspensions (not shown) of the towing vehicle and trailer system are adjusted so that the tiny home is elevated for transport to about 6 inches off the ground on paved roads. When the tiny home 26 (see FIGS. 17-21) is being delivered to a designated location, and subsequently positioned at its intended resting site, the suspension of the trailer system 1 can be raised to clear uneven terrain and then lowered again to allow for the decoupling of the front hitch and rear axle assemblies 2, 4, from the foundation 3 of the tiny home. The rear axle assembly 4 may be detached first, by removing the securing pin 23 and then pulling the rear axle assembly 4 out of the tiny house foundation 3. Similarly, the front hitch assembly 2 is detached by removing the securing pin 23 and pulling it out of the foundation 3. One skilled in the art will appreciate that means to support the propping and or lifting of the tiny house may be required to facilitate the decoupling process, which results in the disassembly of the tiny house trailer system 1.

Figure 11:
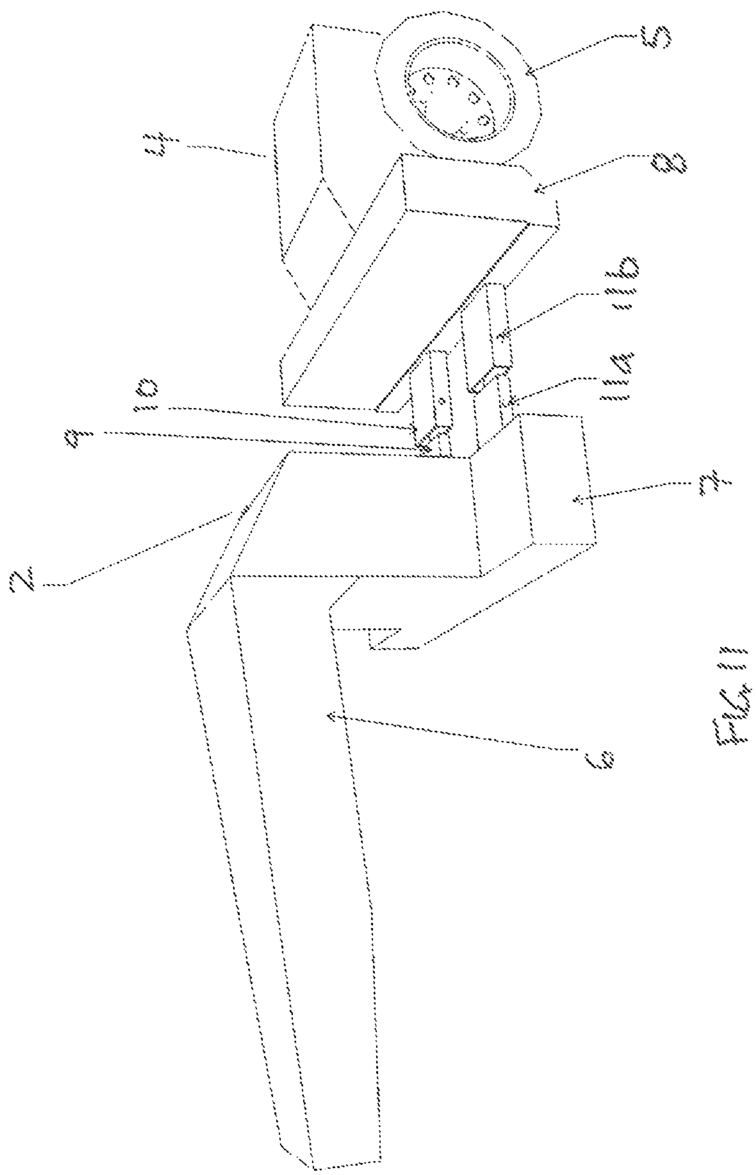
FIG. 11: shows an embodiment of front and rear assemblies aligned to be connected for transport. In this embodiment, the pegs of the front (hitch) assembly will be inserted into the hollow pegs of the rear (axle) assembly.
Figure 12:
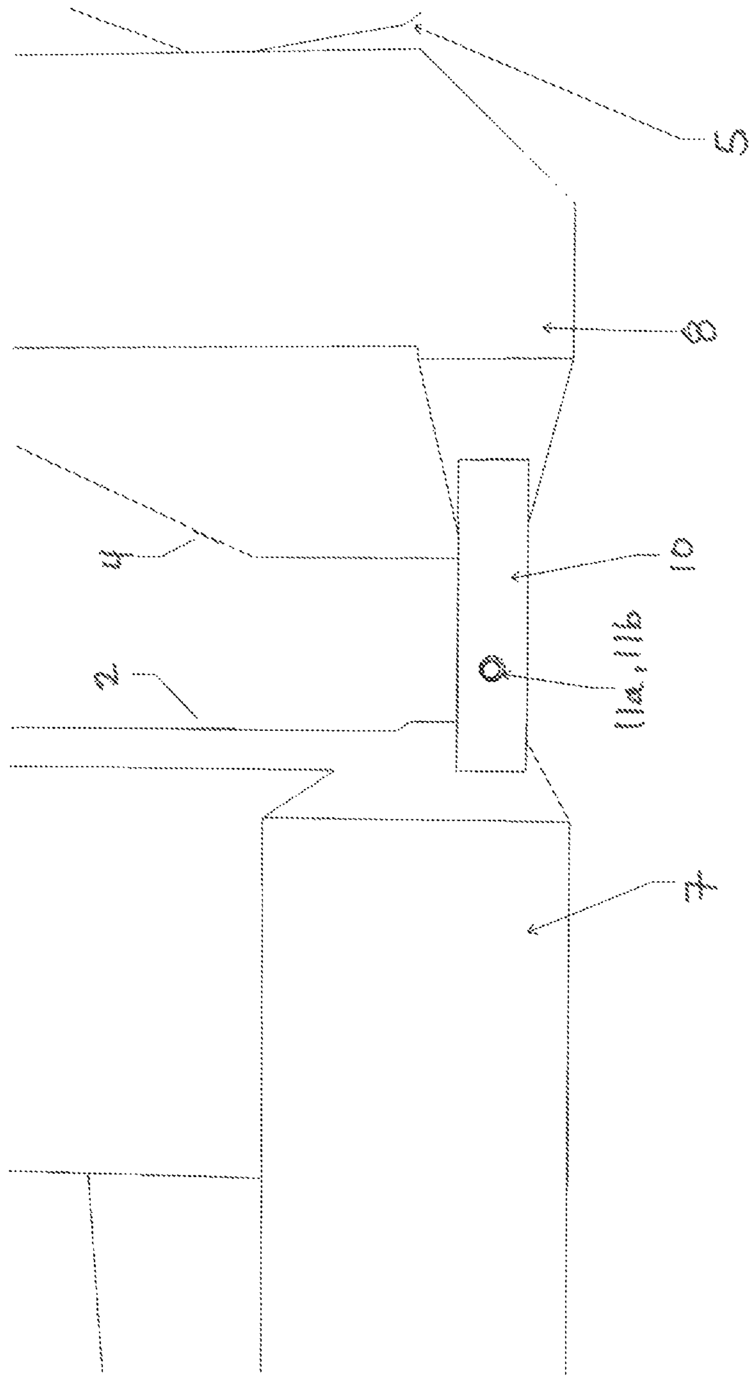
FIG. 12: shows a magnified view of an embodiment of front hitch and rear axle assemblies connection point for transport, further illustrating the alignment of holes through the peg and the channel walls for receiving a securing device (means) (e.g. a pin).

The loading crew should be able to move the rear (axle) assembly 4 in order to position it for attachment to the front (hitch) assembly 2. Similar to attaching the assemblies to the tiny house foundation 3, the front (hitch) and rear (axle) assemblies 2, 4 can be reconnected to each other as shown in FIG. 11. The smaller rectangular pegs 9 of the front (hitch) assembly will fit into the hollow rectangular pegs 9 of the rear axle assembly 4. When inserted fully, the set of safety pin holes 11*a* will line up with the set of safety pin holes 11*b* as shown in FIG. 12. When assembled, the front (hitch) and rear (axle) assemblies will be connected as shown in FIG. 10. After inserting the safety pin 23 to secure the two assemblies together, the trailer components are ready to be delivered to another location for reuse or storage.

Example 2: Tiny Home Trailer System and with Peg and Groove Coupling System

Figure 41:
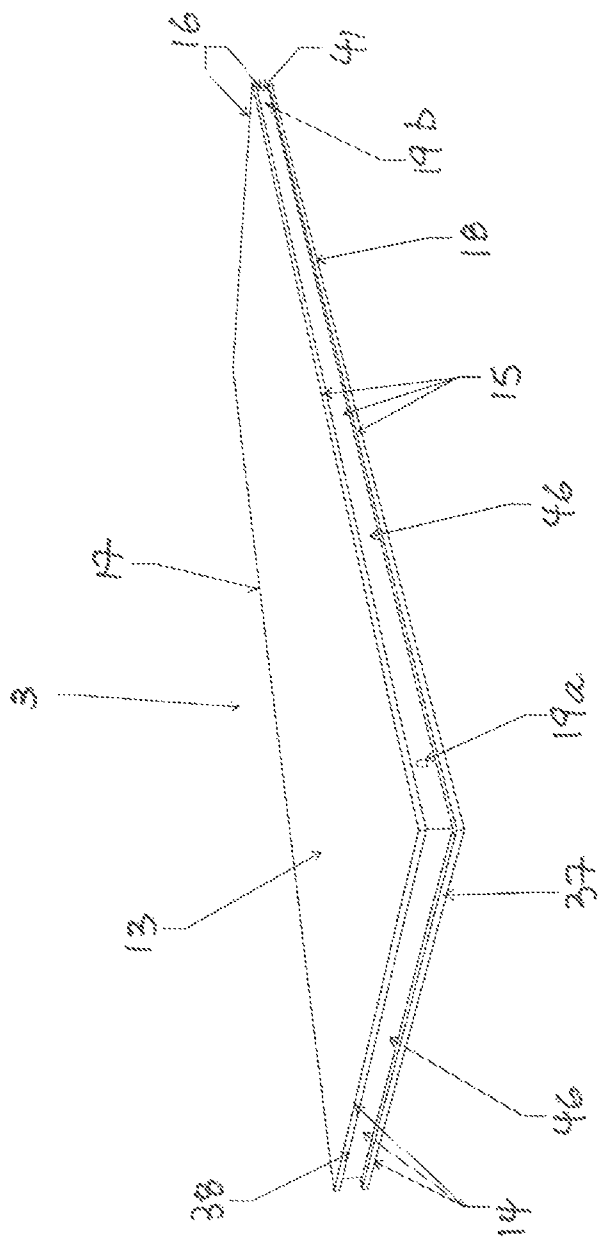
FIG. 41: shows an embodiment of a tiny home foundation with a grooved perimeter defining channels along each of the end and side walls.
Figure 42:
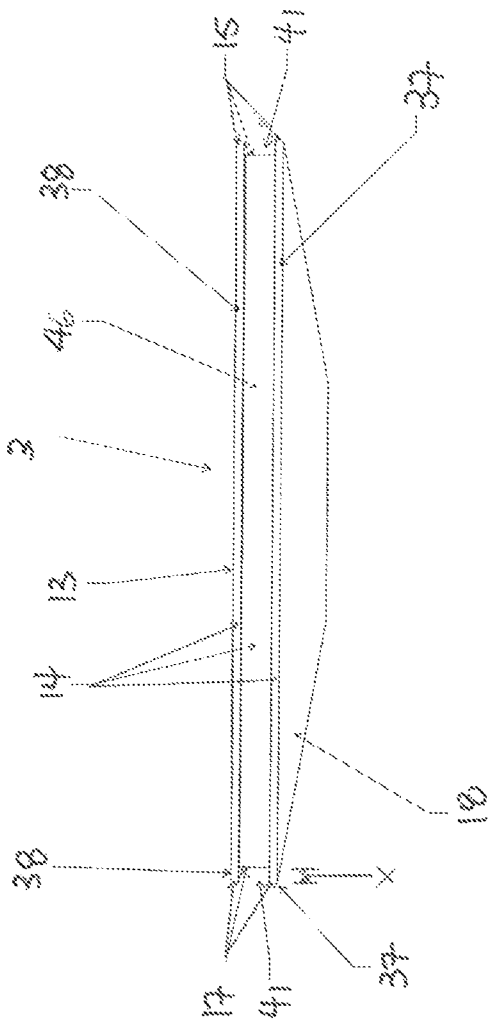
FIG. 42: shows an end wall view of the tiny home foundation shown in FIG. 41, including exemplary dimensions where the depth of a channel along each of the side walls is represented by the 'x' value. In such an embodiment, the foundation may be about 8 feet wide, the channel depth may be about 0.5 inches, the channel height about 4 inches and the channel walls extending and facing outward from the recessed wall may be about 1 inch high. These dimensions can be varied by one skilled in the art depending on the thickness of the peg that will need to be used to ensure there is adequate support for the foundation during transport.

In this embodiment of the trailer system shown in FIGS. 41-54, the assembly and disassembly of the trailer system 1 is achieved in a similar manner as in Example 1. The primary difference is that the front hitch and rear axle assemblies 2, 4 are configured with peg arms 34 that are inserted into or mate into groove channels 41 formed into the side walls 15, 17 of the foundation 3 (that define the length of the tiny home 26). The grooves (channels) 41 can run along the entire length of the foundation side walls 15, 17 (as shown in FIG. 41), or only so far as is needed to receive the pegs. In another variation of this embodiment, the end walls 14, 16 of the foundation may also be grooved to each have a channel 41. In the case where both the side and end walls are configured to be grooved along their full lengths, it can also be understood that there is a single channel 41 formed along the entire perimeter of the foundation into the side 15, 17 and end walls 14, 16 (see FIGS. 41 and 42). With reference to FIGS. 41-42, an embodiment is shown where the channel 41 for receiving peg arms 34 is defined by a wall configuration of the side walls 15, 17 (and in certain embodiments a wall configuration of the end walls 14, 16), including wall portion 46 and wall portions 37, 38 projecting from the wall portion 46 as an extension of the bottom and top walls 18, 13 of the foundation 3, respectively.

The grooves (channels) 41 are sufficiently deep to accommodate the peg arms 34 as shown in FIGS. 47-50, which will support the foundation 3 during transport, once secured with the securing pins 23 provided. Each of the securing pins 23 comprises a pin portion 24 and can be secured in the series of pin holes 11*a*, 11*b*, 19*a*, and 19*b* forming a channel 31 running through the mated peg and channel pairings. In this embodiment, the series of pin holes 11*a* line up with the series of pin holes 19*a* and the series of pin holes 11*b* line up with the series of pin holes 19*b*. Pin holes 11*a* and 11*b* are the first holes through which the pin portion 24 is inserted through the peg arms 34 of the front (hitch) and rear (axle) assemblies 2, 4. Pin portion 24 is then threaded through the series of pin holes 19*a* and 19*b* in the side walls 15, 17 of the tiny home foundation 3, which functions as a wall of channel 41, abutting the interior sides of the peg arms 34.

This configuration of the peg and channel (groove) system, similar to the one described in Example 1, minimally impacts the integrity of the foundation's construction, to provide for an analogous range of design options and efficiencies for the tiny home.

As shown in FIGS. 51-54, a variation of the peg arm 34 and groove channel 41 system illustrates how the portion of the foundation frame forming the grooves 41 (e.g. a beam 42 that can be made of steel) may be over-layered with flooring (portion) 43 of the tiny home. The flooring (portion) 43 provides the top wall 13, and may include some of the insulation 45*b* in the insulation cavity 45*a* of the foundation 3. This configuration allows the top wall 13 of the foundation 3 to be finished across the entire width of the tiny home 26.

Figure 51:
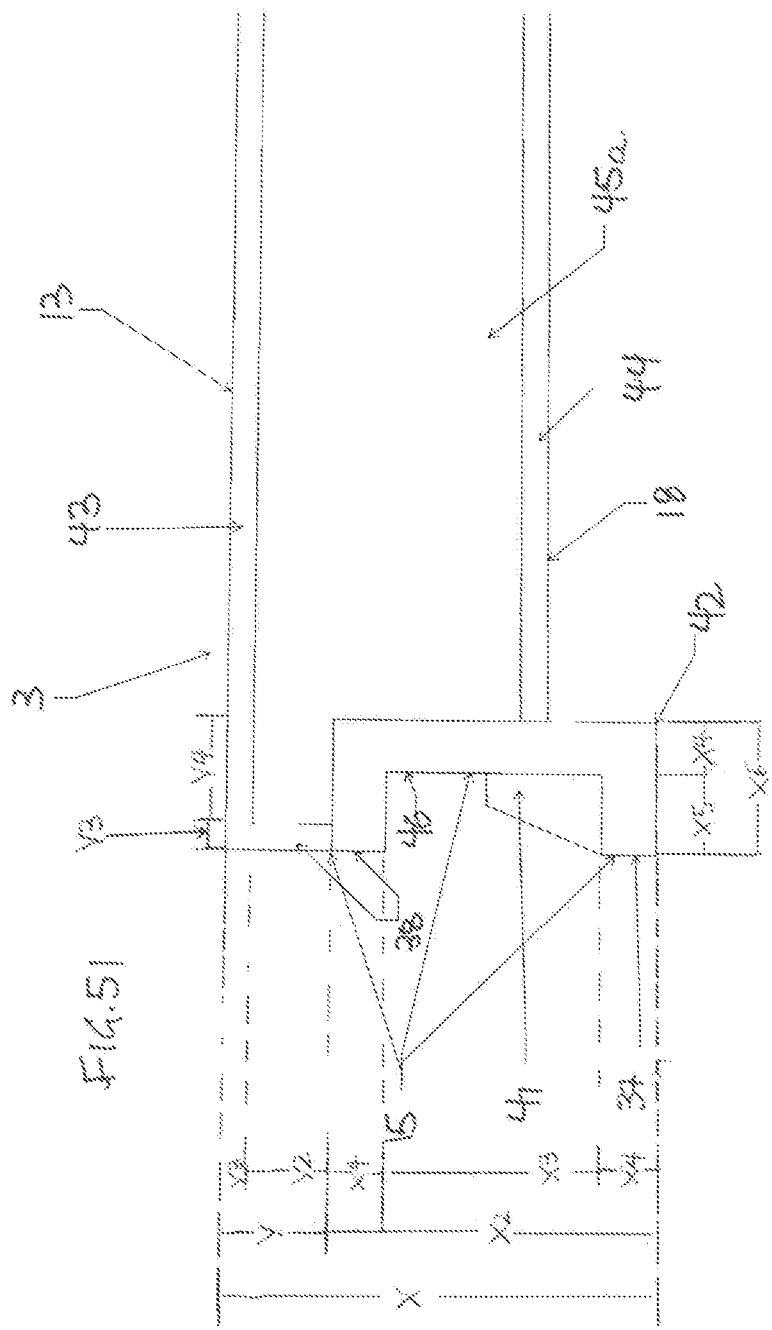
FIG. 51: shows another part of an embodiment of a tiny home foundation that may be insulated inside the space (cavity) defined by the top, bottom, side and end walls of the foundation. The foundation has grooved side walls defining channels for receiving pegs from the front hitch and/or rear axle assemblies of the trailer system. Various dimensions of the part of the foundation adapted to be an insulated panel are represented by a series of 'x' and 'y' values. In such an exemplary embodiment (also shown in FIG. 52), the values may be as follows: x=8 inches, x2=6 inches, x3=4 inches, x4=1 inch, y=2 inches, y2=1.5 inches, y3=0.5 inches, and y4=2 inches.
Figure 52:
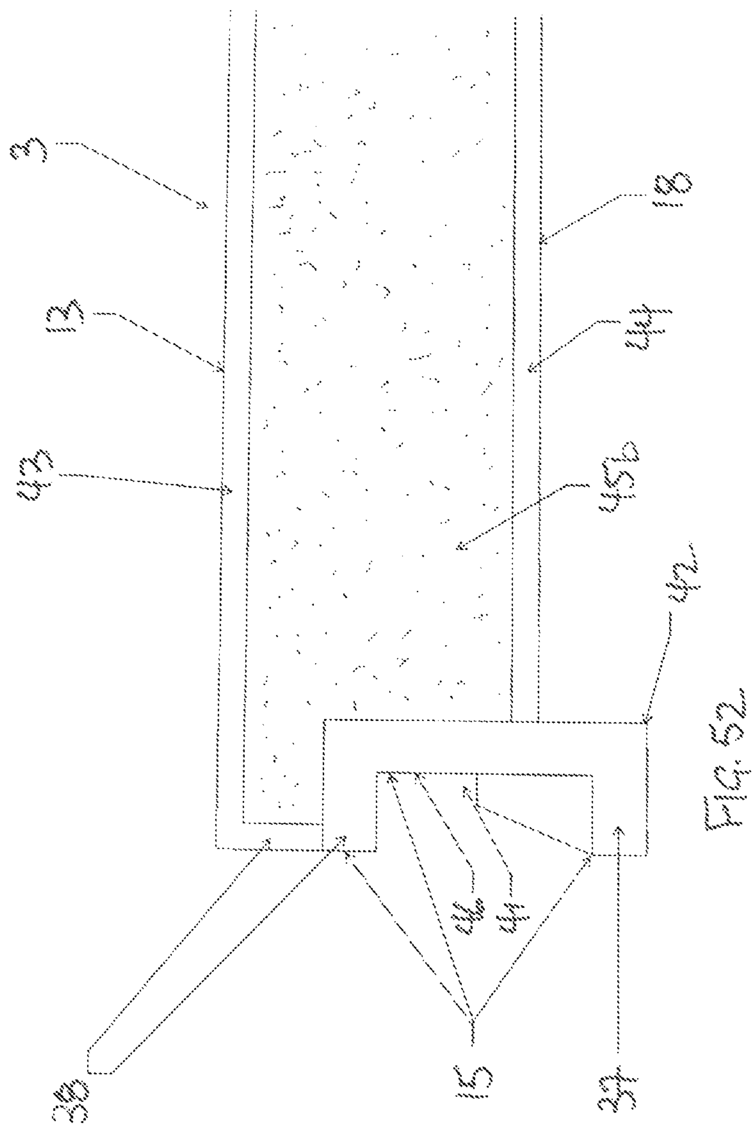
FIG. 52: shows the embodiment of FIG. 51 with insulation in the interior cavity of the foundation.
Figure 53:
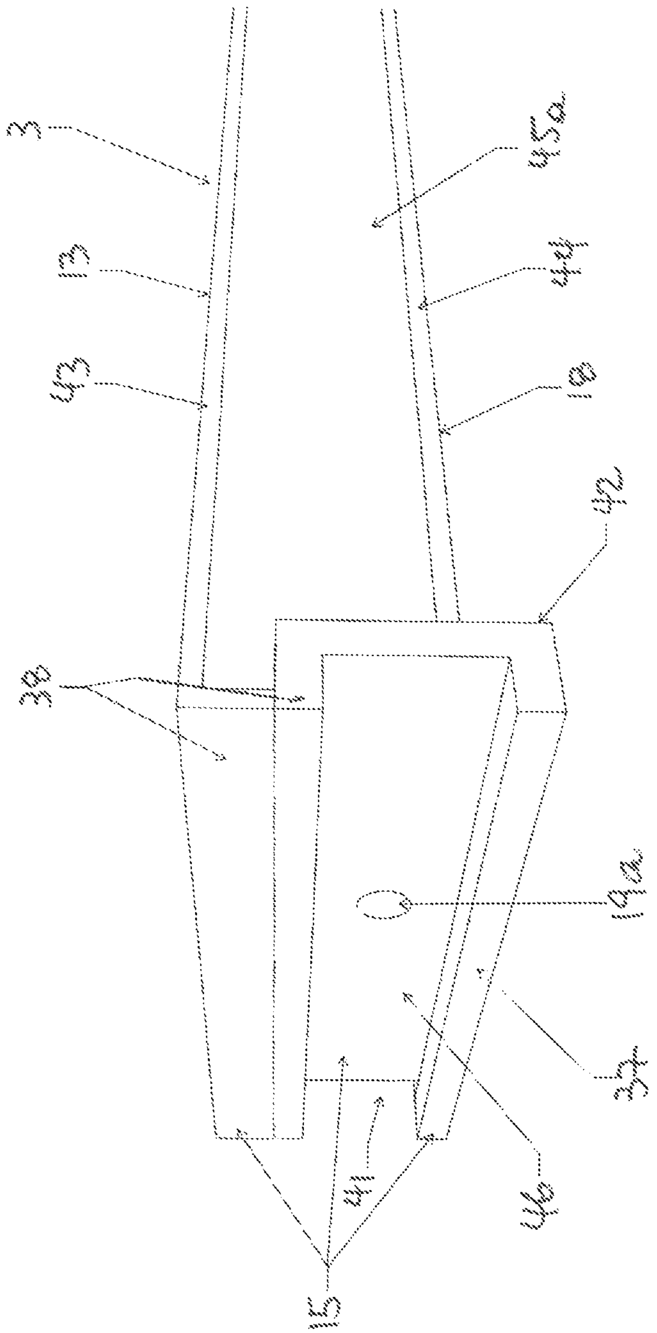
FIG. 53: shows an isometric view of the tiny home foundation shown in FIG. 51.
Figure 54:
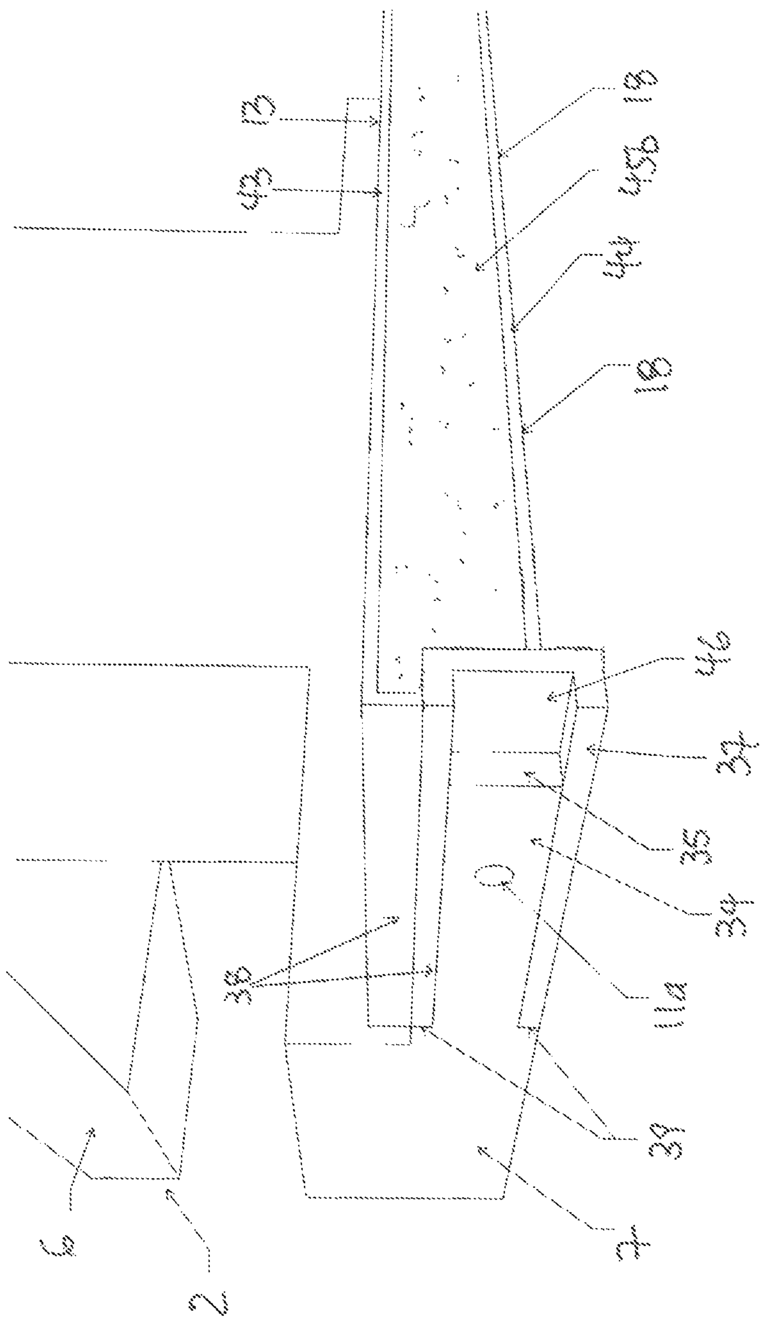
FIG. 54: shows the mating (connecting) of a peg into a channel of the tiny home foundation of FIG. 51.

In this embodiment, the height of the foundation side walls 15, 17 is defined by both the height of the beams 42 and flooring 43 sitting on top of the beams 42. In FIG. 51, the value 'x' provides the height of the side wall, and comprises values 'x2'+'y', where 'x2' is the height of the beam 42 and 'y' is the height of the flooring (portion) 43 over-layering the beam 42. In one embodiment, 'x' may range from about 6 to about 14 inches. The flooring portion 43 overlaying the grooved side wall (steel) beams 42 of the foundation 3 may be up to about 4 inches high (thick) and may comprise one of a number of flooring 43 finishes according to the preference of the user.

Figure 43:
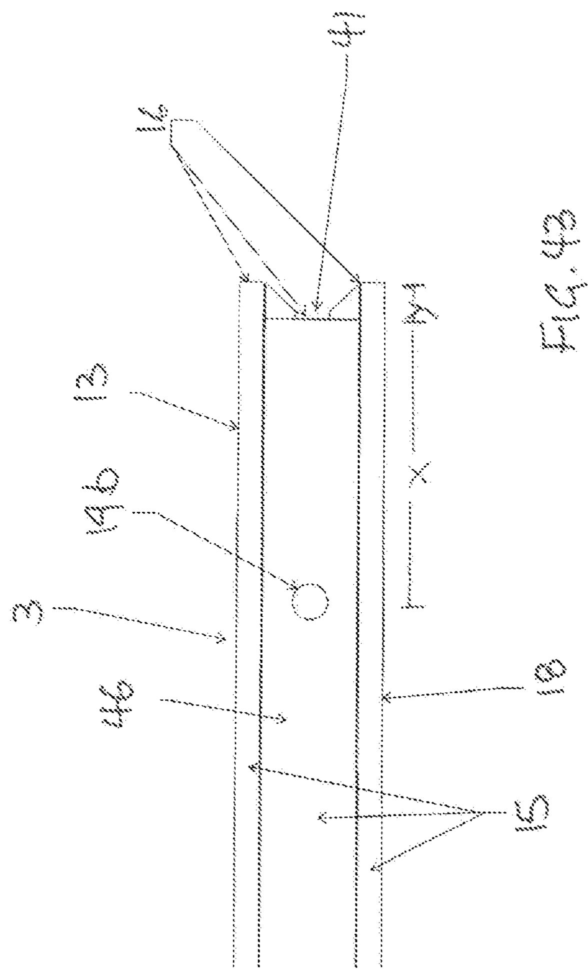
FIG. 43: shows a side wall view of the tiny home foundation shown in FIG. 41, including exemplary dimensions where the depth of the channel along the end walls may be varied by one skilled in the art as defined by the 'y' value. The 'x' value in this figure defines the distance from the inner most (recessed) portion of the channel of the end wall to the center of the pin hole along the side wall (channel) of the tiny home foundation. In such an exemplary embodiment, the height of the recessed wall portion of an end wall or side wall may be about 4 inches and the flange portions of the channels may each be about 1 inch high so as to provide a foundation that is about 6 inches high (foundation thickness).
Figure 44:
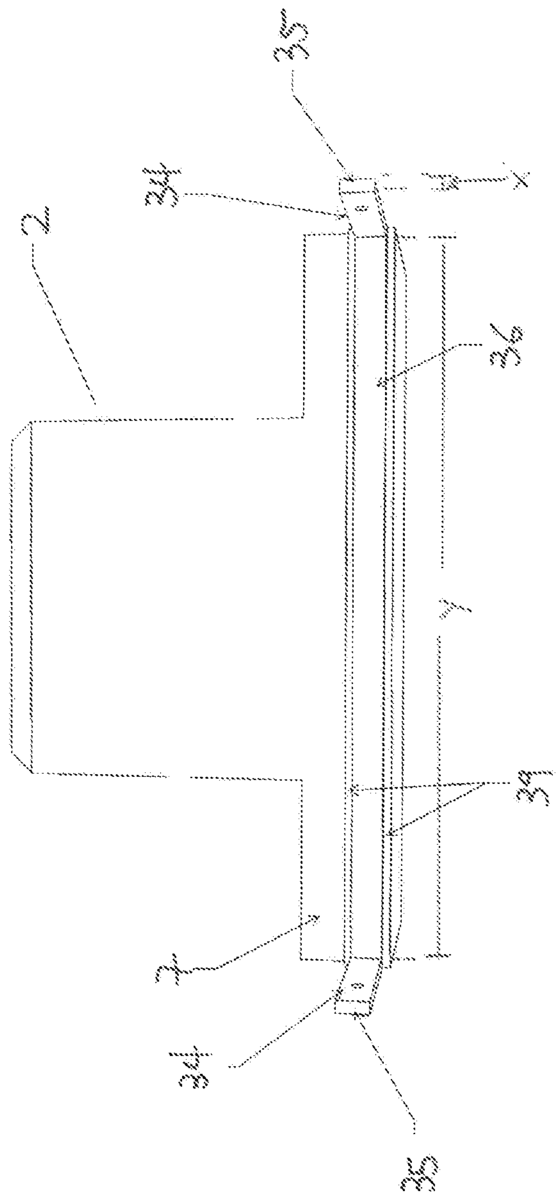
FIG. 44: shows a front view of an embodiment of a front hitch assembly with pegs for coupling/mating into channels formed by grooved side walls of a tiny home foundation. In such an exemplary embodiment, the peg may be slightly less than 4 inches high or about 4 inches to fit into the groove of a side wall as noted above with reference to FIG. 43. Similarly, the width of the peg may be defined by a value 'x' and be substantially equivalent to the depth of the groove of the side wall. When the width of a foundation is 8 ft this is measured between the outermost portions of opposing side walls, defined by the edges (end faces) of the groove (upper and lower) flange portions. The distance between the innermost (recessed) portions of opposing side walls may be defined by a value 'y' that will equal 8 minus 2'x' (i.e. $8-2x=y$).
Figure 45:
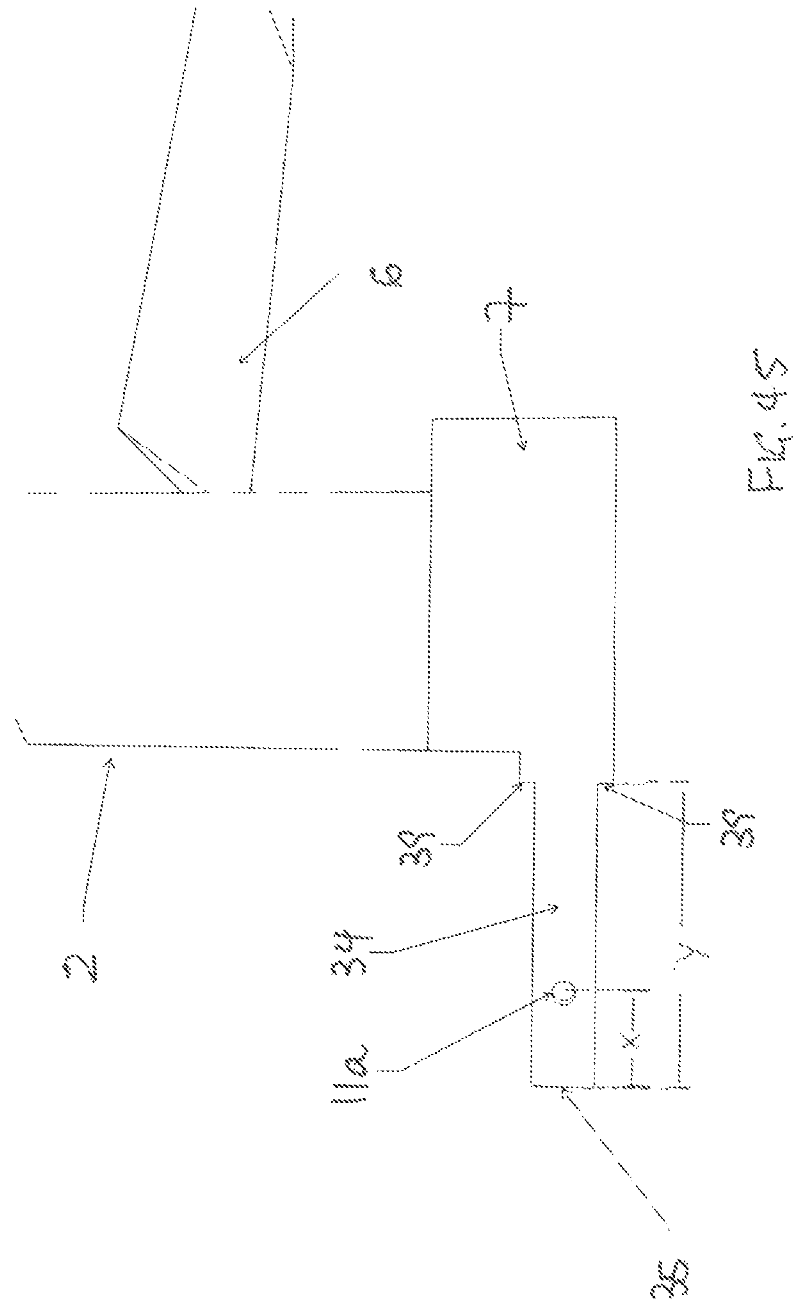
FIG. 45: shows a side view of an embodiment of a front hitch assembly with pegs for coupling/mating into channels formed by grooved side walls of a tiny home foundation. The pegs are supported and connected to the base of the front hitch assembly via a base portion that protrudes from the rest of the front hitch assembly's base. In such an exemplary embodiment, the length of peg and protruding base portion may be about 6 ft. The height of the protruding base portion that serves to support the peg in such exemplary embodiment may be about 6 inches high for a peg height of about 4 inches. The length dimensions of the peg will be determined based on the degree of support and stabilization needed for the foundation during transport, including the distance of the peg holes from the leading end of the peg ('x') relative to the full length of the peg ('y') connected to the protruding base portion. In such an exemplary embodiment, the peg hole may be positioned about a third of the way along the length of the peg from the leading end that would be inserted into a groove of a foundation.
Figure 46:
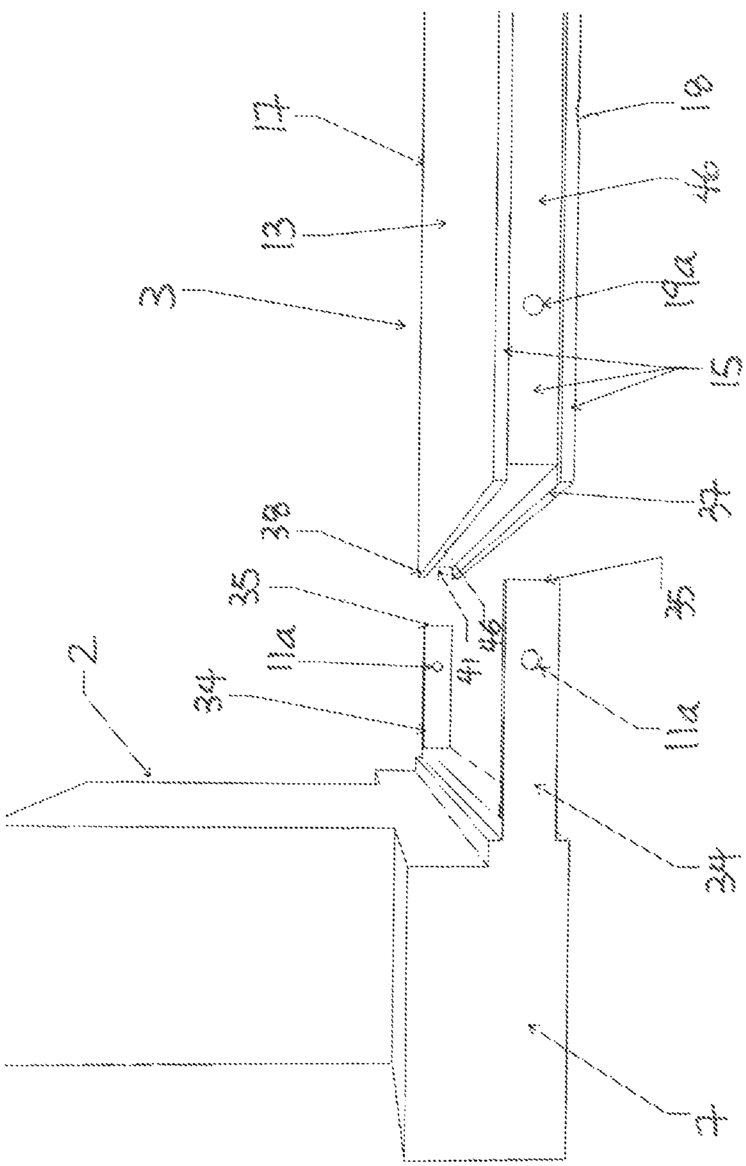
FIG. 46: shows a side view of an embodiment of a front hitch assembly with pegs lined up for coupling/mating into channels formed by grooved side walls of a tiny home foundation.
Figure 44:
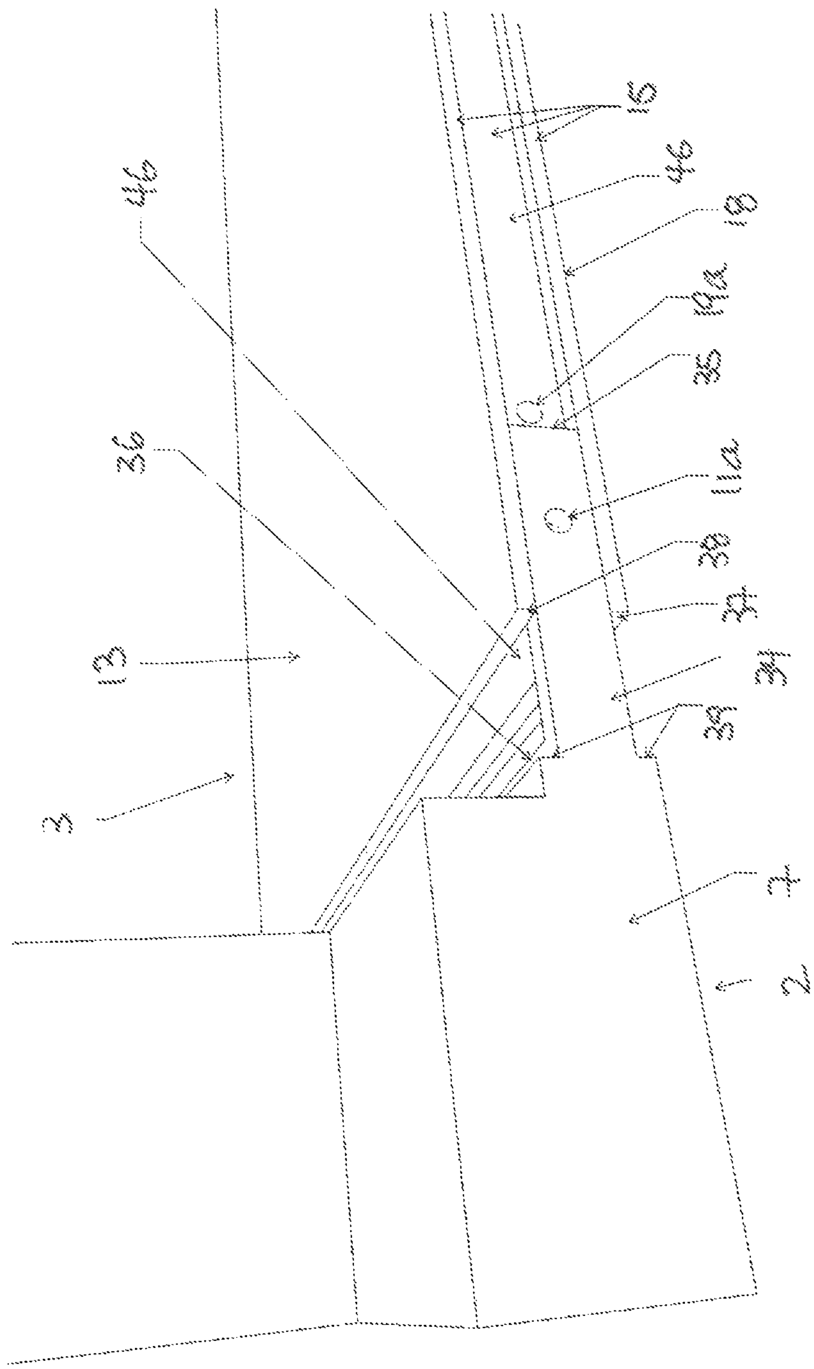

Again, with reference to FIG. 51, this value would be defined by the value 'y' and may in other embodiments be negligible or approach zero (see FIGS. 41-43). When zero, the finished flooring 43 surface may simply abut with the side wall of the beam 42. The beam 42 would then alone define the total height of the foundation side walls 15, 17, i.e. value 'x2'. With regard to this alternative embodiment, the bottom wall 18 of the foundation does not extend to form part of the channel wall portion 37, and instead abuts the beam 42 (forming channel 41) as shown in FIGS. 51-54. This can allow for the foundation 3 to have some clearance off the ground. The majority of the foundation 3 of the tiny home may effectively rest above, instead of on the ground by an amount defined by the value 'x7', which value may range from zero up to about 1 inch. In a related embodiment, the 'x7' value is about ¼ inch to about ½ inch. The bottom wall 18 finishing 44 of the foundation may be selected from a number of materials, e.g. wood or a steal sheet.

Example 3: Tiny Home Trailer System and with Peg and Groove Coupling System

In FIGS. 55-59, a more detailed embodiment similar to that described in Example 2 is illustrated depicting the configuration of a trailer system's 1 components, namely their framing, connecting and securing means.

The front hitch assembly 2 is configured to have the gooseneck 6 be connected to a hitching assembly base 7 via a Y channel 48 provided with a gooseneck hitching hole 59 and a gooseneck guide and deck locking member 63 provided at the back end and underside of the gooseneck 6. The front end of the gooseneck includes rollers, a hitching plate and hitching member for guiding and securing the gooseneck 6 to a towing/transport vehicle. To accommodate different height requirements for the gooseneck 6 when used with different towing/transport vehicles, an adjusting mechanism 49 in the form of a mechanically operated plate is provided.

Both the hitching and rear axle assemblies are provided with pegs 34 inserted into the bases such that the pegs (substantially) provide the side walls for each base. The base 7 of a hitching assembly can be said to have a box frame configuration for receiving the pegs 34. The base 8 of the rear axle assembly can be said to have a bridge configuration for receiving the pegs 34.

The pegs of the hitching and rear axle assemblies have pin holes 11*a*, 11*b* for insertion into the grooved sides walls 15, 17 of a tiny home foundation 3. Each peg 34 has two pin holes that align with corresponding pin holes 19*a*, 19*b* of the tiny home foundation 3. Optional reinforcement plates (shown in FIGS. 55 and 56B) may be secured to the inner faces of the side walls with pin holes that also align with the pin holes of the pegs and foundation side walls, to provide additional support for the foundation side walls during transport.

The securing means 23 for connecting a peg 34 to a side wall 15 or 17 is a pin with a pin portion 24, a handle 54 and flange structure 55. When securing pin 23 is inserted through a pin hole 11*a*, 11*b* of a peg 34 the flange structure sits adjacent to a flanged member 56 connected to the outward face of the side wall of the peg 34 that is inserted into the channel (groove) of a side wall 15, 17. The flange structure 55 and flange member 56 each have a hole aligning with one another when the pin portion 24 is fully inserted through a pin hole of the peg 34 (and pin hole of either the foundation 3 or a peg connecting (spreader) bar 52 when no foundation 3 is integrated into the trailer system 1). The two holes form a short channel, which may or may not include threading features for receiving a locking means (bolt, pin or screw) 57 that keeps the securing pin 23 in its fully inserted position during transport of the trailer system 1.

The spreader bar 52 may be constructed and configured to replicate a shorter length of a foundation side wall including the formation of a groove defined by a side wall and opposing top and bottom walls extending out at a 90 degree angle from the top and bottom faces of the side wall to form an open channel of the spreader bar 52. The extended (outward facing) end faces of the top and bottom walls of the spreader bar 52 may optionally include a lip portion extending at a (substantially) 90 degree angle towards the opposing bottom and top wall, respectively. The two lip portions serve to partially enclose the open side of the channel opposite the side wall of the spreader bar 52. Such lip features may also be included as features of the grooved side walls of a foundation and dimensioned to allow for the insertion and removal of the securing pin 23 from the pin holes 11*a*, 11*b*. The lip features serve to more securely hold a peg 34 in place when inserted into the channel of a spreader bar or foundation side wall, as the case may be. It is understood that the channels of the spreader bar of this embodiment are analogous to the channels 41 shown in other drawings herein (e.g. FIGS. 42-43).

The grooved end walls 14, 16 of a tiny home foundation, according to this embodiment, are mated with weldments 47*a*, 47*b* to provide additional stabilization and support for a tiny home foundation 3, and partially constructed, or fully constructed tiny home during transport. The weldments 47*a*, 47*b* may be part of a unitarily formed (e.g. using a molding process) rear axle assembly base 8, or a separable component that can be secured to the rear axle assembly base 8 by welding or using bolts, and thereby replaced if damaged during use. Similarly, the pegs 34 may also be removable from the bases 7, 8 of the hitching and rear axle assemblies, respectively to allow for replacement if damaged during use.

The foundation 3 comprises a series of spaced cross (framing) bars (referred to as feature 40 in the Table of Figure Features below) in between and oriented perpendicular to the side walls of the foundation 3. In addition to providing support to, or enhancing the structural integrity of the foundation 3 these bars can be used to secure structurally insulated panels (SIPs) into the cavity or space of the foundation ultimately defined by the side, end and top and bottom walls when finished. Alternatively, this same space or cavity can be filled using alone or in combination spray foam, sheet wood and such other components as may be selected by one skilled in the art to provide a foundation with sufficient structural integrity, strength, rigidity and energy efficiency as may be desired.

In this embodiment, exemplary dimensions of the various member components are about as follows:

1. A foundation 3: 25 feet (L)×8 feet (W)×9.75 inches (H). The height may vary between about 9.5 to 10.5 inches.
2. A hitch assembly base 7: 1 foot, 7.5 inches (L)×8 feet, 0.25 inches (W)×10.5 inches (H) at the front end and 1 foot, 1.25 inches (H) at the back end that interfaces with a foundation when engaged therewith. The length may vary between about 1 foot, 7 inches to about 1 foot, 10 inches. The base height may vary between about 10.5 inches to about 1 foot, 5 inches.
3. A peg 34 of a hitch or rear axle assembly: 5.5 feet (L)×2.25 inches (W)×8 inches (H). The height may vary between about 7.8 inches to about 8.5 inches. The width may vary between about 2.25 inches to about 3 inches.
4. A rear axle assembly base 8: 1 foot (L)×8 feet (W)×1 foot (H). The base length may vary between about 1 foot to about 1 foot, 5 inches. The base height may vary between about 1 foot to about 1 foot, 5 inches.
5. A weldment 47*a*, 47*b* for a hitching or rear axle assembly following the same dimension orientation applied to the assemblies above: 4 inches (L)×6 feet (W)×6.75 inches (H).
6. A distance between pin holes 11*a* and 11*b* on a peg 34 or pin holes 19*a* and 19*b* of a foundation side wall may be 3 feet. The distance between pin holes may vary and be selected by one skilled in the art depending on the length of the peg 34. The pin hole closest to the end of the foundation side wall, or closest to the point where the peg 34 begins to extend beyond a base of an assembly may be positioned 1 foot from said end or point.
7. A spreader bar: 7 feet (L)×3.5 inches (W)×10.5 inches (H); and lip portions extending towards each other, from the top wall and bottom wall of the spreader bar, respectively: 3.25 inches and 3 inches. The lip portions may vary from about 2 inches to about 3.5 inches each.

Other features labelled in FIGS. 55-59 are further described in the "Table of Figure Features" that follows.

Table of Figure Features: The features shown in all of the figures for the illustrated embodiments disclosed herein are summarized in the table below. The table provides figures in which a given feature is labelled and a brief description of the feature and its relationship with other features as the case may be. It is to be understood that features may appear in other figures without being labelled, or included in the "Figures" column.

| Feature No. | FIGS. | Description |
|---|---|---|
| 1 | 1, 18, 23, 50 | Trailer system comprising a front hitch assembly 2, a tiny home foundation 3 and a rear axle assembly 4. |
| 2 | 1-2, 6-7, 10-14, 17-18, 23-25, 27, 29-31, 44-50, 54 | Front hitch assembly (alternatively referred to as hitching member, or hitching assembly) for connecting a trailer system 1 to a towing/transport vehicle, and connecting to one end of a foundation 3 to support it during transport (with or without a tiny home 26.built on it) |
| 3 | 1-9, 17-18, 20-26, 28, 32, 34-43, 46-55, 56B | Tiny home foundation for building a tiny home 26 and transporting it when integrated into a trailer system 1.. |
| 4 | 1-2, 8-12, 15-18, 23, 29-31, 50, 55, 56A-56B, 59 | Rear axle assembly (alternatively referred to as a dolly member) for connecting to an end of a tiny home foundation 3 and supporting it (with or without a tiny home 26 built on it) during transport. |
| 5 | 1-2, 8-12, 15-16-18, 23, 29, 31, 50 | Wheel(s) of a rear axle assembly 4 (e.g. single axle, dual wheeled). |
| 6 | 1-2, 6, 10-11, 13-14, 17-18, 23-25, 29-31, 55, 56A-56B, 58A-58C | Gooseneck for connecting a front hitch assembly 2 to a towing/transport vehicle. |
| 7 | 1-2, 6-7, 10-14, 17-18, 23-25, 27, 29-31, 44-50, 54-55, 56A-56B, 57A-57B | (Front hitch assembly) Base from which peg-like structures 9, or 34 project for insertion into slots 12, or a groove channel 41, respectively, of a tiny home foundation 3. |
| 8 | 1-2, 8-12, 15-18, 23, 29-31, 50, 55, 56A-56B, 59 | (Rear axle assembly) Base from which peg-like structures 10, or 34 project for insertion into slots 12, or a groove channel 41, respectively, of a tiny home foundation 3. |
| 9 | 2, 6, 11, 13-14, 17, 25, 27, 29 | Pegs of a front hitch assembly 2 configured for insertion into slots 12 of a tiny home foundation 3 at one end wall 14, or both end walls 14, 16. Pegs 9 also fit into one end, or both ends of a tube (or slots) 30 formed in a connecting member 27, and/or into pegs 10 of a rear axle assembly 4 when said pegs 10 are configured to be hollow. |
| 10 | 2, 8, 10-12, 15-17, 29 | Pegs of a rear axle assembly 4 configured for insertion into slots 20 of a tiny home foundation 3 at one end wall 16, or both end walls 14, 16. Pegs 10 also fit into one end, or both ends of a tube (or slots) 30 formed in a connecting member 27, and/or for receiving pegs 9 of a front hitch assembly 2 when said pegs 10 are configured to be hollow. |
| 11a, 11b | 2, 6-17, 25, 29, 44-48, 54-55, 57A-57B | Sets of one or more aligned pin holes through at least one or more side walls of pegs 9 and 10, and peg arms 34, respectively, for receiving a securing means (e.g. securing pins 23) to hold said peg structures 9, 10 in place when fully inserted into slots 12, 20, or said peg arms 34 in a groove channel 41, of the tiny home foundation 3. Each of the sets of pin holes is also used to align with sets of pin holes 19a, 19b of a foundation 3, and sets of pin holes 29 and 28, of a connecting member 27 or the pinholes of a spreader bar 52. |
| 12 | 3, 6, 13, 34-38 | Slot (channels) in a tiny home foundation 3 for receiving pegs 9 of a front hitch assembly 2. |
| 13 | 1-9, 13-16, 22-25, 28, 32, 34-38, 41-43, 46-54 | Top wall of the tiny home foundation 3 that may or may not span the full width of a tiny home 26, and may or may not comprise a portion of the flooring 43 of the tiny home 26 in different embodiments. In other words, in certain embodiments, a finished floor may or may not be applied to a foundation 3 before transport of the foundation 3 (with or without a tine home 26 built on it) and in other embodiments the finished floor 43 is applied to provide the top wall 13 of the foundation 3 after its transport and positioning at a designated destination. |
| 14 | 2-4, 6, 13-14, 26, 35-38, 41-42 | End wall of the tiny home foundation 3 depicted as the wall facing the front hitch assembly 2 when the trailer system 1 is aligned in an end to end configuration. An end wall 14 may or may not be grooved in different embodiments. |

-continued

| Feature No. | FIGS. | Description |
|---|---|---|
| 15 | 1-9, 13-18, 21-25-25, 32, 34-37, 41-43, 46-50-53, 55, 56B | Side wall of the tiny home foundation 3 as depicted in the figures. A side wall 15 may or may not be grooved in different embodiments. |
| 16 | 2, 4-5, 8, 15-16, 19, 21-22, 26, 28, 39-41, 43 | End wall of the tiny home foundation 3 depicted as the wall facing the rear axle assembly 4 when the trailer system 1 is aligned in an end to end configuration. An end wall 16 may or may not be grooved in different embodiments. |
| 17 | 1-6, 8, 13-16, 23, 25-26, 28, 40-42, 46, 50, 55, 56B | Side wall of a tiny home foundation 3 as depicted in the figures. A side wall 17 may or may not be grooved in different embodiments. |
| 18 | 1-9, 13-18, 21-25, 28, 32, 34-40, 41-43, 46-54 | Bottom wall of the tiny home foundation 3. A bottom wall 18 may or may not span the full width of a tiny home foundation 3. |
| 19a, 19b | 1-9, 13-18, 22, 25-26, 28, 32, 34-35-37, 43, 46-47, 53, 55 | Ses of one or more aligned pin holes in the side walls 15, 17 and through the walls of slots 12, 20, or framing bars 40 of a tiny home foundation 3, for receiving a securing means (e.g. securing pins 23) to hold said peg structures 9, 10 in place when fully inserted into slots 12, 20, or said peg arms 34 in a groove channel 41 of the tiny home foundation 3. Each of the sets of pin holes is also used to align with sets of pin holes 11a, 11b of peg structures 9, 10 and 34, and sets of pin holes 29 and 28, of a connecting member 27 or the pinholes of a spreader bar 52. |
| 20 | 5, 8, 15, 21, 28, 39 | Slot (channels) in a tiny home foundation 3 for receiving pegs 10 of a rear axle assembly 4. |
| 21 | 14, 27 | (Projected) End wall of a peg 9 of a front hitch assembly 2 opposite the end of the peg 9 connected to a base 7, which can be inserted into a slot channel 12 of a tiny home foundation 3. |
| 22 | 16, 29 | (Projected) End wall of a peg 10 of a rear axle assembly 4 opposite the end of the peg 10 connected to a base 8, which is inserted into a slot channel 12 of the tiny home foundation 3. |
| 23 | 23-26, 30-31, 33-38, 49-50, 56A-56C (see also Detail B) | Securing means in the form of a (safety/securing) pin including a pin portion 24 and other structural elements (e.g. features 25a, 25b, 33, 54, 55), cooperating with additional structural features on, or applied to the foundation 3 (e.g. features 32, 53, 56, and 57) to secure and integrate with one another a front hitch assembly 2, a rear axle assembly 4 and a tiny home foundation 3 (i.e. components of a trailer system 1) together for transport. The same pin can be used to secure a front hitch assembly 2 and a rear axle assembly 4 to each other, to a connecting member 27, or 52. |
| 24 | 25, 30-31, 33-38, 49, 55, 56C | Pin portion of a securing pin 23 that can thread through each set of pin holes 11a, 11b, 19a, 19b, 28, 29, and the pin holes of a spreader bar (connecting member) 52, to secure parts of a trailer system 1 together. |
| 25a and 25b | 25, 30-31, 49 | Ring structure (securing portion 25a) threaded through an end of a pin portion 24 functioning as a component of a securing means. The ring structure 25 a is threaded through a hole 25b at or near the end of the pin portion 24.. |
| 26 | 17-21 | Tiny house including foundation 3 and flooring 43. |
| 27 | 29-31 | Connecting member for coupling a front hitch assembly 2 and a rear axle assembly 4 together for transport. Another embodiment of a connecting member is shown as feature 52 in FIG. 56A (peg connecting/spreader bar). |
| 28 | 29 | (Connecting member) Sets of pin holes for securing a peg 10 of a rear axle assembly 4 when aligned with a set of pin holes 11b. |
| 29 | 29 | (Connecting member) Sets of pin holes for securing a peg 9 of a front hitch assembly 2 when aligned with a set of pin holes 11a. |
| 30 | 29 | Channel of a connecting member 27 for inserting pegs 9 and 10 of front hitch and rear axle assemblies 2, 4, respectively. |

-continued

Figure 48:
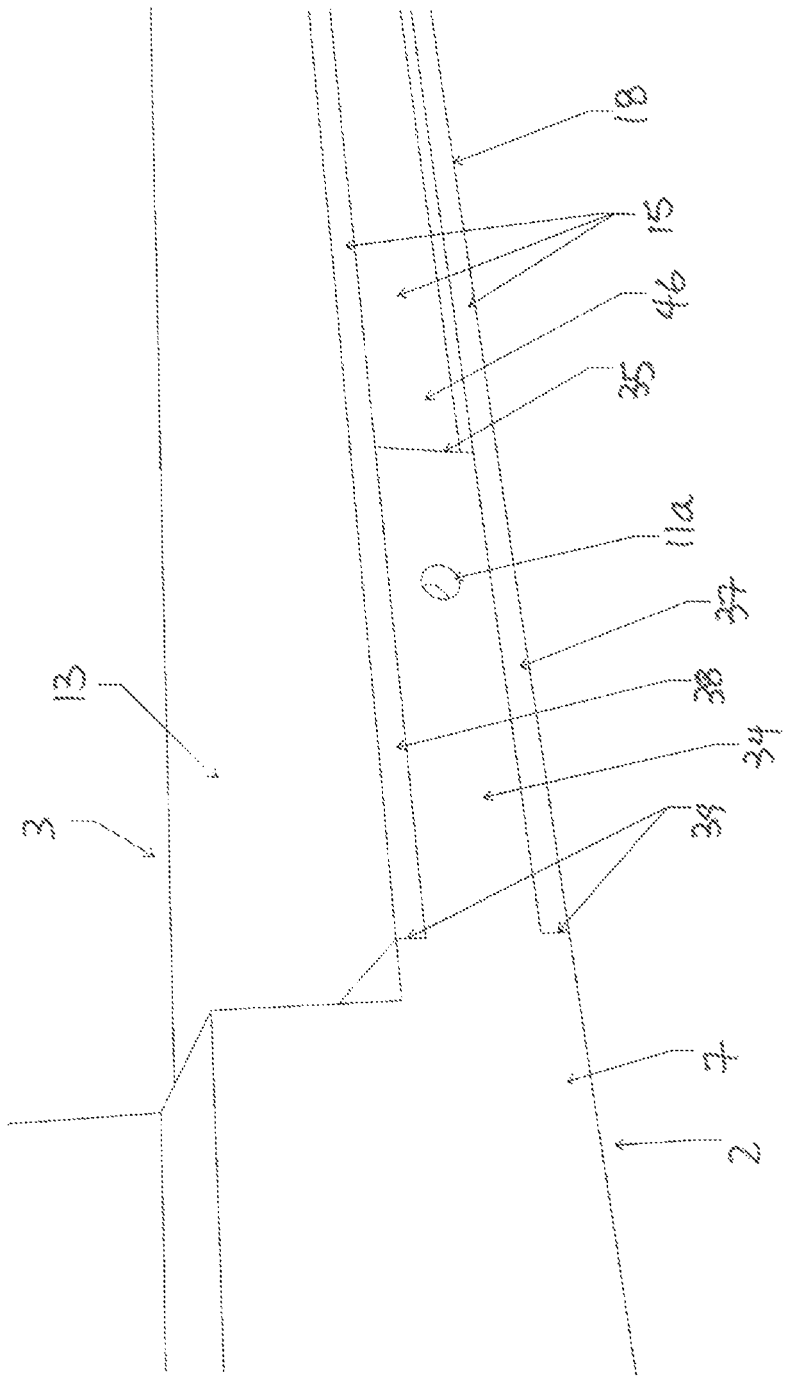
FIG. 48: shows an isometric side view of an embodiment of a front hitch assembly with pegs fully coupled/mated with the channels formed by grooved side walls of a tiny home foundation.
Figure 44:
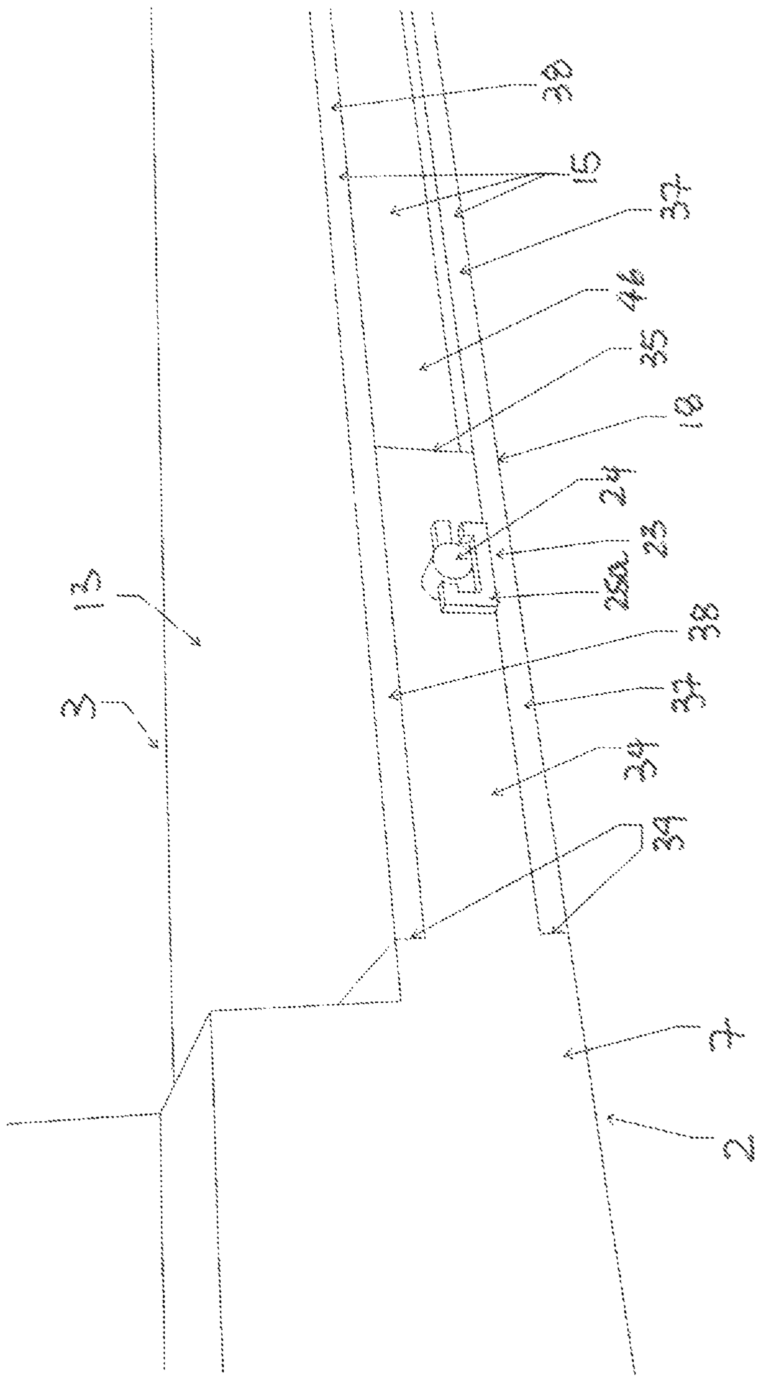
Figure 50:
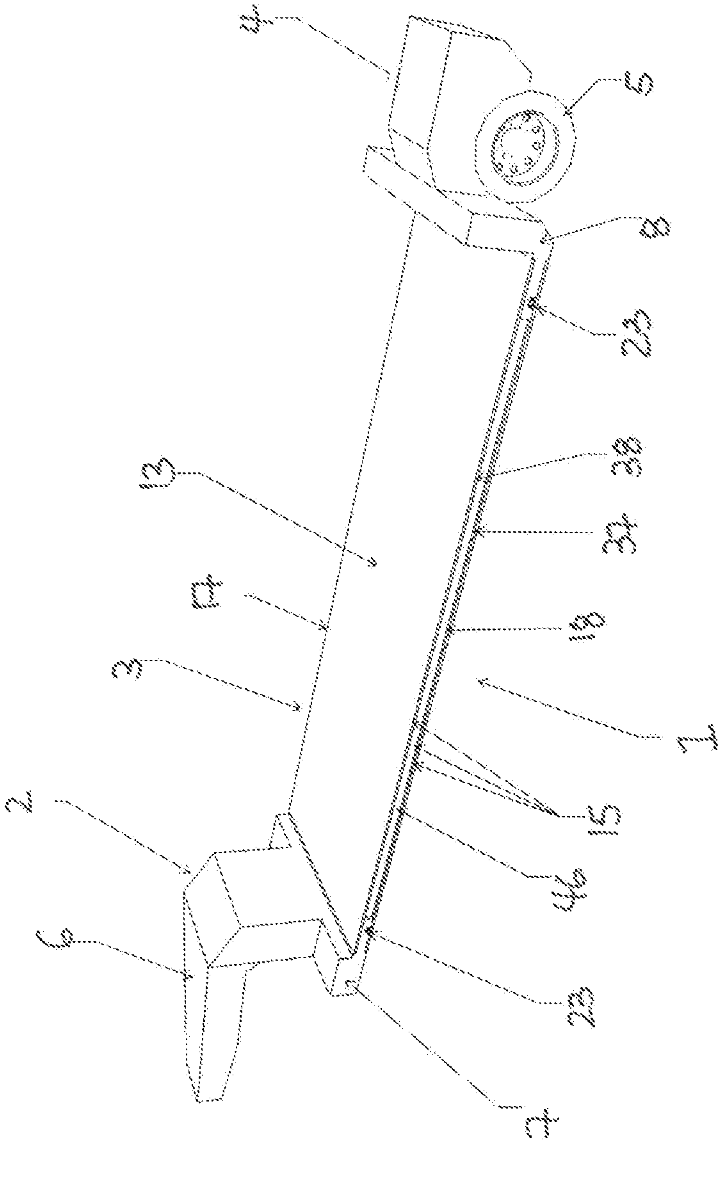
FIG. 50: shows an isometric side view of an embodiment of an assembled trailer system using a peg/grooved channel system of FIGS. 41-49.

| Feature No. | FIGS. | Description |
| --- | --- | --- |
| 31 | 32, 36, 39-40 | Channel formed by either or both sets of pin holes 19a, 19b alone or when aligned with either or both sets of pin holes 11a and 11b, respectively. |
| 32 | 32, 34-38 | Pin rest which functions as part of a securing means 23 together with the flange (securing) portion 33 of an embodiment of a securing pin 23. |
| 33 | 33-40 | Pin flange portion of an embodiment of a securing pin 23 for securing the securing pin 23 when resting on a pin rest 33. |
| 34 | 44-50, 54, 55, 57A-57B, 59 | Peg arm of a front hitch assembly 2 or rear axle assembly 4 for insertion into a groove channel 41 of an embodiment of a tiny home foundation 3. |
| 35 | 44-49, 54, 57A-57B | (Projected) End wall or leading end of a peg arm 34 of a front hitch assembly 2, or rear axle assembly 4 opposite the end of the peg arm 34 connected to a base 7 or to a base 8, respectively, and which is inserted into a groove channel 41 of a tiny home foundation 3. This feature may be a flat face (e.g. FIG. 44) or pointed (e.g. FIG. 57B) |
| 36 | 44, 46-47 | Base portion of a front hitch assembly 2 (which can also be provided for a rear axle assembly 4) that mates into a channel 41 formed into, or as part of a wall configuration of an end wall 14, or end wall 16, if so provided, of a tiny home foundation 3. When a front hitch assembly 2 (or rear axle assembly 4) is connected (coupled) to a tiny home foundation 3, the base portion 36 abuts a recessed wall portion 46 of the channel 41. See also analogous weldment features 47a and 47b of FIGS. 55, 57B and 59. |
| 37 | 41-43, 46-54 | Extended (flange) portion forms part of a side wall or end wall configuration for providing a lower wall of channel 41, and part of side walls 15, 17 and end walls 14, 16, as the case may be. |
| 38 | 41-43, 46-54 | Extended (flange) portion forms part of a side wall configuration, or an end wall configuration for providing an upper wall of channel 41, as well as part of side walls 15, 17 and end walls 14, 16, as the case may be. |
| 39 | 44-49 | (Upper and lower aspects) Base portion of a front hitch assembly 2 (which can also be provided for a rear axle assembly 4) that mates to end (outermost) faces of extended (flange) portions 37, 38 of a tiny home foundation 3. When a front hitch assembly 2 (or rear axle assembly 4) is connected (coupled) to the tiny home foundation 3, base portions 39 abut the end faces of extended portions 37, 38 as shown in FIGS. 47-48. |
| 40 | 26, 55, 56B | Framing bar providing structural support and attachment points for insulation panels. The framing bar may run the length of a tiny home foundation 3 as part of the foundation's framing system. A framing bar may be made of steel, or other metal, wood, (nano)composites of reinforcing and matrix materials, or other suitable material(s), and may or may not have a configuration and dimensions adapted to provide for a slot channel 12 or 20 formed at one or both ends terminating at end walls 14, 16 of a tiny home foundation 3, respectively. Alternatively a framing bar may run perpendicular and in between side walls 15, 17 (e.g. see FIGS. 55 and 56A). |
| 41 | 41-43, 46, 51-53 | (Groove) Channel(s) formed into or as part of a wall configuration of side walls 15, 17, and end walls 14, 16, as the case may be. A channel 41 may be embodied in a grooved beam 42 used to provide the side walls 15, 17 (or end walls 14, 16) of the tiny home foundation 3, or by portions of the top and bottom walls 13, 18 extending in a perpendicular orientation relative to and beyond the side (or end) of the recessed wall portion 46 of the wall configuration. |
| 42 | 51-54 | (Grooved) Beam of an embodiment of a tiny home foundation 3 for framing a foundation 3 and receiving peg arms 34 of front (hitch) and rear (axle) assemblies 2, 4. |
| 43 | 19-20, 51-54 | Flooring (finish) of top wall 13 of a tiny home foundation 3. |

-continued

Figure 56A:
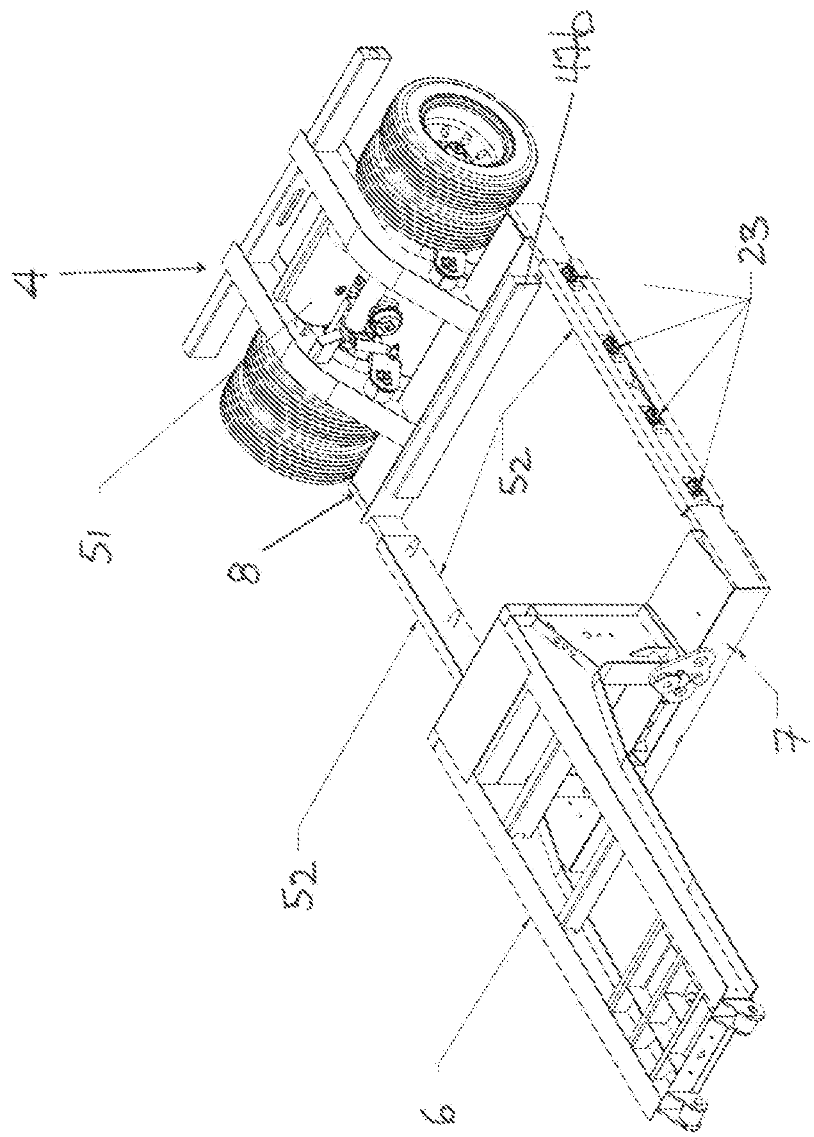
FIGS. 56A-56C: shows in 'A' an embodiment of a trailer system ready for transport without the foundation component, but using connecting (spreader) bars for connecting with the pegs of the hitching and rear axle assemblies; in 'B' a trailer system ready for transport with the foundation component connected with the pegs of the hitching and rear axle assemblies; and in 'C' the detail of a securing pin and cooperating structures to ensure the securing pin does not dislodge during transport.
Figure 56B:
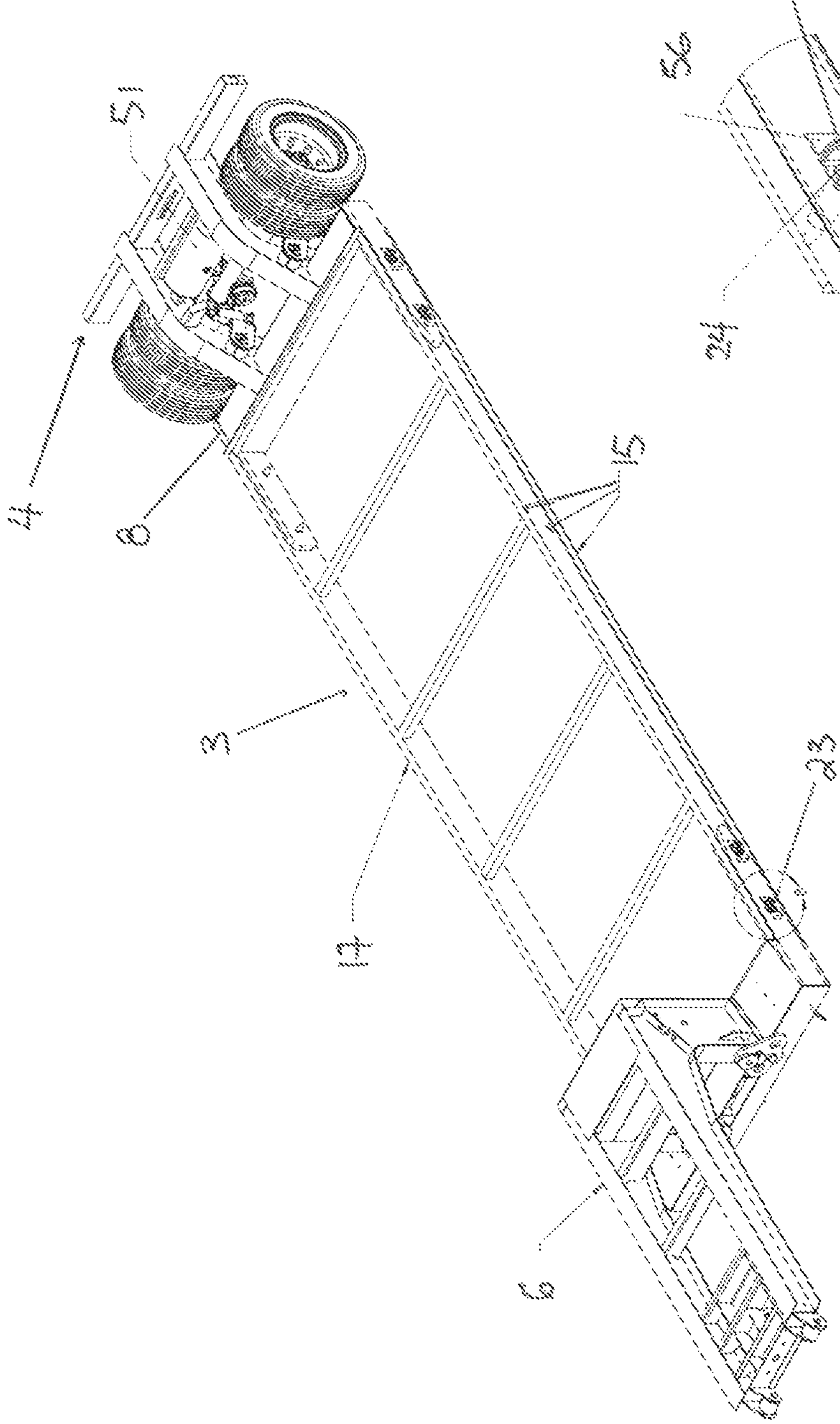
Figure 56C:
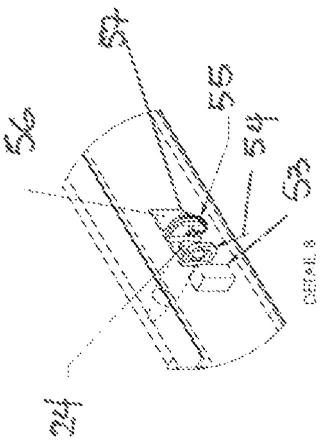

| Feature No. | FIGS. | Description |
|---|---|---|
| 44 | 51-54 | Finish of bottom wall 18 of a tiny home foundation. |
| 45a | 51, 53 | Insulation cavity of a tiny home foundation 3. |
| 45b | 52, 54 | Insulation in an insulation cavity 45a of a tiny home foundation. |
| 46 | 41-43, 46-54 | (Recessed) wall portion of a channel 41 forming part of a wall configuration of side walls 15, 17 and end walls 14, 16 of a tiny home foundation 3, as the case may be. |
| 47a<br>47b | 57A<br>55, 56A | Weldments for engagement with channel 41 of a tiny home foundation 3. Can be made of steel or other materials similar to those used to construct a base 7 of a hitching assembly 2 or base 8 of a rear axle assembly 4. A weldment may be secured to a base (as described above) using a welding process between metal surfaces. Alternatively, similarly dimensioned structures can be secured to the base using screws, bolts and the like, to allow for replacement and interchangeability as needed. |
| 48 | 55, 57B | Y channel formed on top surface of hitching assembly base 7 for receiving the gooseneck component 6 of the hitching assembly 2. |
| 49 | 55, 58A | Adjusting (plate) mechanism for mechanically raising or lowering the height of the gooseneck 6 to three different heights. |
| 50 | 55, 58A | Roller(s) at the front end of the gooseneck 6 for rolling it onto the transport vehicle (truck) frame and centering the gooseneck 6 when connecting it to the vehicle. |
| 51 | 56B | Pneumatic suspension for raising and lowering the rear axle assembly 4 to facilitate its connection to and disconnection from a foundation 3. |
| 52 | 56A | Peg connecting (spreader) bar is an embodiment of a connecting member that provides a grooved receiving means for the pegs 34 of a hitching assembly 2 and rear axle assembly 4 to facilitate transport of a trailer system when there is no foundation 3 integrated as a trailer bed. The pegs 34 can be secured to the peg connecting bar using a securing means (pin) 23 threaded through pin holes as shown in FIG. 56A. The configuration of the peg connecting bar for receiving the pegs 34 may provide the same or different structural features on, or applied to the side walls 15, 17 of the foundation 3 to ensure the securing pin 23 can be locked once inserted through the pin hole sets 11a, 11b (see FIGS. 55, 57A and 59) and pin holes of the peg connecting bar, which are analogous to the pin holes 19a, 19b of the foundation 3. In other embodiments the peg connecting bar may incorporate different or additional features not part of a wall configuration of a side wall 15 or 17 of a foundation 3. |
| 53 | 56C | Protective block for minimizing damage to the securing pin 23 during use and transport of the trailer system 1. The protective block protects the handle portion 54 and flange structure 55 of the securing pin 23. Also protected by the block is a flange member 56 with a flange portion that sits adjacent to the flanged portion of the flange structure 55. Both flanged portions of the flange structure 55 and flange member 56 have a hole that align with one another to provide a short channel for a locking means (bolt, pin or screw) 57 to be inserted and thereby maintain the securing pin 23 in place when connecting pegs 34 to a foundation 3, or peg connecting (spreader) bar 52, as shown in FIGS. 56B and 56A, respectively. |
| 54 | 56C | Handle (structural element) of a securing (locking) pin 23 to facilitate inserting and removing a pin portion 24 from the channels formed when aligning pin holes 11a, 11b (of the hitching and rear axle assemblies 2, 4) with pin holes 19a, 19b (of the foundation 3), or with the pin holes of a spreader bar 52. |

-continued

| Feature No. | FIGS. | Description |
|---|---|---|
| 55 | 56C | Flange structure of the securing (locking) pin 23 by facilitating the insertion of locking means 57 into, and removal of said locking means 57 from a channel formed by two holes when the flange structure is aligned with the flange member 56 (connected to a peg (arm) 34. |
| 56 | 56C | Flange member is a structural feature connected to the pegs 34 adjacent to the pin holes 11a, 11b. As described above for feature 55, the flange portion of the flange member aligns with the flange structure 55 of the securing pin 23 to facilitate the use of a locking means 57 to lock the securing pin in place when fully inserted through a pin hole 11a or 11b. |
| 57 | 56C | Locking means for securing a flange structure 55 to a flange portion of a flange member 56 and thereby locking a securing pin 23 in place when fully inserted through a pin hole 11a or 11b. In other words, the locking means (e.g. a bolt, pin or screw) ensures that the securing pin 23 does not get dislodged or fall out during transport of the trailer system 1. |
| 58 | 57A | Guide path flanges forming a Y channel 48 on the surface of the hitching assembly base 7 and thereby providing a guiding means for connecting the gooseneck 6 to the hitching assembly base 7. |
| 59 | 57A | Gooseneck hitching hole at the stem end of the Y channel 48, for receiving and connecting with a gooseneck guide and deck lock member 63 of the gooseneck 6. |
| 60 | 57A | Gooseneck receiving cavity representing a recessed portion of a top surface of a hitching assembly base 7 and providing a space for configuring a Y channel 48 and providing a gooseneck hitching hole 59. |
| 61 | 58A-58B | Adjusting mechanism bolting means for securing the adjusting plate mechanism 49 of the gooseneck 6. |
| 62 | 58B | Air operated brake for engaging a deck lock member connected to the gooseneck guide 63 with a gooseneck hitching hole 59 formed into the hitching assembly base 7. |
| 63 | 58C | Gooseneck guide and deck lock member for facilitating the alignment and connection between the gooseneck 6 and hitching assembly base 7. |
| 64 | 58C | Gooseneck hitching plate for stabilizing the gooseneck 6 on a towing/transport vehicle (e.g. truck) once rolled into place using rollers 50. |
| 65 | 58C | Gooseneck hitching member for hitching the gooseneck 6 to a towing/transport vehicle (e.g. truck) once rolled into place using rollers 50. |

The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The invention claimed is:

1. A trailer system, comprising:

a) a foundation of a tiny home having a first side and a second side, the sides defining a length of the tiny home, and a first end and a second end, the ends defining a width of the tiny home;

b) a hitching member for attaching the trailer system to a towing vehicle, the hitching member comprising a first set of two pegs, each for connecting into a corresponding groove channel formed by a wall configuration of each of the first and second sides of the foundation at the first end; and c) a dolly member comprising a second set of two pegs, each for connecting into a corresponding groove channel formed by a wall configuration of each of the first and second sides of the foundation at the second end;

wherein by aligning the hitching member, foundation and dolly member in an end-to-end configuration, each of the pegs is inserted into the corresponding groove channel, to form a peg and groove channel pairing and thereby provide an assembled trailer system.

2. The trailer system according to claim 1, wherein the hitching member comprises a goose-neck.

3. The trailer system according to claim 1, wherein the dolly member is a single axle, dual-wheeled member.

4. The trailer system according to claim 1, wherein the dolly member comprises an air suspension means for lowering and elevating the trailer system.

5. The trailer system according to claim 1, wherein the peg and channel pairing is provided with aligning pin holes through the peg and a side wall of the groove channel for receiving a securing pin to lock the peg to the foundation during transport of the assembled trailer system.

6. The trailer system according to claim 1, wherein the dolly member has a base, the base having a weldment that inserts into a groove or slot formed by a wall configuration of the second end of the foundation.

7. The trailer system according to claim 1, wherein the hitching member has a base, the base having a weldment that inserts into a or groove formed by a wall configuration of the first end of the foundation.

8. The trailer system according to claim 1, wherein the assembled trailer system can transport the foundation of the tiny home, a partially built tiny home on the foundation, or a fully built tiny home on the foundation.

9. The trailer system according to claim 1, wherein when the assembled trailer system is disassembled, a connecting member comprising one or more channels positioned and sized to each receive one of the one or more pegs of the hitching member, or one of the one or more pegs of the dolly member, is used to connect the hitching member and dolly member by aligning the hitching member, connecting member and dolly member in an end-to-end configuration.

10. A method of transporting a tiny home, comprising the step of assembling a trailer system comprising:

a) a foundation of a tiny home comprising a top, a bottom, a first side and a second side, the sides defining a length of the tiny home, and a first end and a second end, the ends defining a width of the tiny home;

b) a hitching member for attaching the trailer system to a towing vehicle, the hitching member comprising a first set of two pegs, each for connecting into a corresponding groove channel formed by a wall configuration of each of the first and second sides of the foundation at the first end; and c) a dolly member comprising a second set of two pegs, each for connecting into a corresponding groove channel formed by a wall configuration of each of the first and second sides of the foundation at the second end;

wherein by aligning the hitching member, foundation and dolly member in an end-to-end configuration, each of the pegs is inserted into the corresponding groove channel, to form a peg and groove channel pairing and thereby provide an assembled trailer system.

11. The method according to claim 10, wherein the hitching member comprises a goose-neck.

12. The method according to claim 10, wherein the dolly member is a single axle, dual-wheeled member.

13. The method according to claim 10, wherein the dolly member comprises an air suspension means for lowering and elevating the trailer system.

14. The method according to claim 10, wherein the peg and channel pairing is provided with aligning pin holes through the peg and a side wall of the groove channel for receiving a securing pin to lock the peg to the foundation during transport of the assembled trailer system.

15. The method according to claim 10, wherein the dolly member has a base, the base having a weldment that inserts into a groove or slot formed by a wall configuration of the second end of the foundation.

16. The method according to claim 10, wherein the hitching member has a base, the base having a weldment that inserts into a slot or groove formed by a wall configuration of the first end of the foundation.

17. The method according to claim 10, wherein when the assembled trailer system can transport the foundation of the tiny home, a partially built tiny home on the foundation, or a fully built tiny home on the foundation.

18. The method according to claim 10, wherein when the assembled trailer system is disassembled, a connecting member comprising one or more channels positioned and sized to each receive one of the one or more pegs of the hitching member, or one of the one or more pegs of the dolly member, is used to connect the hitching member and dolly member by aligning the hitching member, connecting member and dolly member in an end-to-end configuration.

* * * * *